US009552698B2

(12) United States Patent
Berman

(10) Patent No.: US 9,552,698 B2
(45) Date of Patent: Jan. 24, 2017

(54) SYSTEMS, DEVICES, AND METHODS FOR ENHANCING GAMING EXPERIENCES

(71) Applicant: KING SHOW GAMES, INC., Minnetonka, MN (US)

(72) Inventor: Bradley Berman, Minnetonka, MN (US)

( * ) Notice: Subject to any disclaimer, the term of this patent is extended or adjusted under 35 U.S.C. 154(b) by 619 days.

(21) Appl. No.: 13/925,615

(22) Filed: Jun. 24, 2013

(65) Prior Publication Data

US 2014/0094280 A1 Apr. 3, 2014

Related U.S. Application Data

(60) Provisional application No. 61/708,183, filed on Oct. 1, 2012.

(51) Int. Cl.
*A63F 9/24* (2006.01)
*A63F 13/00* (2014.01)
*G06F 17/00* (2006.01)
*G06F 19/00* (2011.01)
*G07F 17/32* (2006.01)

(52) U.S. Cl.
CPC ......... *G07F 17/326* (2013.01); *G07F 17/3258* (2013.01)

(58) Field of Classification Search
CPC .............. G07F 17/3202; G07F 17/3265; G07F 17/3213
See application file for complete search history.

(56) References Cited

U.S. PATENT DOCUMENTS 5,788,573 A * 8/1998 Baerlocher ............. G07F 17/32 273/138.2
5,823,873 A 10/1998 Moody
6,007,066 A 12/1999 Moody
6,098,985 A 8/2000 Moody
6,213,876 B1 4/2001 Moore
6,224,483 B1 * 5/2001 Mayeroff ................ G07F 17/32 463/16
6,334,814 B1 1/2002 Adams
6,517,074 B1 2/2003 Moody et al.
6,612,927 B1 9/2003 Slomiany et al.
6,652,377 B1 11/2003 Moody
7,247,092 B2 7/2007 Jarvis et al.
7,354,342 B2 * 4/2008 Paulsen ............... G07F 17/3267 273/142 R
8,147,310 B2 4/2012 Jarvis et al.
8,419,518 B2 4/2013 Jarvis et al.
8,439,737 B1 5/2013 Moody (Continued)

*Primary Examiner* — Kang Hu
*Assistant Examiner* — Jason Pinheiro

(57) ABSTRACT

Embodiments of the present invention set forth systems, apparatuses and methods for enhancing gaming experiences using a game wheel. Accordingly, a gaming device can be configured to operate a gaming wheel having a plurality of sections. Each of the sections of the wheel includes a symbol mark and is associated with a section classification. Random selections of game wheel sections are made where selected sections associated with a first classification provide an award associated with the corresponding symbol mark and places a termination indicator in the selected section. Selected sections associated with a second classification clear one or more of the existing termination indicators, if any. Selections continue until a section associated with a termination indicator is selected.

20 Claims, 38 Drawing Sheets

(56) References Cited

U.S. PATENT DOCUMENTS

| | | | | |
|---|---|---|---|---|
| 8,668,573 | B1 | 3/2014 | Mayeroff | |
| 8,727,862 | B2 | 5/2014 | Jarvis et al. | |
| 8,727,863 | B2 | 5/2014 | Gurule | |
| 2002/0082074 | A1 | 6/2002 | Bennett | |
| 2003/0064790 | A1 | 4/2003 | Hughs-Baird et al. | |
| 2003/0071417 | A1 | 4/2003 | Webb | |
| 2004/0002376 | A1 | 1/2004 | Swift et al. | |
| 2004/0152498 | A1 | 8/2004 | Kaminkow et al. | |
| 2004/0229670 | A1 | 11/2004 | Potter et al. | |
| 2005/0148383 | A1 | 7/2005 | Mayeroff | |
| 2005/0173863 | A1 | 8/2005 | Walker et al. | |
| 2006/0040723 | A1 | 2/2006 | Baerlocher et al. | |
| 2006/0063584 | A1 | 3/2006 | Brill et al. | |
| 2006/0160595 | A1 | 7/2006 | Gerson et al. | |
| 2007/0167208 | A1 | 7/2007 | Acres | |
| 2008/0113760 | A1* | 5/2008 | Baerlocher | G07F 17/32 463/20 |
| 2008/0146305 | A1 | 6/2008 | Moody | |
| 2009/0111556 | A1 | 4/2009 | Moody | |
| 2009/0117993 | A1* | 5/2009 | Bigelow, Jr. | G07F 17/34 463/22 |
| 2009/0176548 | A1 | 7/2009 | Nakamura et al. | |
| 2009/0258695 | A1 | 10/2009 | Graham et al. | |
| 2011/0034233 | A1 | 2/2011 | Berman et al. | |
| 2011/0312409 | A1 | 12/2011 | Vancura | |
| 2013/0029750 | A1 | 1/2013 | Moody | |
| 2013/0217457 | A1 | 8/2013 | Jarvis et al. | |

* cited by examiner

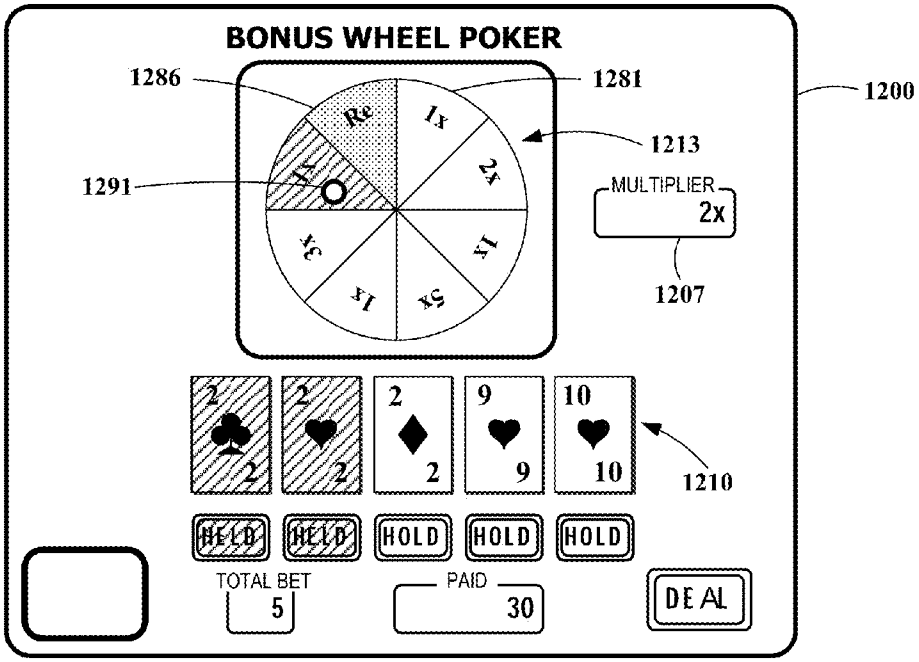
FIG. 12C
FIG. 12D
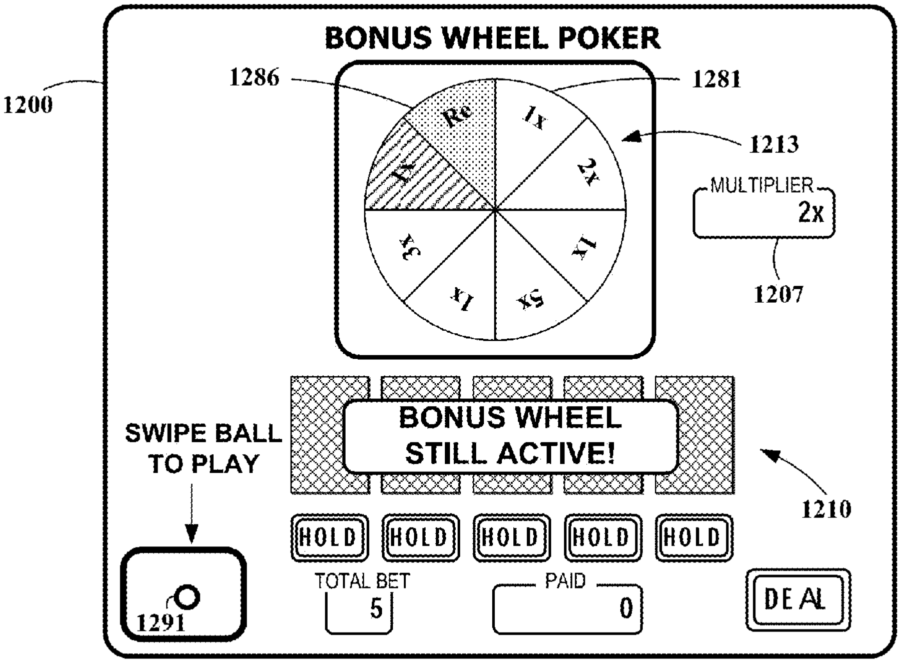

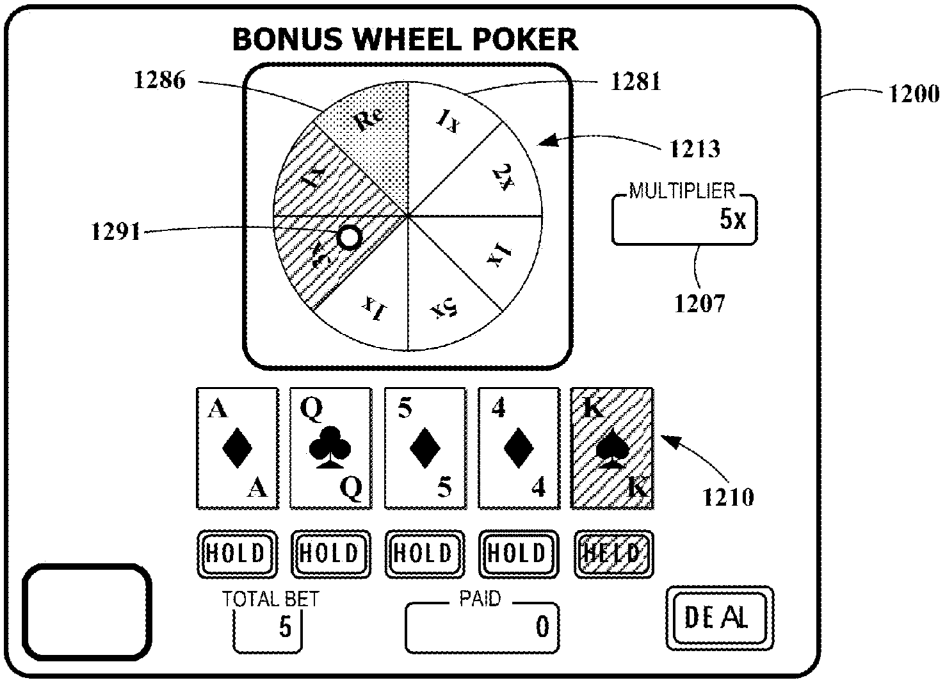
FIG. 12E
FIG. 12F
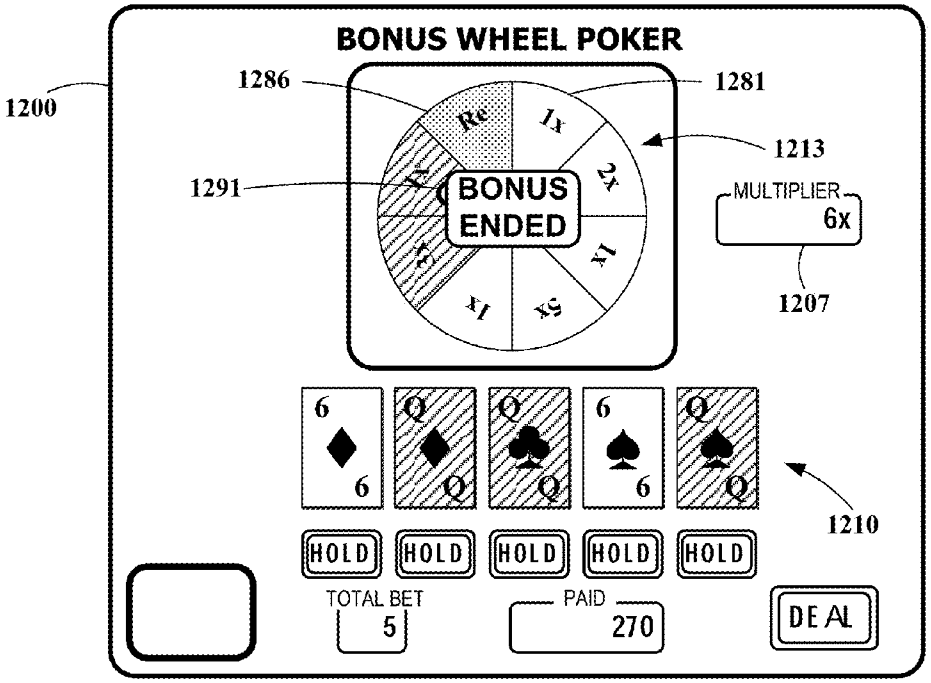

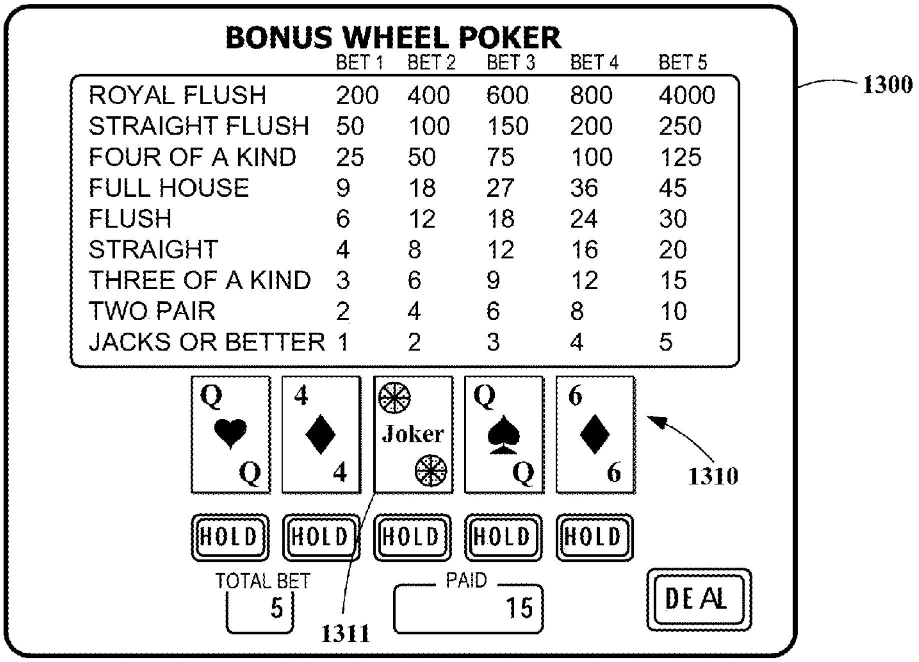
FIG. 13A
FIG. 13B
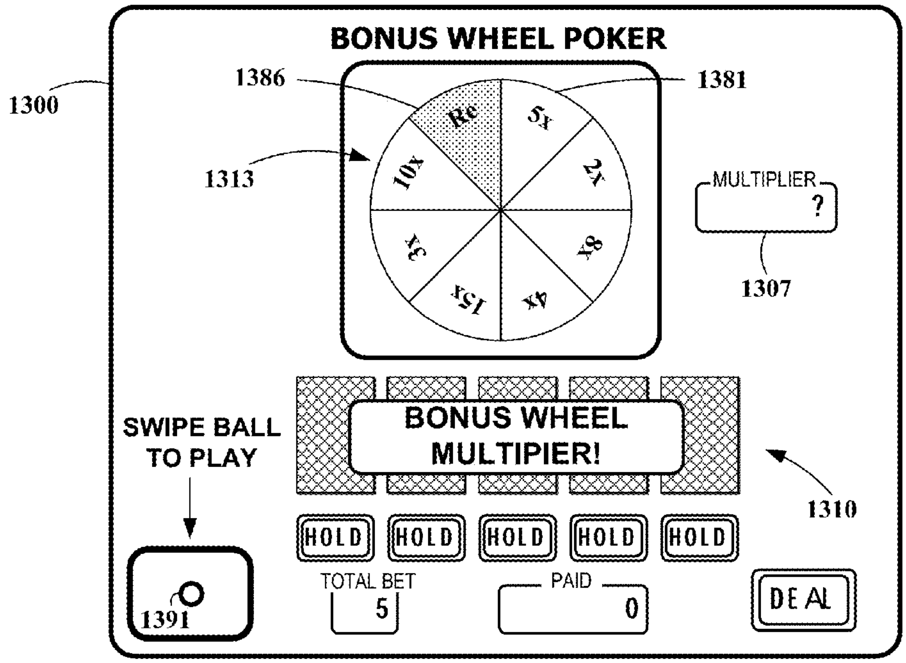

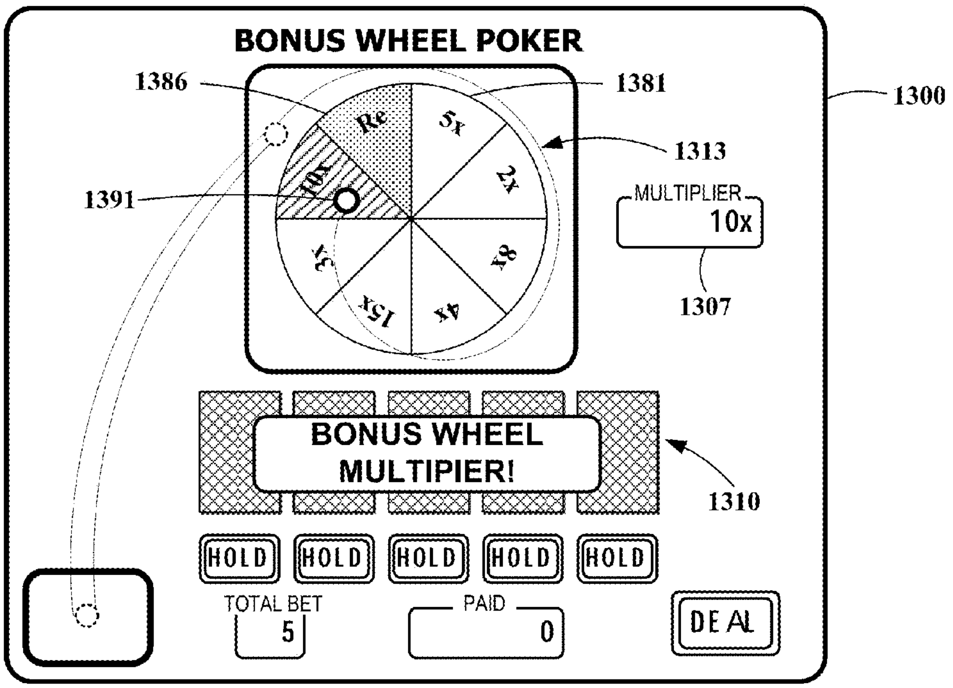
FIG. 13C
FIG. 13D
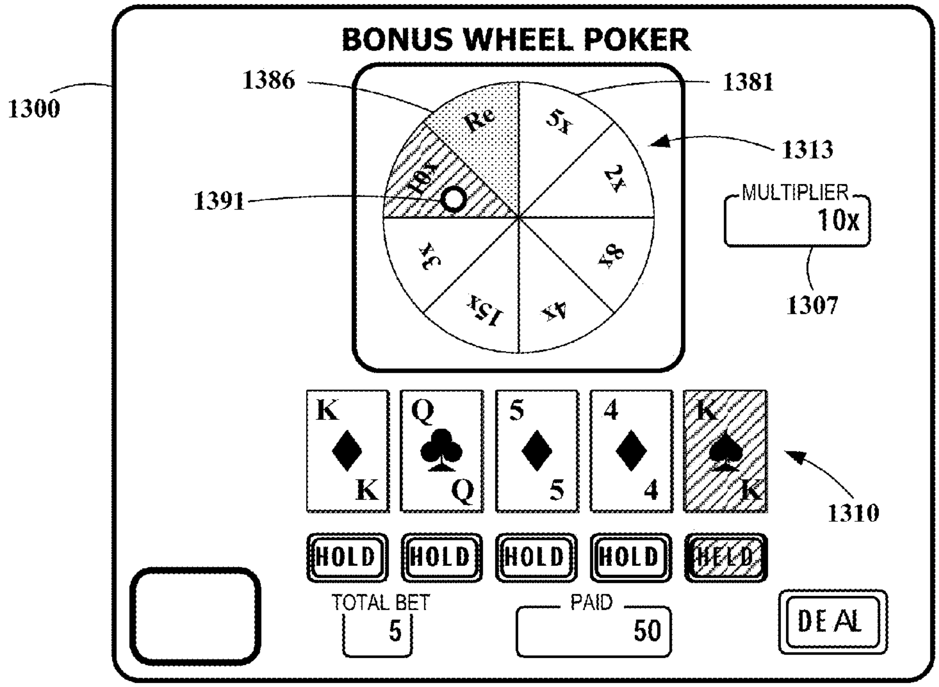

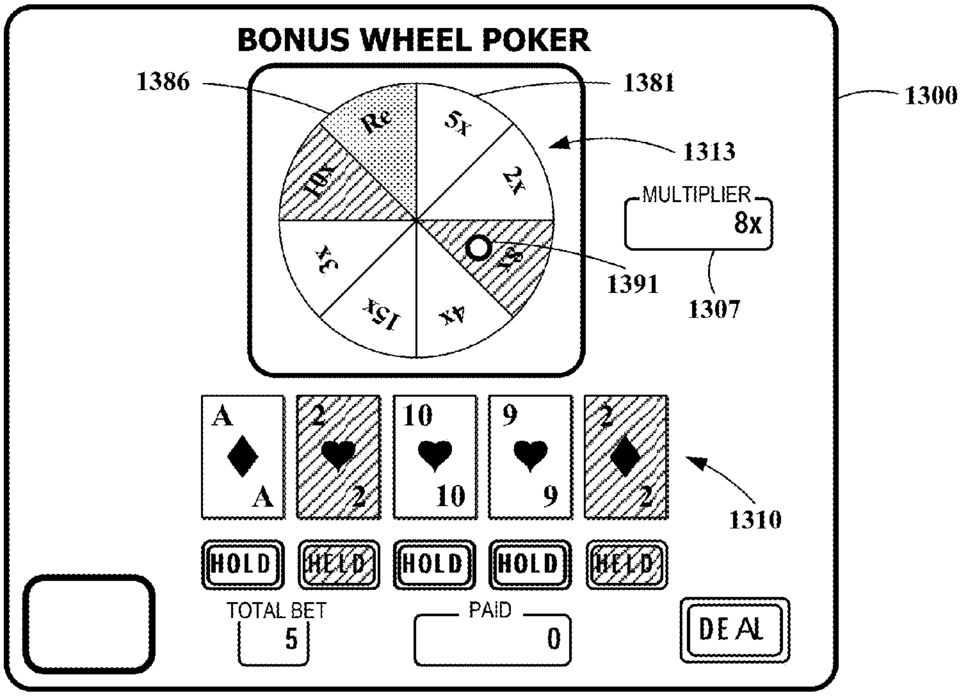
FIG. 13E
FIG. 13F
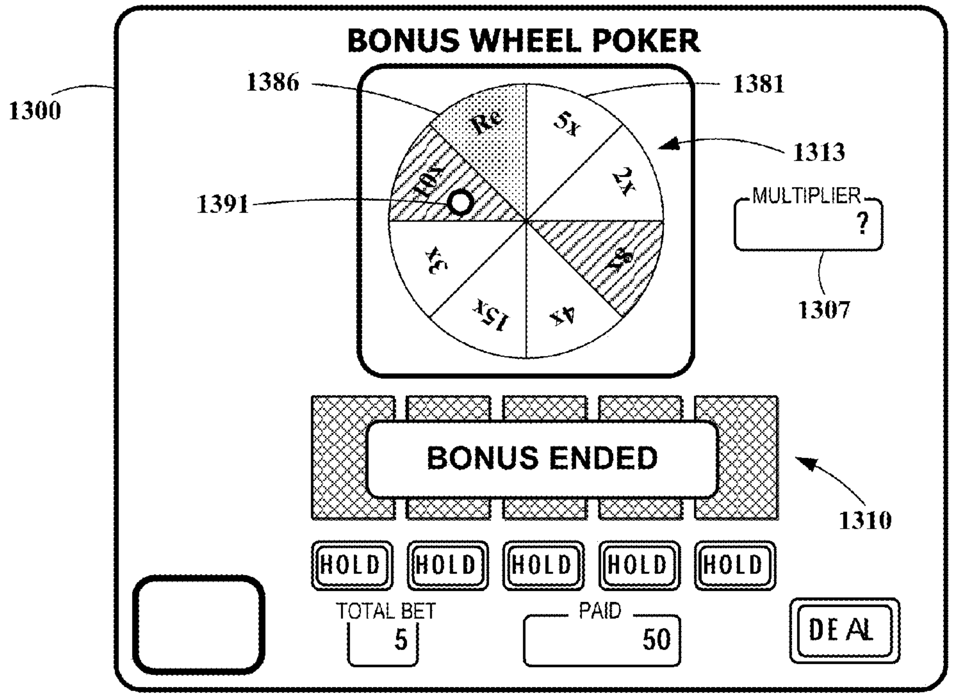

SYSTEMS, DEVICES, AND METHODS FOR ENHANCING GAMING EXPERIENCES

RELATED APPLICATIONS

This application claims the benefit of Provisional Patent Application No. 61/708,183, filed on Oct. 1, 2012, to which priority is claimed pursuant to 35 U.S.C. §119(e) and which is incorporated herein by reference in its entirety.

FIELD OF THE INVENTION

This disclosure relates generally to games, and more particularly to systems, devices, and methods for enhancing the game play experiences associated with gaming devices.

BACKGROUND

Casino games such as poker, slots, and craps have long been enjoyed as a means of entertainment. Almost any game of chance that can be played using traditional apparatus (e.g., cards, dice) can be simulated on a computer. The popularity of casino gambling with wagering continues to increase, as does recreational gambling such as non-wagering computer game gambling. It is also likely that most new games will be implemented, at least in part, using computerized apparatus.

One reason that casino games are widely implemented on computerized apparatus is that computerized games are highly adaptable, easily configurable and re-configurable, and require minimal supervision to operate. For example, the graphics and sounds included in such games can be easily modified to reflect popular subjects, such as movies and television shows.

Computer gaming devices can also be easily adapted to provide entirely new games of chance that might be difficult to implement using mechanical or discrete electronic circuits. Because of the ubiquity of computerized gaming machines, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill. In some jurisdictions, the absence of skill when determining awards during game play is a requirement.

The present disclosure describes methods, systems, and apparatus that provide for new and interesting gaming experiences, and that provide other advantages over the prior art.

SUMMARY

To overcome limitations in the prior art described above, and to overcome other limitations that will become apparent upon reading and understanding the present specification, embodiments of the present invention are directed to an apparatus, system, computer readable storage media, and/or method that involve or otherwise facilitate enhancing gaming experiences. In one embodiment, a gaming device can be configured to operate a gaming wheel having a plurality of sections. Each of the sections of the wheel includes a symbol mark and is associated with a section classification. Random selections of game wheel sections are made where selected sections associated with a first classification provide an award associated with the corresponding symbol mark and places a termination indicator in the selected section. Selected sections associated with a second classification clear one or more of the existing termination indicators, if any. Selections continue until a section associated with a termination indicator is selected.

BRIEF DESCRIPTION OF THE DRAWINGS

FIGS. 12A, 12B, 12C, 12D, 12E, and 12F are diagrams of a game display showing another example game progression according to embodiments of the invention.

FIGS. 13A, 13B, 13C, 13D, 13E, and 13F are diagrams of a game display showing another example game progression according to embodiments of the invention.

DETAILED DESCRIPTION

Figure 1:
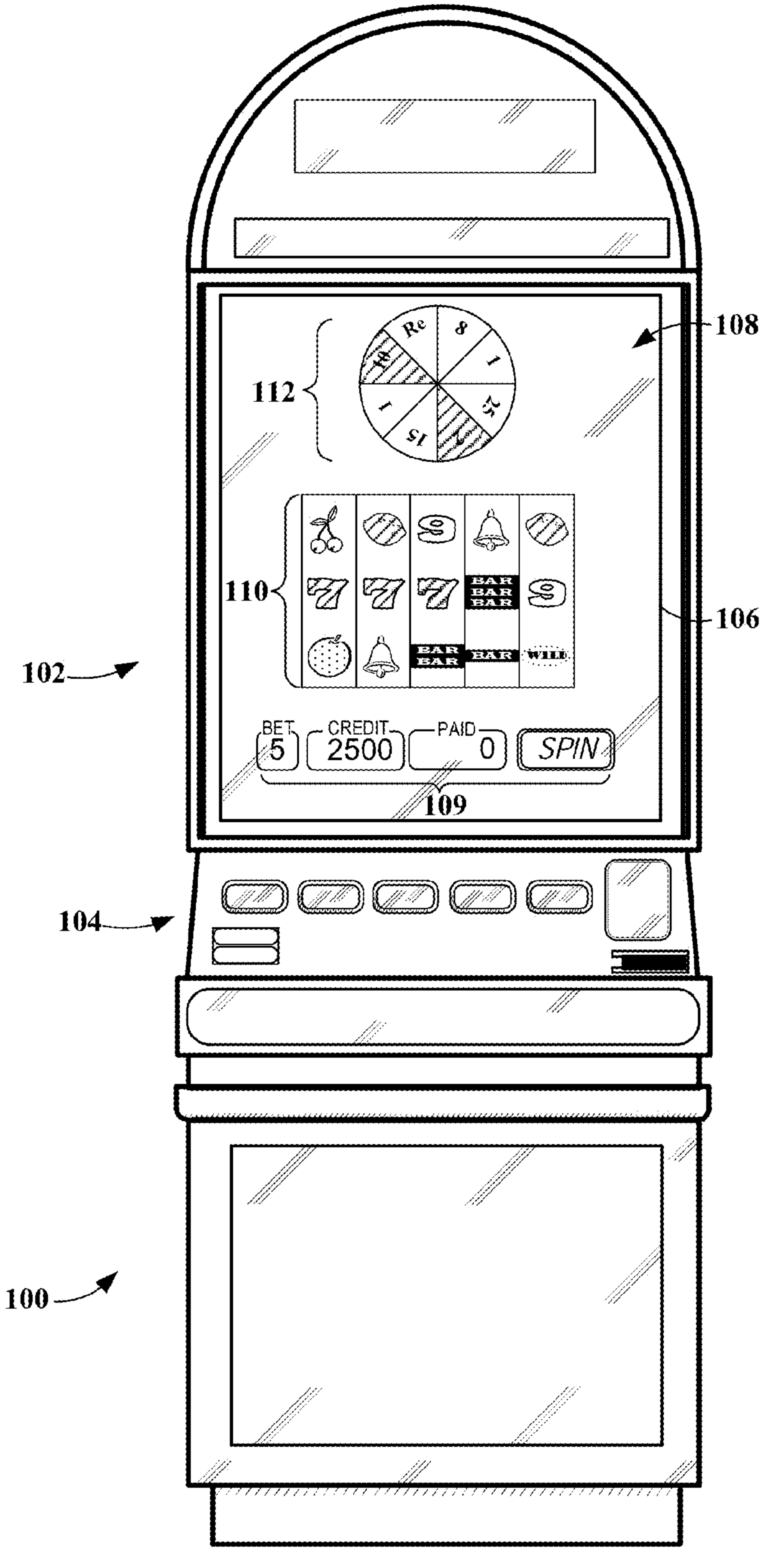
FIG. 1 is a diagram of a gaming machine according to embodiments of the invention.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the term "reels," "cards," "decks," and similar mechanically descriptive language may be used to describe various apparatus presentation features, as well as various actions occurring to those object (e.g., "spin," "draw," "hold," "bet"). Although the present disclosure may be applicable to both to manual, mechanical, and computerized embodiments, and any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms "cards," "decks," "reels," "hands," etc., are intended to describe both physical objects and emulation or simulations of those objects and their behaviors using electronic apparatus.

In various embodiments of the invention, the gaming displays are described in conjunction with the use of data in the form of "symbols." In the context of this disclosure, a "symbol" may generally refer at least to a collection of one or more arbitrary indicia or signs that have some conventional significance. In particular, the symbol represents values that can at least be used to determine whether to award a payout. A symbol may include numbers, letters, shapes, pictures, textures, colors, sounds, etc., and any combination therebetween. A win can be determined by comparing the symbol with another symbol. Generally, such comparisons can be performed via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

Generally, systems, apparatuses and methods are described for enhancing winning result opportunities in gaming activities. The systems, apparatuses and methods described herein may be implemented as a single game, or part of a multi-part game. For example, the game features described herein may be implemented in primary or base gaming activities, bonus games, side bet games, or other secondary games associated with a primary gaming activity. The game features may be implemented in stand-alone games, multi-player games, etc. Further, the disclosure may be applied to games of chance, and descriptions provided in the context of any representative game (e.g. slot games) are provided for purposes of facilitating an understanding of the features described herein. However, the principles described herein are equally applicable to any game of chance where an outcome(s) is determined for use in the player's gaming activity. The game features described herein may be employed in stand-alone games, a primary/base games, bonus games, side bet games, etc.

Embodiments involve identifying award-enhancing opportunities using an actual or virtual game wheel, and enabling repetition of such award-enhancing opportunities using the game wheel until a terminating event occurs.

For example, one representative method is used in connection with a gaming event, such as a slot game where payouts are provided for certain matching symbols in a symbol display grid. A game wheel having multiple sections is presented, and award-enhancing opportunities are identified in response to a selection of a section of the game wheel. The selection of the game wheel section may be random, or may follow a predefined selection order. The selection of sections may be shown by spinning the game wheel and having a fixed indicator or marker point to one of the sections after the wheel has ceased spinning. In other embodiments, the game wheel may remain stationary and an indicator or marker may encircle or otherwise move around the fixed sections, where the marker or indicator lands or otherwise stops moving on or over one of the sections of the game wheel. In yet other embodiments, both the game wheel and a marker/indicator may move. Additionally, multiple indicators or markers may be used to select multiple sections of the game wheel substantially simultaneously. Although the game wheel is shown below as being substantially circular, other shapes may be used in forming the game wheel. For example, triangle, squares, hexagons, octagons, etc. may be used as game wheels.

In some embodiments, the multiple selections of game wheel sections may be made sequentially corresponding to award-enhancing opportunities. Awards associated with these multiple selections may be combined or aggregated thereby providing increasing award-enhancing opportunities. These sequential selections may continue for a predetermined time, until a predetermined number of selections have been made, or until a terminating condition has been reached. In some embodiments, one or more sections of the bonus wheel may be associated with terminator indicators, where selection of such sections ends the sequence of selections. In some embodiments, the game wheel initially does not have any terminator indicators associated with the multiple sections of the game wheel. However, after a section is selected, a terminator indicator is then associated with that selected section. Hence, if that section is selected again the sequence of selections, the game sequence would end. In some of these embodiments, one or more sections of the game wheel may act to remove one, two, or all of the terminator indicators currently associated with sections of the game wheel. Here, sections that are associated with a removal or reset action may comprise one classification or type of section, while other sections may comprise a second classification or type of section. These variations are discussed below in more detail with reference to some of the embodiments shown in the drawings.

At least some of sections of the game wheel may include symbols or markings associated with award opportunities. These markings may include credit values, multipliers, numerical values associated with a table of pays, symbols associated with awards, or other types of game enhancing markings. Awards received from a selection of a game wheel section may be independently awarded on the gaming device, or may act to modify or enhance another pay. For example, if the game wheel is associated with a secondary or bonus game, awards received from the game wheel may be used to multiply, increase, or otherwise change an award received in a primary or base game. In another example, the game wheel may be part of a primary or base game where the awards received from section selections are directly added to a credit total or otherwise transferred or paid to a player.

As such, a representative method selects a game wheel section, and identifies a mathematical augmentation value in response to a marking presented on the selected section. Some number of repetitions of the section selections (e.g., "spins") and resulting mathematical augmentation value identifications are guaranteed. One example is to guarantee four free spins in a slot primary game, where each free spin is also associated with a selection of one of the game wheel sections and mathematical augmentation value identifications. In this embodiment, following the guaranteed number of repetitions of section selections and mathematical augmentation value identifications, conditional repetition of the game wheel section selections and mathematical augmentation value identification is provided until a triggering event occurs by way of the game wheel. Payout opportunities relative to the participation in the gaming event may be enhanced using the identified mathematical augmentation values.

Additionally, in some embodiments, a user or player selection of a section designation or other designation relating to the wheel sections may be made prior to, or during, the sequential selection of game wheel sections. For example, a player may be able to designate one or more of the sections as a bonus section, where if the bonus section is selected during the selection process, additional awards are received. In other examples, the player may be able to designate classes or types of sections, or other groupings of sections. These designations may be conditional on a side wager, on a particular type of initiating condition, or on other eligibility factors. Here, some designations may be available to certain users at a given instance while other possible designations may not be available based on conditions associated with the player/user or the game play preceding the selection process. In some embodiments, receiving a section selection of a game wheel section associated with a terminator reset or removal classification may also affect the player designation sections. For example, receiving a selection of "reset" section may remove all terminator indicators, but also remove a player designation of a section. The player or user may be able to make another designation or may play the rest of the selection sequence without a designated section or sections.

The systems, apparatuses and methods described herein may be implemented as a single game, or part of a multi-part game. For example, the games described herein may be implemented in a primary slot game, and/or in a bonus game(s) or other secondary games associated with a primary slot game. Thus, while various embodiments described herein may be described in terms of a bonus event of a gaming activity, it is equally applicable to main/primary gaming and other non-bonus events. The invention may be used as a stand-alone game, a primary/base game of a slot game, a bonus game of a slot game, etc.

Numerous variations are possible using these and other embodiments of the inventive concept. Some of these embodiments and variations are discussed below with reference to the drawings. However, many other embodiments and variations exist that are covered by the principles and scope of this concept. For example, although some of the embodiments discussed below involve reel-based slot machine examples of this concept, other embodiments include application of these inventive techniques in other types of poker games, slot games, or other games of chance. Some of these other types of embodiments will be discussed below as variations to the examples illustrated. However, many other types of games can implement similar techniques and fall within the scope of this inventive concept.

A representative embodiment for enhancing gaming opportunities is shown in FIG. 1. Referring to the example gaming apparatus 100 shown in FIG. 1, the gaming apparatus includes a display portion 102 (also referred to as a gaming display or display), and a player interface portion 104, although some or all of the user interface 104 may be provided via the display 102 in touch screen embodiments. The display portion 102 may include one or more display areas 106 that may be included in physically separate displays or as portions of a common large display. Here, the game display 106 includes a game play portion 108 that displays game elements and symbols 110 and 112, and an operations portion 109 that can include meters, various game buttons, or other game information for a player of the gaming device 100.

The user interface 104 allows the user to control and engage in play of the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, or any other user input system or mechanism that allows the user to play the particular gaming activity.

The user interface 104 may allow the user or player to enter coins, bills, or otherwise obtain credits through vouchers, tokens, credit cards, tickets, etc. Various mechanisms for entering such vouchers, tokens, credit cards, coins, tickets, etc. are known in the art. For example, coin/symbol input mechanisms, card readers, credit card readers, smart card readers, punch card readers, radio frequency identifier (RFID) readers, and other mechanisms may be used to enter wagers. It is through the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touch-screen, entering text, entering voice commands, or other known data entry methodology.

The display device 102 may include one or more of an electronic display, a mechanical display, and a fixed display information, such as paytable information associated with a glass/plastic panel on the gaming machine 100. The symbols or other indicia associated with the play of the game may be presented on an electronic display device or on mechanical devices associated with a mechanical display. Generally, the display 102 devotes the largest portion of viewable area to the primary gaming portion 108. The gaming portion 108 is generally where the visual feedback for any selected game is provided to the user. The gaming portion 108 may render graphical objects such as cards, slot reels, dice, animated characters, and any other gaming visual known in the art. The gaming portion 108 also typically informs players of the outcome of any particular event, including whether the event resulted in a win or loss.

In some of the example embodiments illustrated herein, the gaming portion 108 may display a grid (or equivalent arrangement) showing a portions of multiple game reels 110 each having a plurality of game elements or symbols. The grid may include paylines outlining combination of reel stop locations (portions corresponding to the rows and columns of the grid, or equivalent arrangements) that are evaluated during game play to determine winning combinations. Other types of winning events may occur, such as scatter pays or multi-way pays, as well. In other embodiments, various other arrangement of slot symbols, cards in a poker game, or other arrangements used to facilitate a primary base game may be used in the gaming portion 108.

The gaming portion 108 also includes a secondary display portion 112 that may be used to display a secondary gaming element, such as a game wheel. In some embodiments, the secondary game elements may be displayed in a physically separate display unit, or may be displayed in the same area as the primary game 110.

The display portion 106 may include other features known in the art that facilitate gaming, such as status and control portion 109. As is generally known in the art, this portion 109 provides information about current bets, current wins, remaining credits, etc. associated with gaming activities of the grid 108. The control portion 109 may also provide touchscreen controls for facilitating game play. The grid 108 may also include touchscreen features, such as facilitating selection of individual reels or game symbols, or for otherwise interacting with gaming events. The gaming portion 106 of the display 102 may include other features that are not shown, such as paytables, navigation controls, etc.

The game display 102 of FIG. 1 shows a reel-based slot game 110 and a game wheel 112 used in a secondary game. However, in other embodiments the game wheel 112 may be part of the primary/base game. Although a slot game 110 is shown in this embodiment, other games of chance may be used as primary games, such as video poker, keno games, or any other type of game where wagers may be placed on an outcome of the game.

Example game progressions, flow diagrams, and device illustrations are provided below to facilitate understanding of some of the features associated with this inventive concept. However, certain details have been omitted in some of the game play descriptions to avoid obscuring the features of this inventive concept. Additionally, while some embodiments may only show some of the discussed features, any of the embodiments can be arranged to include these other features, or variations associated with the features and elements of this concept.

FIGS. 2A-2H illustrate an example game progression according to embodiments of the invention. These figures include a diagram of a gaming display 200 of a gaming device. The display 200 shown in this example progression has been simplified to focus on features of enhancing gaming experiences. For example, this progression may be part of a primary or base game, or may be part of a secondary or bonus event associated with a primary game that is not shown.

Referring to FIGS. 2A-2H, a game display 200 includes a win meter 206 showing a current award, a total meter showing an aggregated award, and a user interface button 204 that may be used to facilitate play of the game. Here, the game display includes a game wheel 212 having multiple sections 280, 285. Here, some of the sections 280 include numerical values associated with win amounts, while other of the sections 285 relate to play features associated with the game wheel. Here, section 285 is associated with a "reset" action that removes all termination indicators that have accumulated during game play. A section indicator (or "marker") 290 is presented on the display 200 to that a user can activate it in order to receive a wheel section selection. In the game associated with this embodiment, a player activates the marker 290 or presses the interface button 204 to generate a random selection of a wheel section. A player may activate the marker 290 by placing a finger over it on the display 200 and swiping their finger to simulate throwing or rolling the marker 290.

Figure 2A:
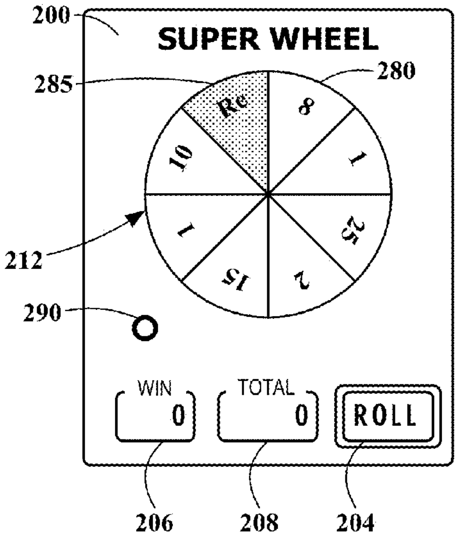
FIGS. 2A, 2B, 2C, 2D, 2E, 2F, 2G, and 2H are diagrams of a game display showing an example game progression according to embodiments of the invention.
Figure 2B:
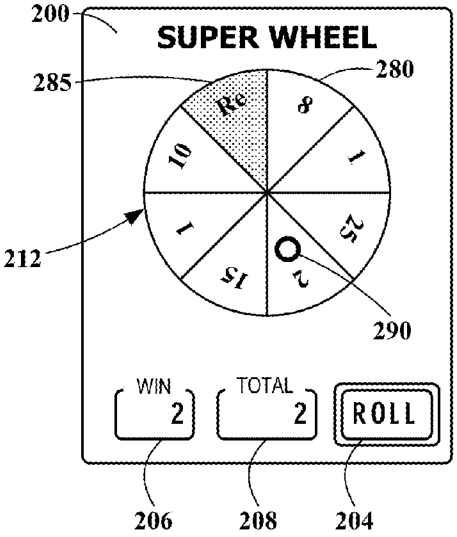

Regardless of how the marker 290 is activated, activation of the marker causes a section of the game wheel 212 to be randomly selected. Here, both the game wheel 212 spins and the marker 290 travels over the game wheel, where the marker comes to rest on one of the sections of the game wheel, which also stops rotating. A result of such an activation is shown in FIG. 2B, where the marker 290 has come to rest on the wheel section 280 having a "2" mark. The random selection of this section may be made prior to the marker and wheel actually coming to rest, but an animation may continue after this selection to build player anticipation. Here, as shown on the win meter 206 and total meter 208, the player has won 2 credits; that is, the amount shown by the marking on the selected wheel section 280.

Figure 2C:
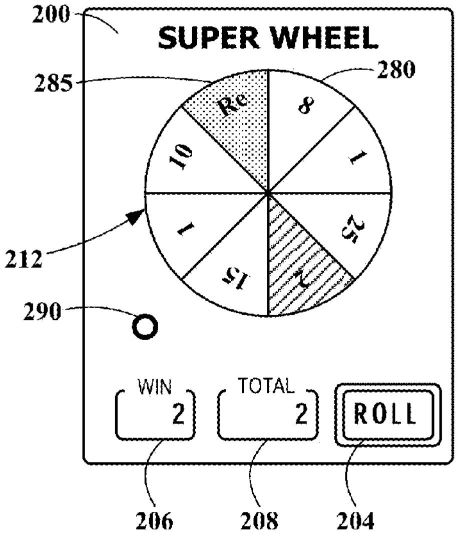

Referring to FIG. 2C, after the wheel section 280 associated with the "2" marking has been selected, the appearance of the selected section changes to indicate that it is now associated with a terminator. This change of appearance may be a terminator indicator, which lets the player know that a selection of that wheel section 280 again will result in the game ending. Here, the marker 290 is again placed to the side of the game wheel 212 to wait for a player to activate it. In some embodiments, the marker 290 may automatically activate itself between selection stages. This automatic activation may occur if a player does not re-activate the marker 290 in a predetermined amount of time, or may re-activate the marker without giving the player an ability to re-activate the marker.

Figure 2D:
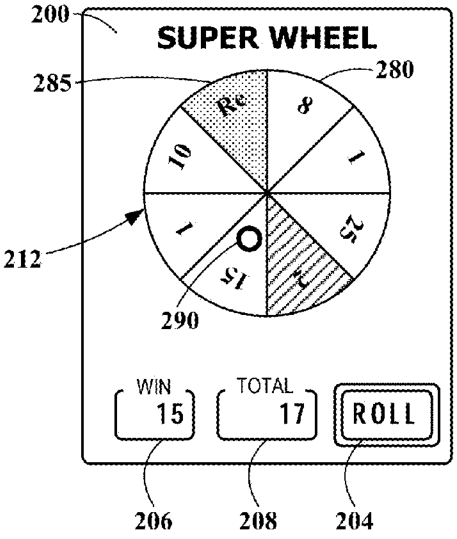
Figure 2E:
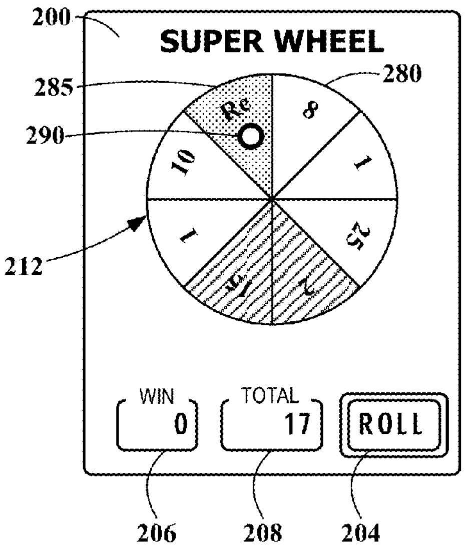
Figure 2F:
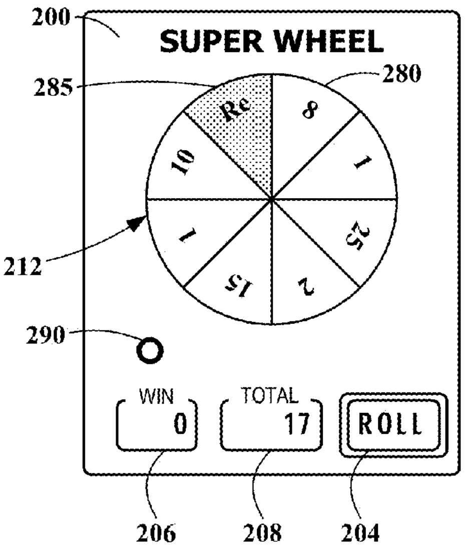

As shown in FIG. 2D, the player has reactivated the marker 290, which has come to rest on the randomly selected section. Here, the selected section is associated with an award of 15 credits. The win and total meters 206, 208 are updated to reflect this win and, as shown in FIG. 2E, the selected section associated with the "15" marking now includes a termination indicator. FIG. 2E also illustrates the result of the next activation of the marker 290. In this instance, the marker has landed on the reset section 285 of the game wheel 212. Although the reset section 285 is not associated with a particular award in this embodiment, it does remove all of the termination indicators that are currently present on the game wheel 212. Hence, as shown in FIG. 2F, the shading or coloration indicating terminators on the wheel sections 280 associated with the "2" and "15" markings has been removed.

Figure 2G:
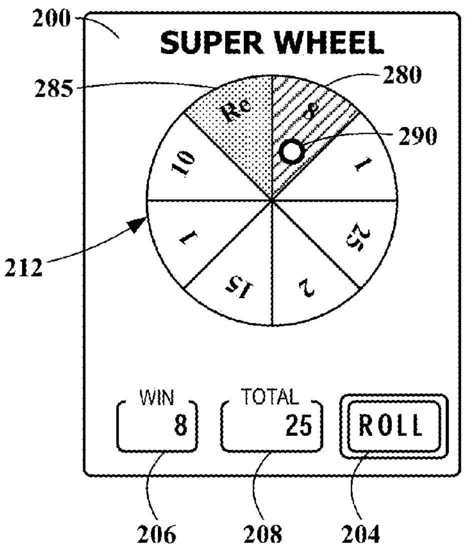
Figure 2H:
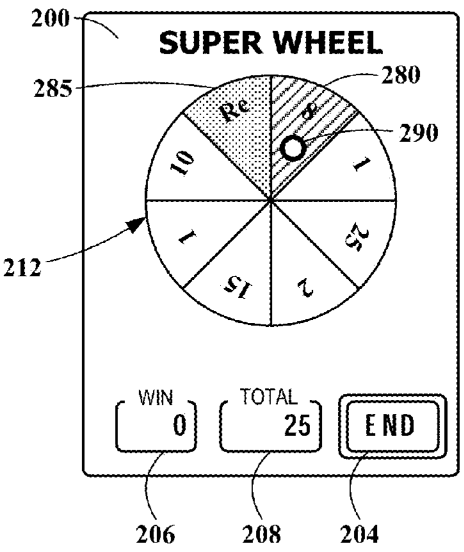

Referring to FIG. 2G, the marker 290 has been activated again and the wheel section 280 associated with the "8" marking is randomly selected. This selected section is marked with the terminator indicator, and awards associated with the selected section are added to the win total shown in the total meter 208. In FIG. 2 H, the player has again activated the marker 290, and the wheel section 280 associated with the "8" marking has again been selected. Since this wheel section 280 includes a termination indicator, the game now ends. The 25 credits won during the game may be added to a base game award amount if the wheel game is a secondary or bonus game, or the amount may be directly awarded to the player if the wheel game is the primary or base game of the gaming device.

Figure 3:
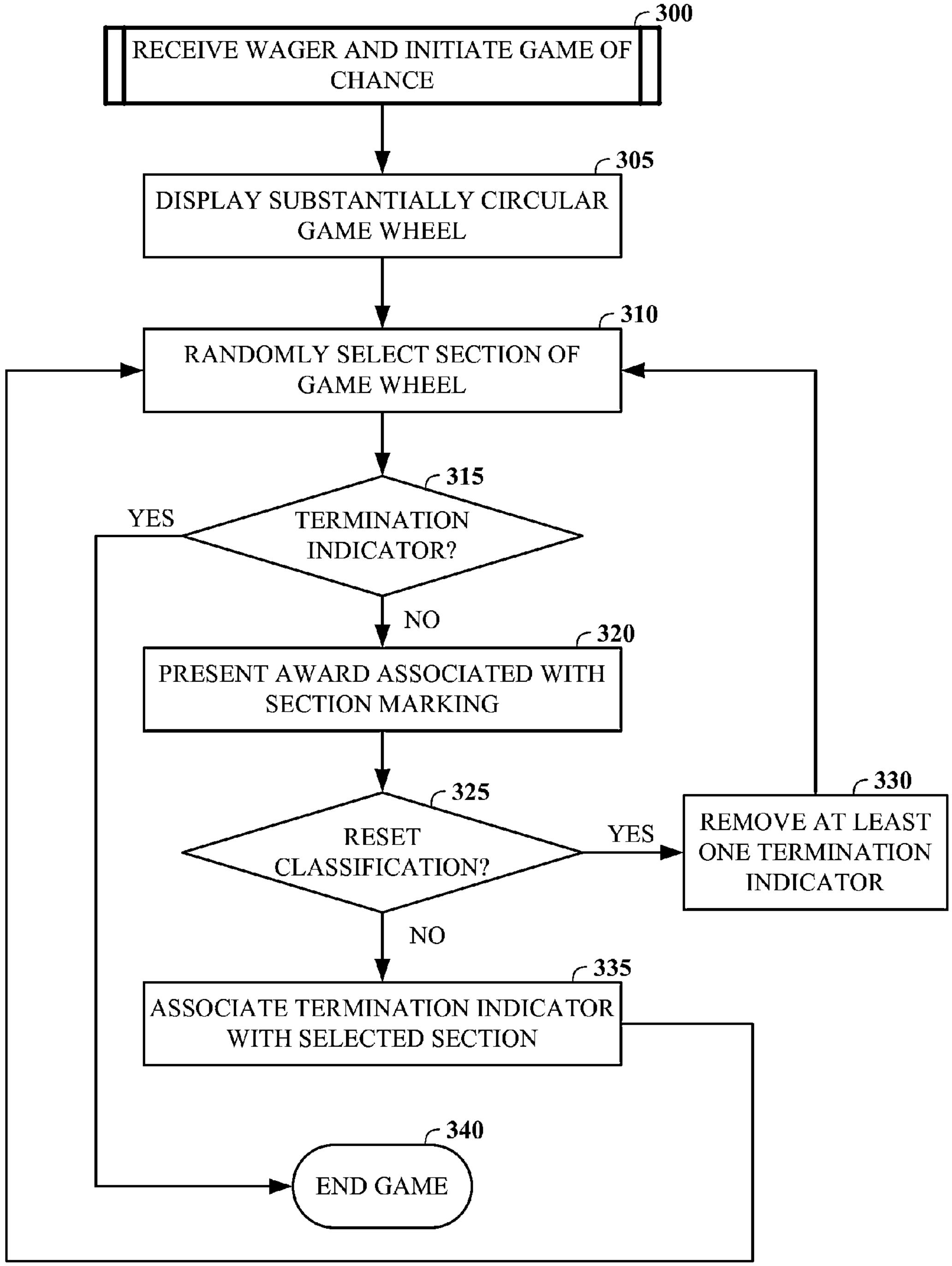
FIG. 3 is a flow diagram of a method of operating a gaming device to enhance gaming experiences according to embodiments of the invention.

FIG. 3 is a flow diagram that illustrates a method of operating a gaming device to enhance gaming experience according to embodiments of the invention. Although various processes are shown in a particular order in this flow diagram, the order of these processes can be changed in other embodiments without deviating from the scope or spirit of this concept. Hence, the order of the processes shown is for illustrative purposes only and is not meant to be restrictive. Additional game processes may also be included between various processes even though they are not shown in these flow diagrams for clarity purposes. Further each of the processes may be performed by components in a single game device, such as by a game processor, or may be performed in part or whole by a remote server or processor connected to the gaming device via a network. Each process may encode in instructions that are stored in a memory, a computer-readable medium, or another type of storage device.

Note that this example method is just one embodiment of how a game operation can be implemented. As discussed and shown above, many variations exist which may require additional, less, or different processes to complete.

Referring to FIG. 3, the method begins by receiving a wager and signal to initiate a game of chance in process 300. This initiation process 300 may include initiating a base game, where a secondary game is separately initiated based on a result of the base game or based on another triggering condition. In other embodiments, the initiation process 300 may simply include direct initiation of the following game processes. In process 305, a substantially circular game wheel having multiple sections is displayed. The sections of the game wheel may be classified in two or more classifications. For example, one class of wheel sections may be associated with award values, one class of wheel sections may be associated with multiplier values, and one class of wheel sections may be associated with removing or resetting termination indicators. These separate classifications may be indicated by shading or coloring the sections associated with the different classifications differently, or otherwise providing graphical and/or auditory differences between the different classes of wheel sections.

In process 310, one of the sections of the game wheel is randomly selected. The flow then proceeds to process 315, where it is determined if the selected section includes or is otherwise associated with a terminator indicator. If it is determined that the selected section is associated with a termination indicator in process 315, the flow proceeds to process 340 where the game is ended. Any awards accumulated during the game may be aggregated and presented to the player at the end of the game in process 340. In other embodiments, awards may be aggregated as the game progresses, and the player is presented with the total aggregation of awards at the end of the game in process 340.

Returning to process 315, if it is determined that the selected section is not associated with a termination indicator, the method flow continues to process 320 where any awards associated with the selected section are presented. Here, the awards may be reflected in markings or symbols indicated on the wheel sections. In some embodiments, the markings on the wheel segments are looked up in a paytable to determine an award to be presented. In other embodiments, the awards may include modifier-based awards, such as multipliers or other mathematically modifying symbols. In yet other embodiments, actual items may be associated with symbols on the game wheel. For example, if three motorcycles appear on the game wheel, and all three motorcycle symbols are randomly selected in a row, a player may be presented with an actual motorcycle.

In process 325, it is determined if the selected section is associated with a reset (or removal) classification. If the selected section is classified as a reset section, the flow continues to process 330 where at least one termination indicator is removed. In some embodiments, all presently shown termination indictors are removed in process 330. In other embodiments, one of the termination indicators is randomly removed from a game wheel section. In yet other embodiments, both the amount of termination indicators and the location of said indicators are randomly selected to be removed. Thus, for example, one, two, three, or more indicators could be removed in process 330. After removing the termination indicators in process 330, the flow returns to process 310, where a section of the game wheel is randomly selected.

If it is determined in process 325 that a selected section is not classified as a reset section, the flow continues to process 335, where the selected section is associated with a termination indicator. Here, the selected section may be shaded, colored, or otherwise marked as including a termination indicator. In other embodiments, such as embodiments where the game wheel is a mechanical wheel, a list of sections associated with termination indicators may be maintained, such that the physical appearance of the wheel section associated with the termination indicator is not altered. After the selected section is associated with a termination indicator in process 335, the flow proceeds back to process 310 where another random determination is made to select one of the game wheel sections. This process may continue until a termination indicator is associated with a selected section. In other embodiments, other termination conditions may also end a game. For example, a player may only receive a predetermined number of game wheel section selections. In other embodiments, game modifications may help end the game more quickly. For example, a reset section may be removed or changed into a regular section without the ability to reset or remove termination indicators.

Figure 4:
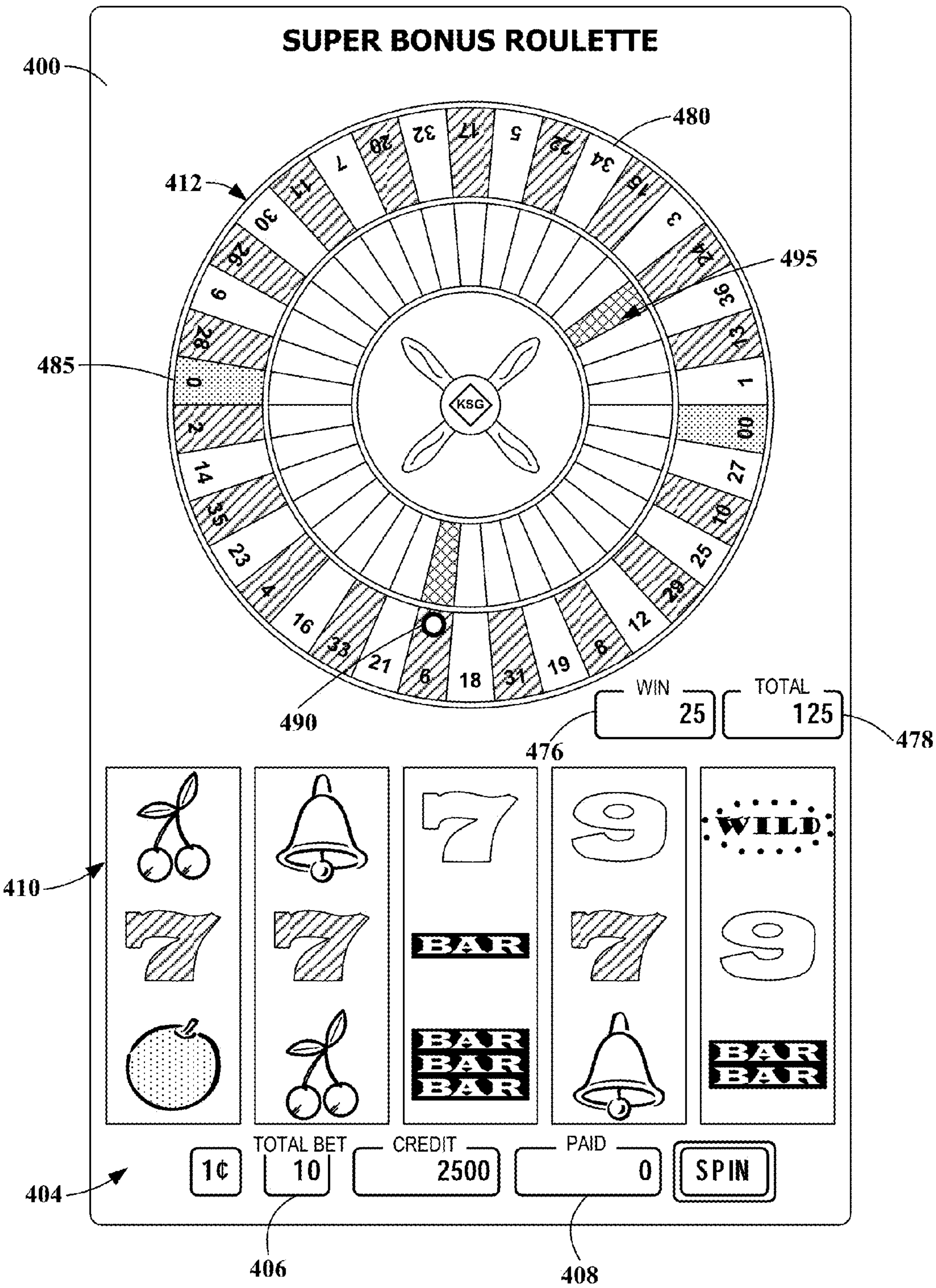
FIG. 4 is a diagram of a game display showing game features used to enhance gaming experiences according to embodiments of the invention.

FIG. 4 is a diagram of a game display showing game features used to enhance gaming experiences according to embodiments of the invention. Referring to FIG. 4, a game display 400 includes a primary game portion 410, a secondary game portion having a bonus wheel 412, and an operations portion 404 that can include meters 406, 408, various game buttons, or other game information for a player of the gaming device. The primary game portion 410 in this embodiment includes five game reels that are spun to show three symbols each. Combination of symbols may be evaluated on the primary game portion to determine awards associated with primary game outcomes.

The secondary game portion includes a roulette wheel as a bonus wheel 412, a win meter 476, and total meter 478. The secondary game portion may show other graphics during regular play of the primary or base game, and only show the bonus wheel 412 and meters 476, 478 when a secondary game is triggered. The roulette wheel 412 shown in this embodiment is an American-styled wheel that includes 36 numbered sections (1-36) that are either red or black (black is shaded with lines in this figure while red is not shaded) and two green sections, "0" and "00" (shown in dotted shading). In other embodiments, a European-style wheel may be used with a single "0" green section and no "00" section, or any other type of roulette-styled wheel may be used.

In this embodiment, a ball marker 490 is activated by a player and the bonus wheel 412 is spun with the ball marker coming to rest (or landing) in a randomly selected section of the bonus wheel. If the ball marker 490 lands in any section other than the green section(s), an award associated with the numerical value of the selected section is awarded in the win meter 476, and a termination indicator 495 is associated with the selected section. For the embodiment shown in FIG. 4, an award table is as follows in Table 1:

TABLE 1

| | Section Marking | | | | |
|---|---|---|---|---|---|
| | 1-6 | 7-12 | 13-18 | 19-24 | 25-36 |
| Credit Award | 25 | 50 | 75 | 100 | 125 |

Although Table 1 illustrates one award paytable, various other award tables, or other award association methods are possible.

After a section is selected a termination indicator 495 is associated with the selected section. In the embodiment, shown in FIG. 4, a lower portion of the selected wheel section is shaded or colored to show the termination indicator. However, in other embodiments, the red or black portion of the selected section may turn to a different color, such as grey or orange. In other embodiments, a symbol or other marking may be placed or associated with the selected section to indicate that a termination indicator has been associated with the section.

In this embodiment, the green sections 485 are categorized in a different class from the rest of the numbered black and red sections. That is, the green sections 485 are classified as reset sections that remove all of the termination indicators 495 when they are randomly selected as the sections where the ball marker 490 lands.

In a game operation method related to the embodiment shown in FIG. 4, the method may begin by when signals transmitted from the player input device to place a wager on a game are received. When such signals are received, a base game portion of the game may be initiated by manipulating game elements having game symbols on the display 410. It may then be determined whether a triggering condition for a secondary game has been satisfied, and executing a secondary game when the triggering condition has been satisfied. The secondary game may include displaying a substantially circular bonus wheel 412 having a plurality of sections 480, 485, each section including a numerical mark and including a coloration of one of red, black, or green. A ball marker 490 may be activated by a player to encircle the plurality of sections 480, 485 on the bonus wheel 412. Once the marker is activated, a gaming processor may randomly select one of the sections 480, 485 of the bonus wheel 412 for the ball marker 490 to land. An award associated with the numerical mark corresponding to the selected section of the bonus wheel may then be presented to the player.

The selected section of the bonus wheel 412 may then be marked with a termination indicator 495. A player may continue to reactivate the ball marker 490 to encircle the plurality of sections 480, 485 on the bonus wheel 412, where one of the sections of the bonus wheel is randomly selected for the ball marker to land until a selection section is associated with a termination indicator 495. Here, characteristics of the randomly selected section of the bonus wheel 412 may be determined, where the determined characteristics cause the game processor to end the secondary game when the randomly selected section is determined to include a termination indicator 495. On the other hand, when the determined characteristics of the selected section indicate that the selected section includes green coloration (the "0" and/or "00" wheel sections) all termination indicators 495 may be removed from the plurality of sections.

The secondary game may continue to progress through multiple plays where the ball marker is reactivate, and one of the bonus wheel sections is randomly selected until a selected section includes a termination indicator. When a termination indicator is received (i.e., a selected section is associated with a termination indicator), the awards associated with the base game portion and secondary game may be aggregated and presented to the player.

FIG. 4 illustrates one example embodiment that utilizes a wheel 412 to facilitate a game feature. As described above, the wheel may be similar to a roulette wheel (as shown in FIG. 4), or may be any other of wheel with feature indicia or other markings (such as shown in FIG. 1. As discussed above, the wheel may be used in any of the manners described herein, where the structure of the wheel is utilized to enhance gaming experiences. For example, in some embodiments, when a bonus is triggered, a player is presented the opportunity to spin the wheel, and/or throw a roulette ball into the wheel until a selected portion or section of the wheel is indicated as a game event outcome. In FIG. 4, a roulette ball is used as a section marker, and is activated or "thrown" by the player into the bonus roulette wheel. Depending on the embodiment, the player may be awarded credits, multipliers, free spins/rolls, or any type of known prize. The player may continue to throw the roulette ball (or spin a bonus wheel) until they land on a bonus ending section (e.g., a section of the wheel that is associated with a termination indicator), or the bonus ends based on another condition being satisfied (e.g., reaching a predefined number of spins, etc.).

In another embodiment, a bonus event utilizing the wheel may include the processes of allowing the player to throw the ball (or spin the wheel), determine an event outcome, award a pay based on the event outcome from a paytable, and add the corresponding number (from the roulette wheel) to a list of rolls. In some embodiments, if the current roll equals a number on the list then the bonus ends. Here, when the current outcome is a clear number, then the previous rolls list is cleared. In other embodiments, once a number has been reached once, it is added to the list of rolls and if that number is reached again, the bonus ends.

Figure 5:
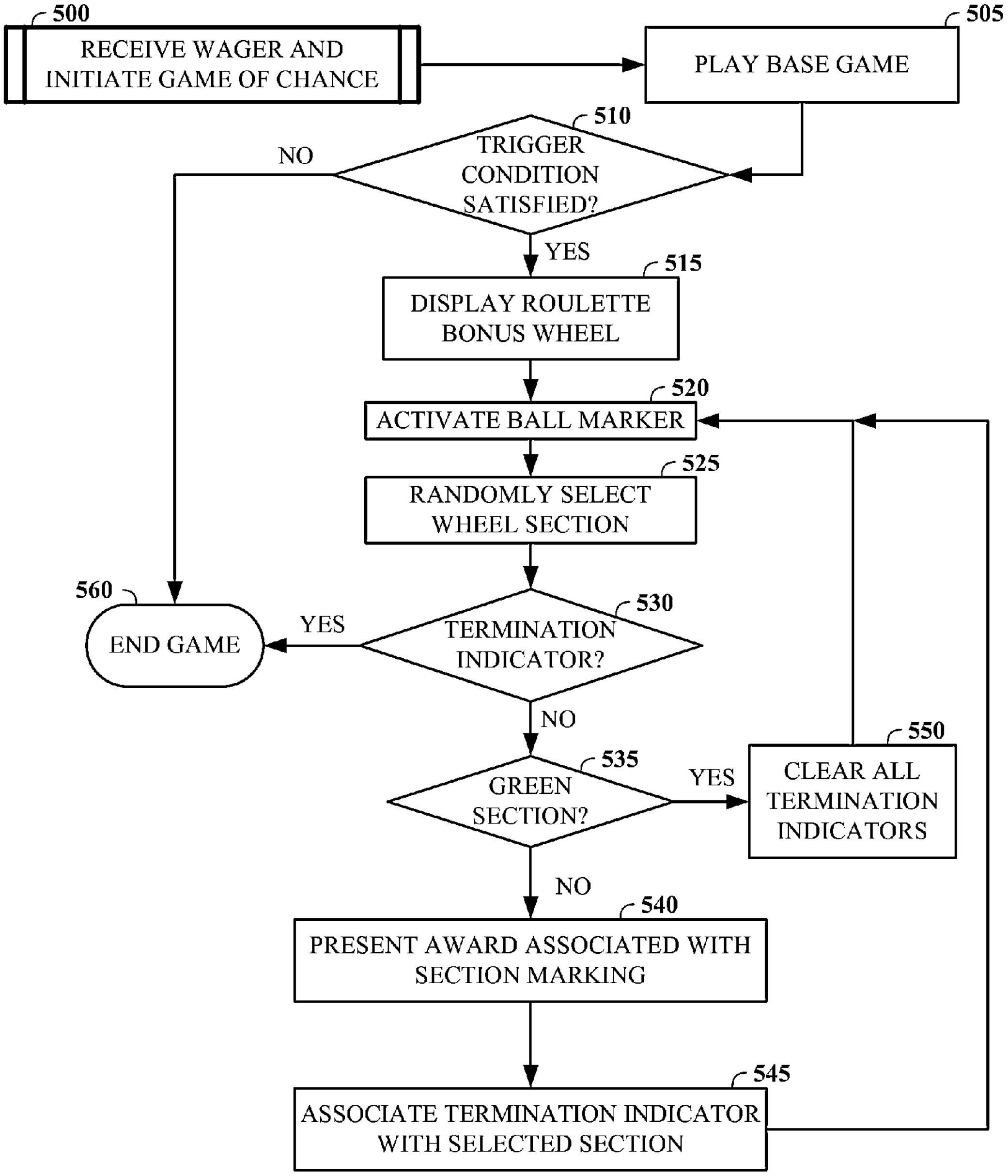
FIG. 5 is a flow diagram of another method of operating a gaming device to enhance gaming experiences according to embodiments of the invention.

FIG. 5 illustrates a flow diagram of a method of operating a gaming device having a roulette-style wheel as a bonus wheel is a secondary game according to embodiments of the invention. Here, the method begins at process 500 where a wager is received and a game of chance is initiated. The method proceeds to process 505 where a base game, such as slot game is played. It is then determined in process 510 whether a trigger condition is satisfied. The trigger condition may relate to an outcome of the base game in process 505, such as a predetermined symbol combination appearing during the base game, or the trigger condition may be a mystery trigger condition, where it is determined independently of the base game outcome (such as randomly selecting a number in a range and triggering the bonus when the randomly selected number is a number in a predetermined portion of the range). If the trigger condition is not satisfied, the game simply ends in process 560 where any awards associated with the base game outcome are presented.

If it is determined that a trigger condition has been satisfied in process 510, the game flow proceeds to process 515 where the roulette bonus wheel is displayed. A ball marker is activated by a player touching and swiping the ball indicia on the game display or pressing a button on the player interface portion of the game device in process 520. A wheel section is randomly selected in process 525 and the characteristics of the selected wheel section are analyzed. Here, the analysis includes determining if the selected section is associated with a termination indicator in process 530 and determining (if the selected section is not associated with a termination indicator) if the selected section is the green (or one of the green) reset sections of the bonus roulette wheel in process 535.

If it is determined that the selected section is associated with a termination indicator, the flow proceeds from process 530 to the process 560 where the game ends and any awards received in the secondary bonus wheel game are aggregated with awards received in the base game, or awards received in the secondary bonus wheel game modify awards received in the base game. If it is determined that the selected section is a green section (or any section associated with a class of sections that remove or clear termination indicators) in process 5835, the flow continues to process 550 where some or all of the termination indicators are cleared and the secondary bonus game continues at process 520 where the ball marker is activated.

If the selected section is not associated with a green section in process 535, the flow proceeds to process 540 where an award associated with the section marking is presented and a termination indicator is associated with the selected section, which is completed in process 545. The flow returns from process 545 to process 520 where the secondary bonus continues when the ball marker is again activated.

Figure 6A:
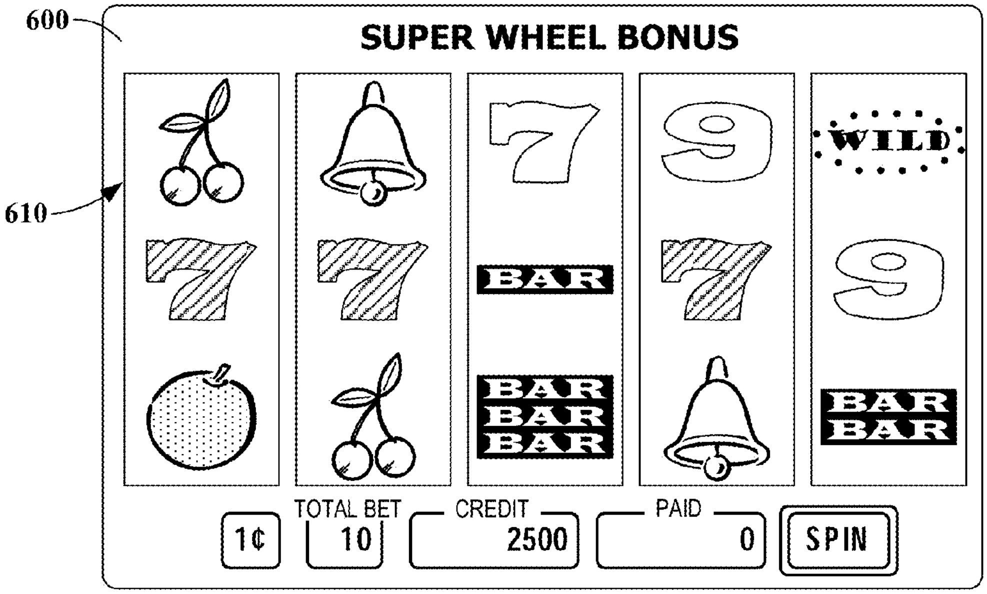
FIGS. 6A, 6B, 6C, 6D, 6E, 6F, 6G, and 6H are diagrams of a game display showing another example game progression according to embodiments of the invention.
Figure 6B:
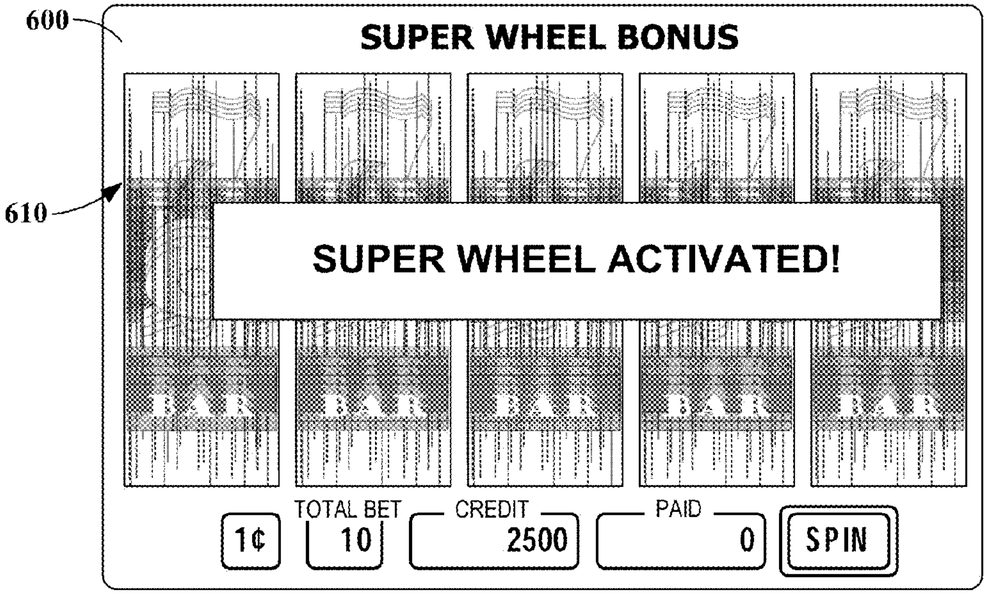

FIGS. 6A-6H illustrated another game progression that utilizes different gaming experience enhancing features according to embodiments of the invention. In these embodiments, a secondary feature is triggered during play of a base game where the result of the secondary feature modifies or influences the awards of the primary or base game when it is finally displayed. Referring to FIGS. 6A-6H, a base game related to a spinning reel slot game is shown. In FIG. 6A, a gaming display 600 includes the game reels 610 of the primary game prior to activation of the base or primary game. In FIG. 6B, the base game is initiated and the reels 610 are spun. During the spinning of the reels 610 a determination is made to see whether a secondary game is triggered. This may be done in relation to a determined outcome of the primary game (prior to the display of the primary game outcome), or based on a mystery or "lucky coin" bonus trigger. In any case, the secondary bonus is triggered as shown in FIG. 6B.

Figure 6C:
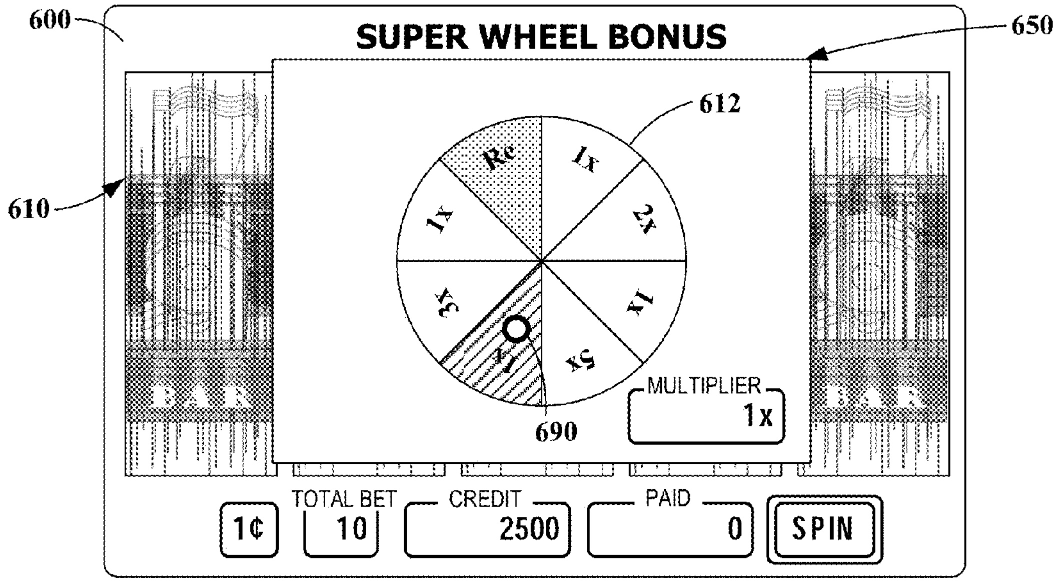

When the secondary bonus game is triggered, a window 650 over the base game reels 610 may be opened to show a secondary bonus wheel 612, as shown in FIG. 6C. Alternatively, another portion of the display 600, or a completely separate display, may be used to show a secondary bonus wheel 612. Referring to FIG. 6C, a bonus wheel includes multiple sections with multiplier value markings and at least one section with a reset classification. A marker is activated to land in a randomly selected section, which as shown in FIG. 6C results in this instance in a "1×" multiplier. The selected section is then marked or otherwise shown to include a termination indicator.

Figure 6D:
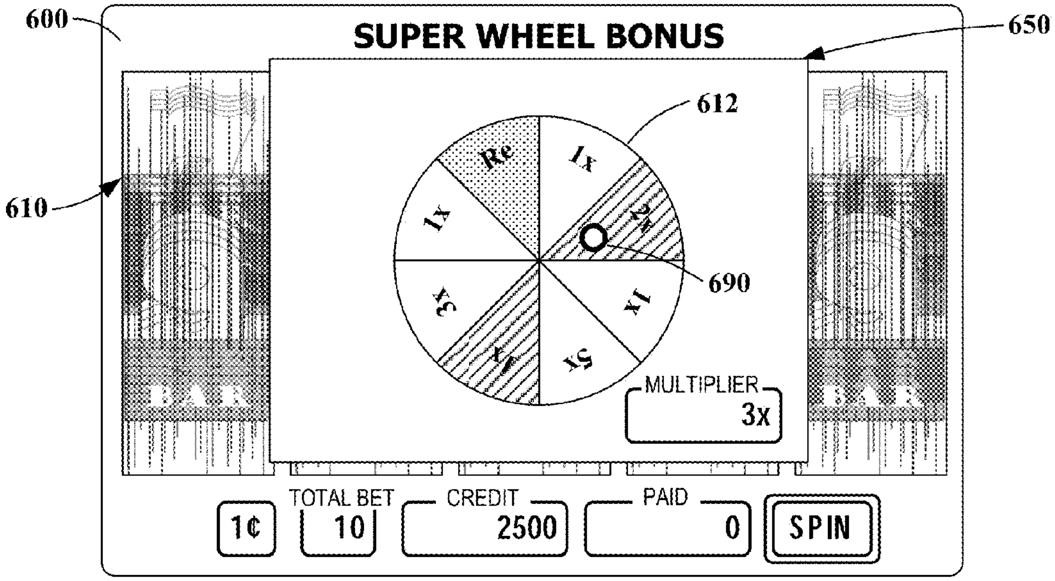
Figure 6E:
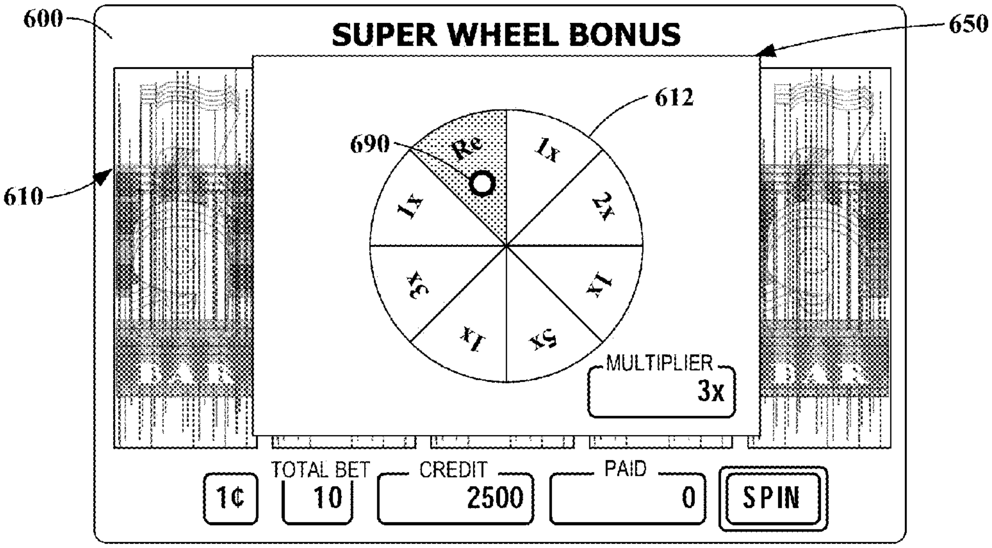
Figure 6F:
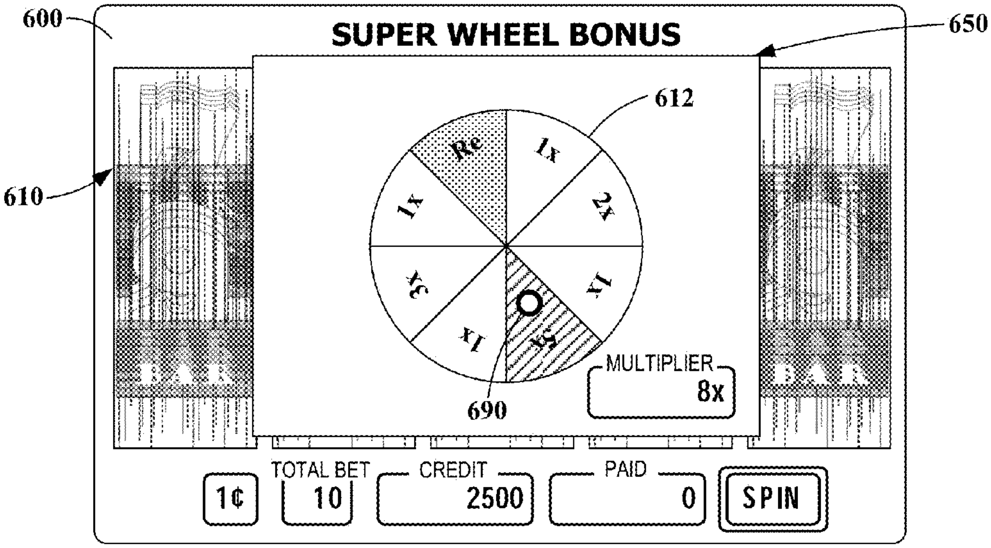

Another section is selected as shown in FIG. 6D, where the newly selected section is associated with a "3×" multiplier. The second selected section is also marked to show it is now associated with a termination indicator. In FIG. 6E, the reset section is selected, which removes all of the termination indicators in a similar manner as discussed above. In FIG. 6F, another section is selected as the ball marker 690 is shown to have landed in the selected section. This time, the selected section is associated with a "5×" multiplier which is aggregated or added to the existing multiplier sum for the secondary bonus. The selected section associated with the "5×" marking is then associated with a termination indicator.

Figure 6G:
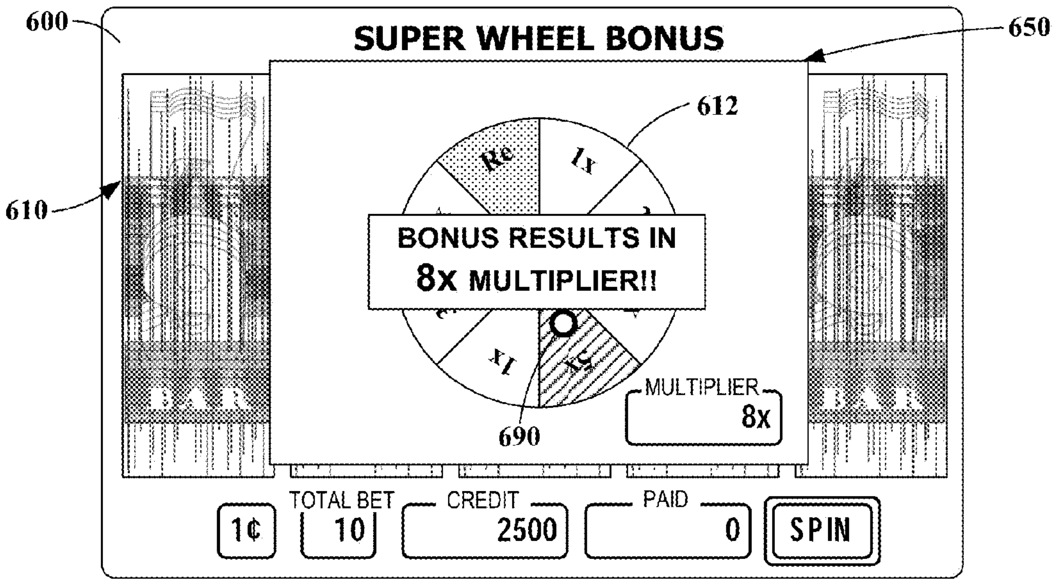
Figure 6H:
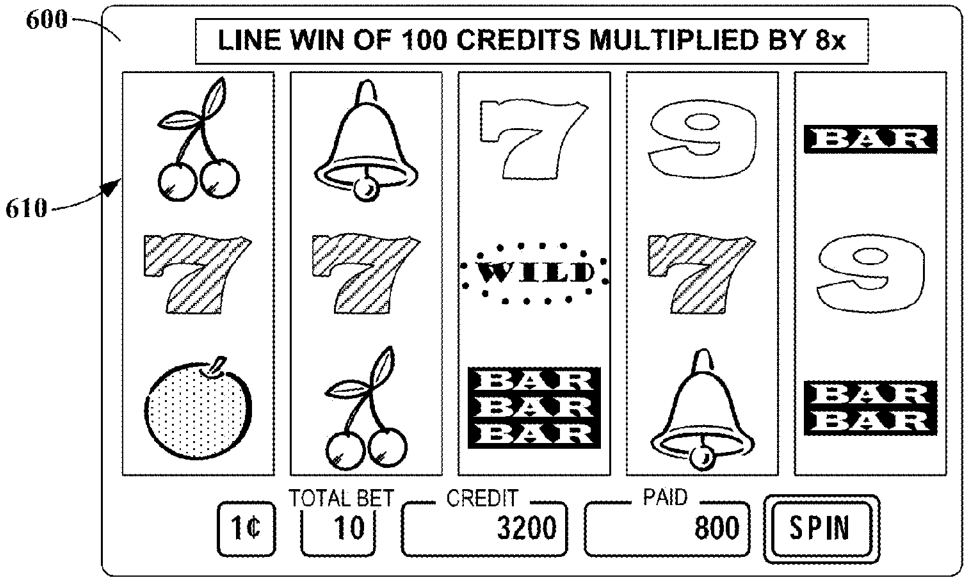

In FIG. 6G, the "5×" section is selected again resulting in the end to the secondary game. The result of the secondary game is displayed, which in this case is a total of an "8×" multiplier. During the secondary game, the reels of the primary game 610 continue to spin as the outcome to the primary game is unknown to the player. After the completion of the secondary game, however, the player is informed that any award on the primary or base game will now be multiplied by the result of the secondary game, which in this case is "8×." This may heighten the anticipation of the player, and cause additional intrigue in the result of the primary or base game. As shown in FIG. 6H, the reels 610 of the primary game now come to rest to show an outcome associated with the primary game. In this instance, a pay of four black 7's exists on a middle payline (7-7-Wild-7). The normal award of 100 credits associated with this symbol combination is then multiplied by the result of the secondary game, which in this example is "8×." Thus, the award amount present to the player is eight times any win on the base game or eight times 100 credits for a total of 800 credits. In other embodiments, only a highest paying symbol combination award may be modified by the result of the secondary game. In yet other embodiments, if no base game awards are present, a consolation prize may be given to the player since the multiplier or modifier won in the secondary game is not helpful in modifying an award of zero.

Figure 7A:
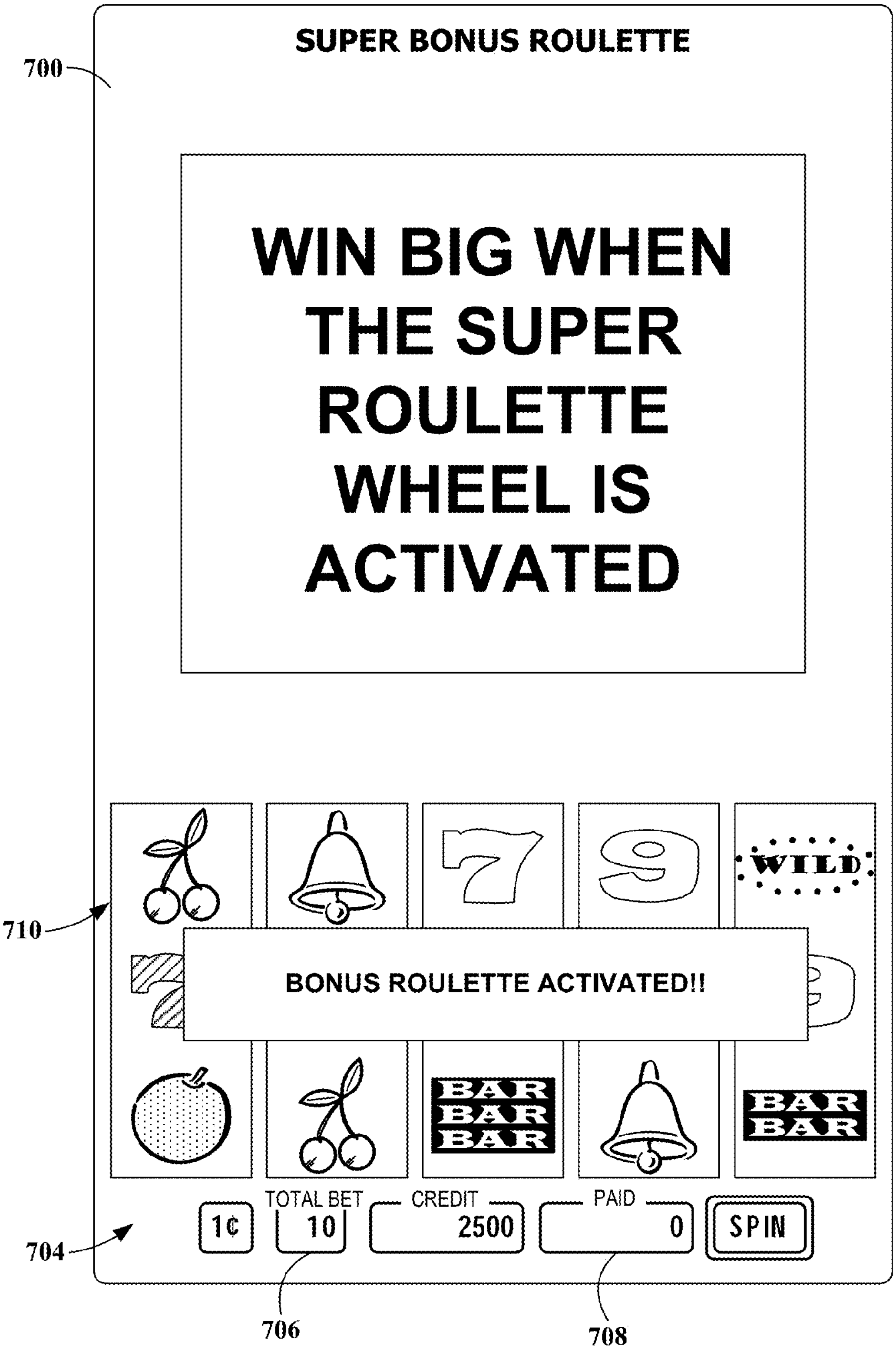
FIGS. 7A, 7B, and 7C are diagrams of a game display showing yet another example game progression according to embodiments of the invention.
Figure 7B:
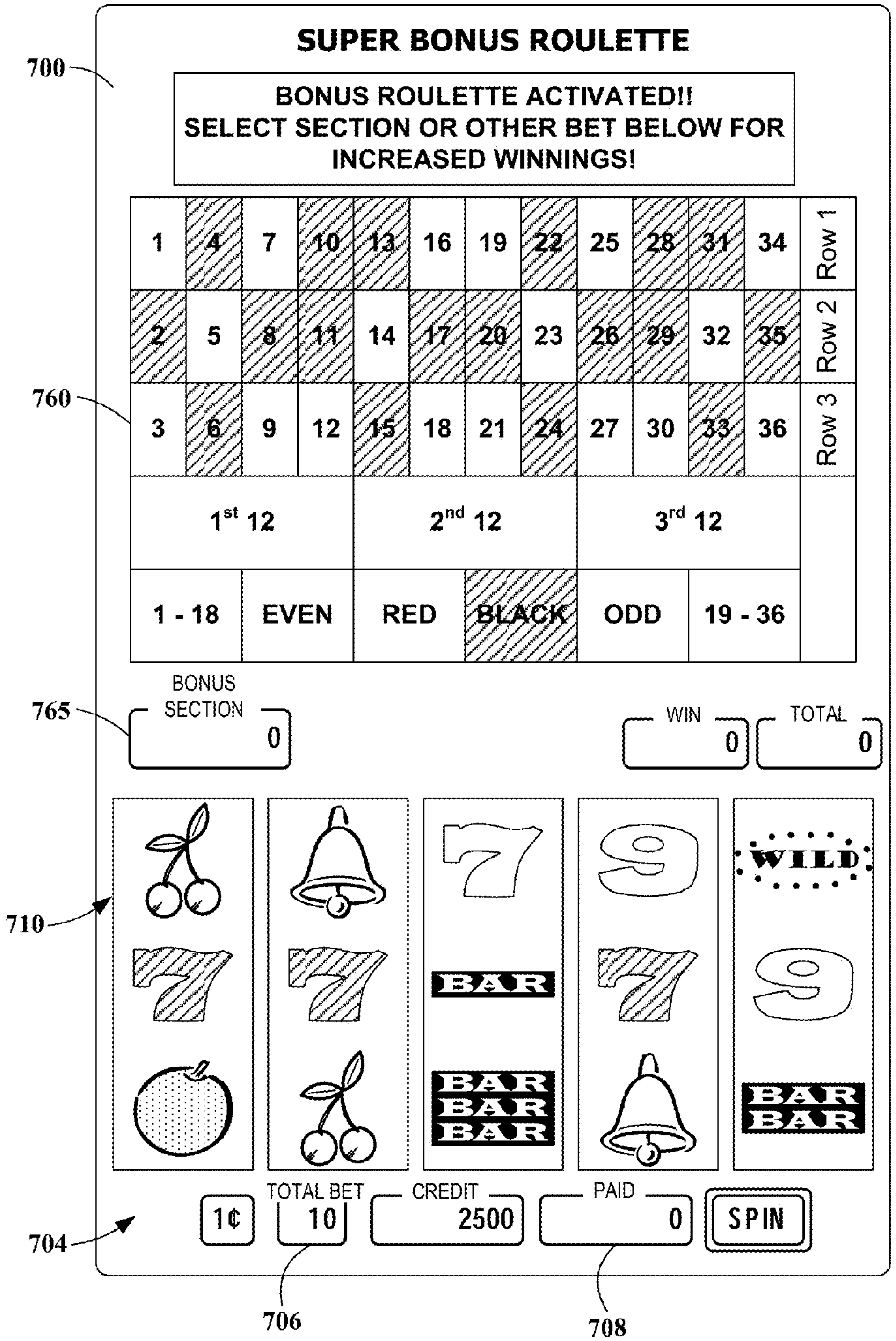
Figure 7C:
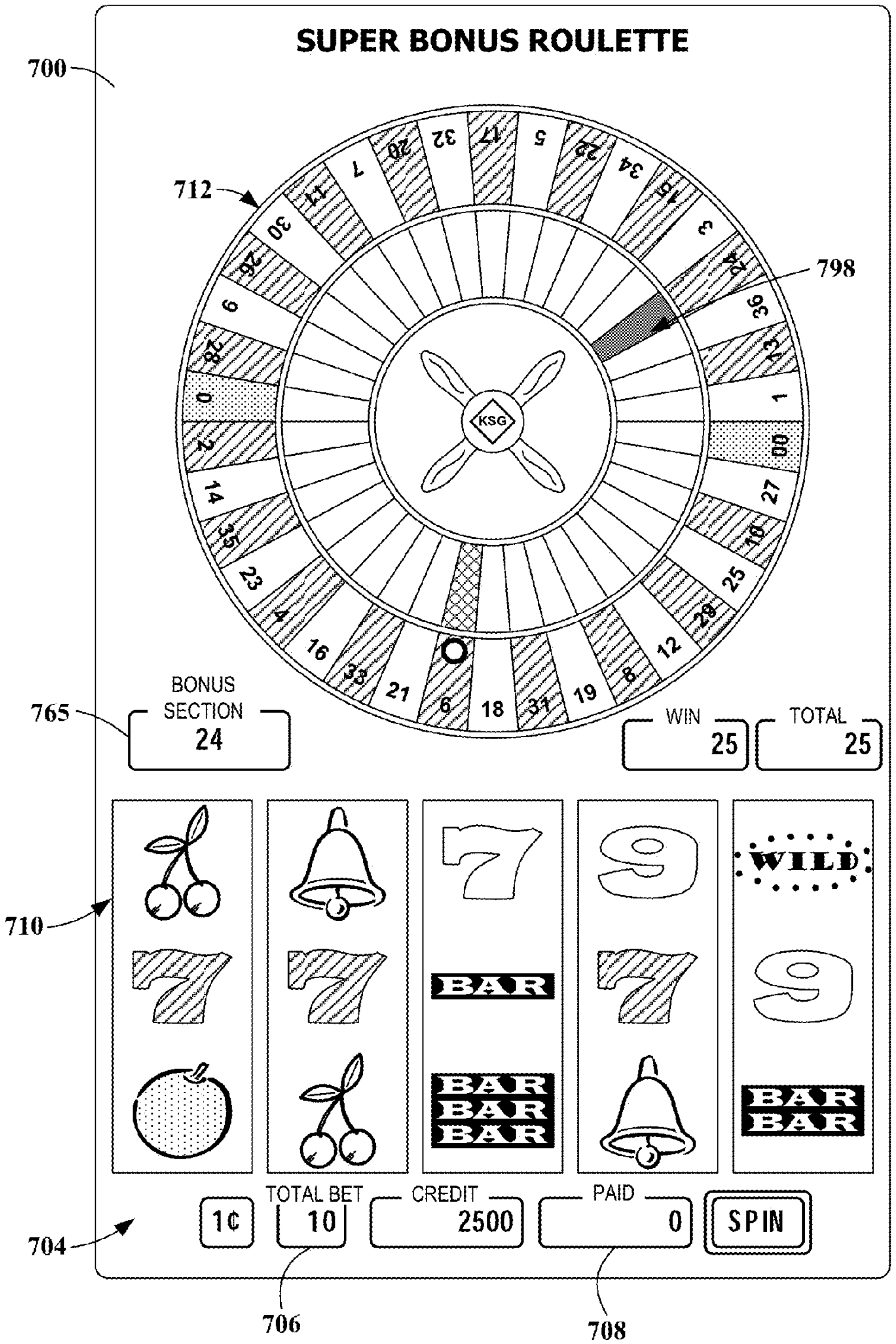

FIGS. 7A-7C show another embodiment where the player is allowed to designate a portion of the bonus wheel prior to play of the secondary game, where the designated portion of the bonus wheel is associated with a bonus award if it is selected during play of the secondary game. As shown in FIG. 7A, a secondary bonus game is activated during play of a primary base game played on game reels 710 shown on a game display 700. An operations portion 704 is also included on the game display 700, where the operations portion can include meters 706, 708, various game buttons, or other game information for a player of the gaming device.

After a secondary game has been activated, a player is allowed to designate one of the bonus wheel sections, or a group of bonus wheel sections prior to play of the secondary bonus game. In the embodiment shown in FIGS. 7A-7C, a roulette wheel is used as a bonus wheel, and the player is allowed to make a roulette wager on one or more sections of the roulette wheel, where if the player-designated section is selected during the secondary bonus, the player earns additional bonus awards. As shown in FIG. 7B, the player is presented with a roulette wager table 760. The player is allowed to select one of the wheel sections (i.e., sections 1-36), a group of wheel sections (e.g., Row 1, Row 2, Row 3, $1^{st}$ 12, $2^{nd}$ 12, $3^{rd}$ 12, 1-18, 19-36, Even numbers, Odd numbers, Red numbers, or Black numbers, corners, columns, etc.). In some embodiments, only some of these wagers are available. In other embodiments, the wagers available to the player depend on the status of the player (i.e., player club member, large previous wagers, etc.), or on a criteria associated with the triggering condition (e.g., did a 3 symbol or 4 symbol combination result in the triggering of the secondary bonus game).

The additional bonus selection may require a side bet or additional wager by the player, the amount of which may depend on the selection made by the player. For example, the player may be allowed to place a 1 credit bet on any single section selection with a 5:1 pay, or place a 3 credit bet on a Row Bet or $3^{rd}$ of the field bet with a 2:1 pay, or place a 5 credit bet on any of the split bets (color, high, low, even, odd) with a 1.5:1 pay. The bonus amounts received when a selected section matches a designated bonus section may depend on the type of designation made. For example, a selection of one of the split bets may result in a an additional 5 credits awarded to the total, while a selection of a single wheel section may result in a "3×" multiplier being used to triple the total awards from the secondary game. Many different variations in bet types and rules surrounding the availability, placement, or awards associated with the designated sections exist. As shown in FIG. 7C, a roulette bonus wheel 712 is displayed during a secondary bonus game where the designated section 798 is highlighted or otherwise indicated during play of the secondary game, and a bonus selection meter 765 also shows a player designated section or sections.

Figure 8:
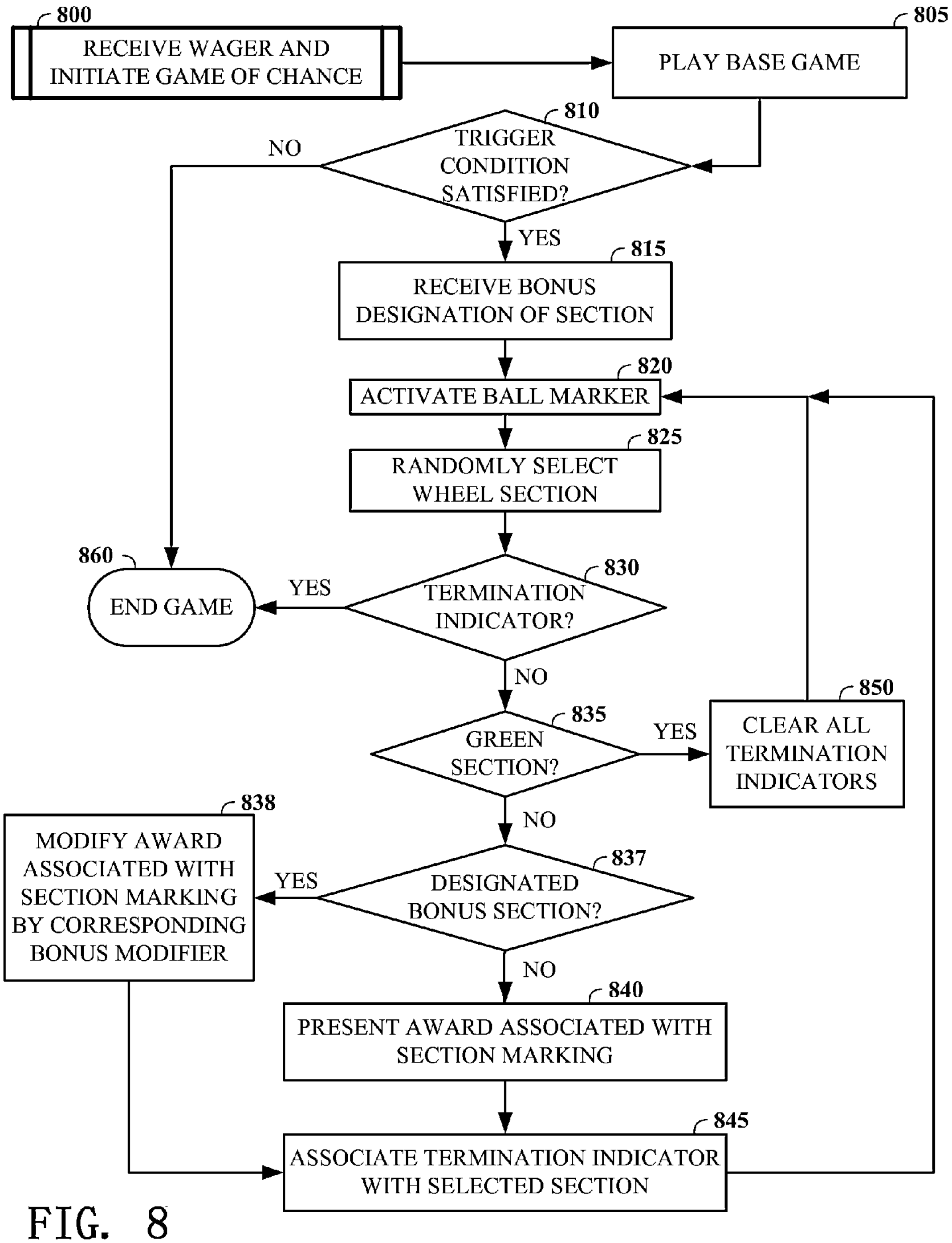
FIG. 8 is a flow diagram of another method of operating a gaming device to enhance gaming experiences according to embodiments of the invention.

FIG. 8 is a flow diagram that illustrates a method similar to the one shown in FIG. 5 with the addition of a player designated game wheel section. Referring to FIG. 8, the method begins at process 800 where a wager is received and game of chance is initiated. In process 805, a base game is played. In process 810, it is determined whether a trigger condition for the secondary bonus game is satisfied. If it is not satisfied, the flow progresses to process 860 where the game ends and any awards accumulated in the primary/base game are presented.

If the trigger condition is satisfied in process 810, the flow progresses to process 815 where a designated bonus section is identified. The bonus section designation may be facilitated in process 815 by having the player designate one of the multiple bonus wheel sections, or receiving a side bet on a particular section being selected during the course of the secondary bonus game. In one embodiment utilizing a roulette-style bonus wheel, the player may select either black or red. Then the secondary game progresses until a termination indicator is associated with a selected section. Afterwards, the number of red sections and the number of black sections received during the secondary bonus are tallied and if the player selected the color corresponding to the color selected more often during the secondary bonus, an additional award is presented. In another embodiment, a player may get bonus credits each time a section corresponding to the designated color is selected. In yet other embodiments, a player can specify a particular section and may receive a 3× multiplier if that section is selected during the secondary bonus.

In process 820, a ball marker is activated by a player causing one of the wheel sections to be randomly selected in process 825. In process 830 it is determined whether the selected section is associated with a termination indicator, where the method proceeds to process 860 and the game ends if a termination indicator is received. Alternatively, the flow continues to process 835 where it is determined if the selected section is a green (or reset) section. If the selected section is a green section, the flow progresses to process 850 where all termination indicators are cleared and the flow proceeds back to process 820 where the game waits for the player to activate the ball marker.

If the selected section is not a reset section as determined in process 835, the flow proceeds to process 837 where it is determined if the selected section is a designated bonus section (as designated in process 815). If the selected section is a designated bonus section, the process progresses to process 838 where the award associated with the section marking is modified by a corresponding bonus modifier. Here, the bonus designation may cause the award corresponding to the section marking to be multiplied or otherwise modified, or the total award received in the secondary game can be modified. Thereafter, the flow progresses to process 845 where a termination indicator is associated with the selected section.

If the selected section is not a designated bonus section as determined in process 837, the flow progresses to process 840 where the award associated with the section marking is presented. Thereafter, the flow progresses to process 845 where a termination indicator is associated with the selected section. After process 845, the flow returns to process 820 to wait for the ball marker to be activated again.

As discussed above, there are many variations of game features with the scope of the present inventive concept that can be implemented in games of chance. FIGS. 9A, 9B, 9C, 9D, 9E, and 9F are diagrams of a game display showing an example game progression of one such implementation according to embodiments of the invention. Referring to FIGS. 9A-9F, a game feature is implemented on a game display 900 to include a multi-level game wheel 980. This multi-level game wheel 980 may include multiple concentric disks or wheels that spin independently of one another, or may be a single wheel with multiple levels that remain fixed relative to one another during game play. In other embodiments, multiple separate game wheels may be used to achieve a similar effect as discussed below.

In the present illustrated embodiment, the outer or first level 981 is an initial level where play of the game feature begins. In addition, the first level 981 includes, on average, smaller value awards than the inner or subsequent levels. Play from the first or outer level 981 may progress to the second or middle level 982 when a ball indicator 990 lands in a level section that includes a level progression symbol 992. In some embodiments, the level progression symbol 992 may be a hole, where the ball indicator 990 enters the hole when landing on a corresponding level section and "falls" into the next (in this case, second) level. In other embodiments, the level progression symbol 992 may otherwise indicate cause the ball indicator to progress to a subsequent level either during a current game round or a subsequent game round. The level progression symbols 992, 994 may be fixed to a particular level section at the beginning of the game, or may appear after the ball indicator 990 has landed in a particular level section. That is, in some embodiments, each time the ball indicator 990 lands on a level section, a level progression symbol appears such that the next time the ball indicator lands on that level section, the ball progresses to the next level. Thus, instead of turning a level section that has just been landed on into a game-ending section, the level section may now have a level progression symbol associated with it. In the embodiments illustrated in FIGS. 9A-9F, the level progression symbols 992, 994 are fixed to level sections prior to the start of game play. Here, a player continues to play on the first level 981 until the ball indicator 990 lands on the level section having the first level progression symbol 992 associated with the level section having an award indicator of 25 credits. Although the game wheel 980 is shown having three levels in these illustrations, other embodiments may have two levels, or more than three levels.

Figure 9A:
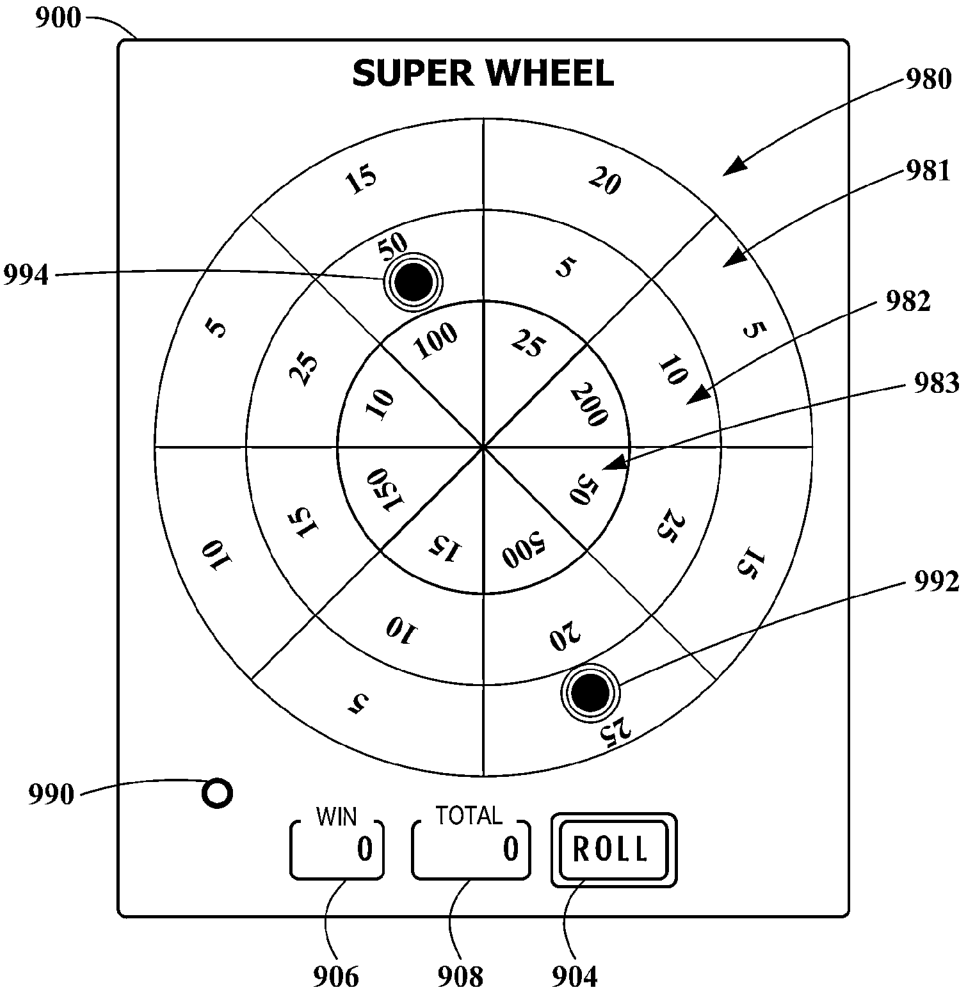
FIGS. 9A, 9B, 9C, 9D, 9E, and 9F are diagrams of a game display showing another example game progression according to embodiments of the invention.
Figure 9B:
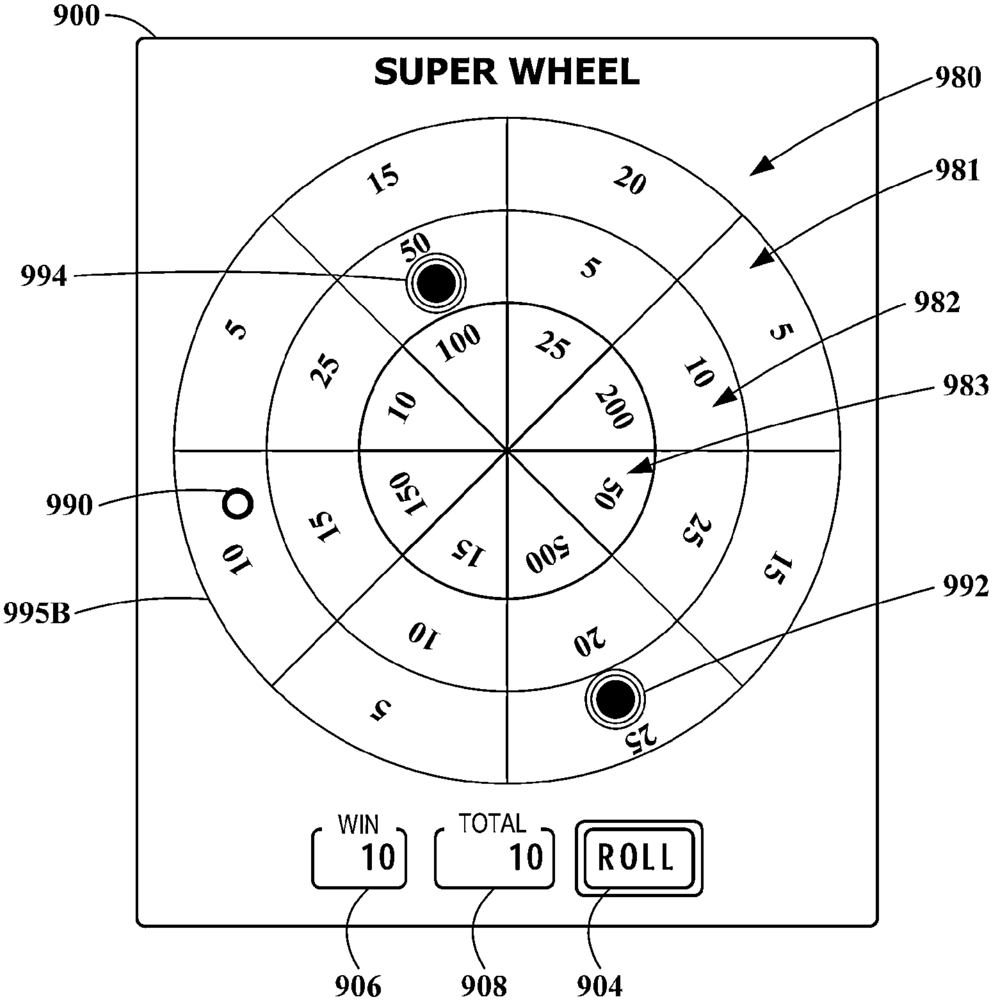
Figure 9C:
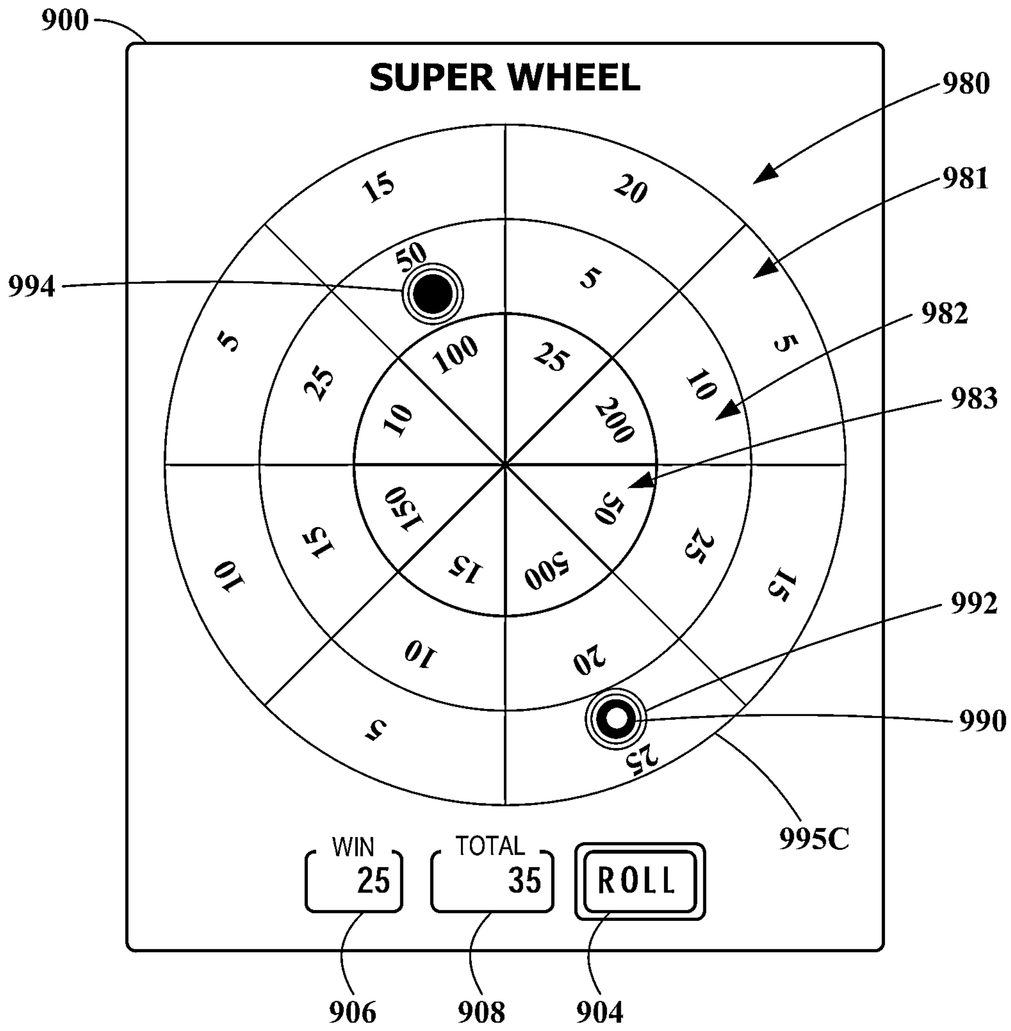
Figure 9D:
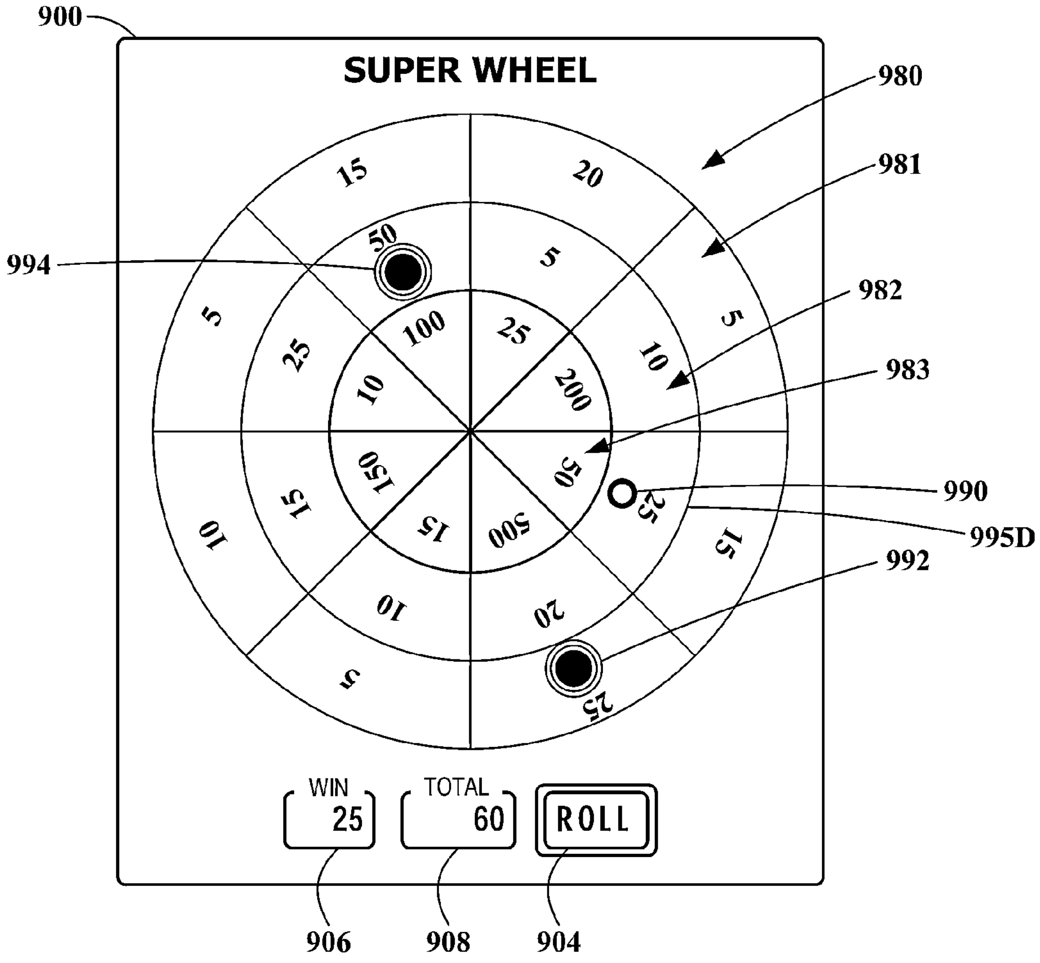

Referring to FIG. 9B, play of the game has started when a roll button 904 has been activated. Here, the ball indicator 990 has landed on level section 995B of the first level 981. An award of 10 credits associated with the level section 995B having the ball indicator 990 is added to a win meter 906, and a total credit meter 908 is updated to reflect the total win of the game. In the next game round, shown in FIG. 9C, the ball indicator has landed on a level section 995C having the level progression symbol 992. The award associated with this level section 995C is awarded to the player and a third game round begins, as shown in FIG. 9D. In other embodiments, the game round continues when the ball indicator lands on a level section having a level progression symbol 992 with the ball indicator falling through the level progression hole and encircling the second level 982 before coming to rest on one of the level sections of the section level (or possibly passing through the level progression symbol 994 on the second level to the third level 983 all in one game round).

Figure 9E:
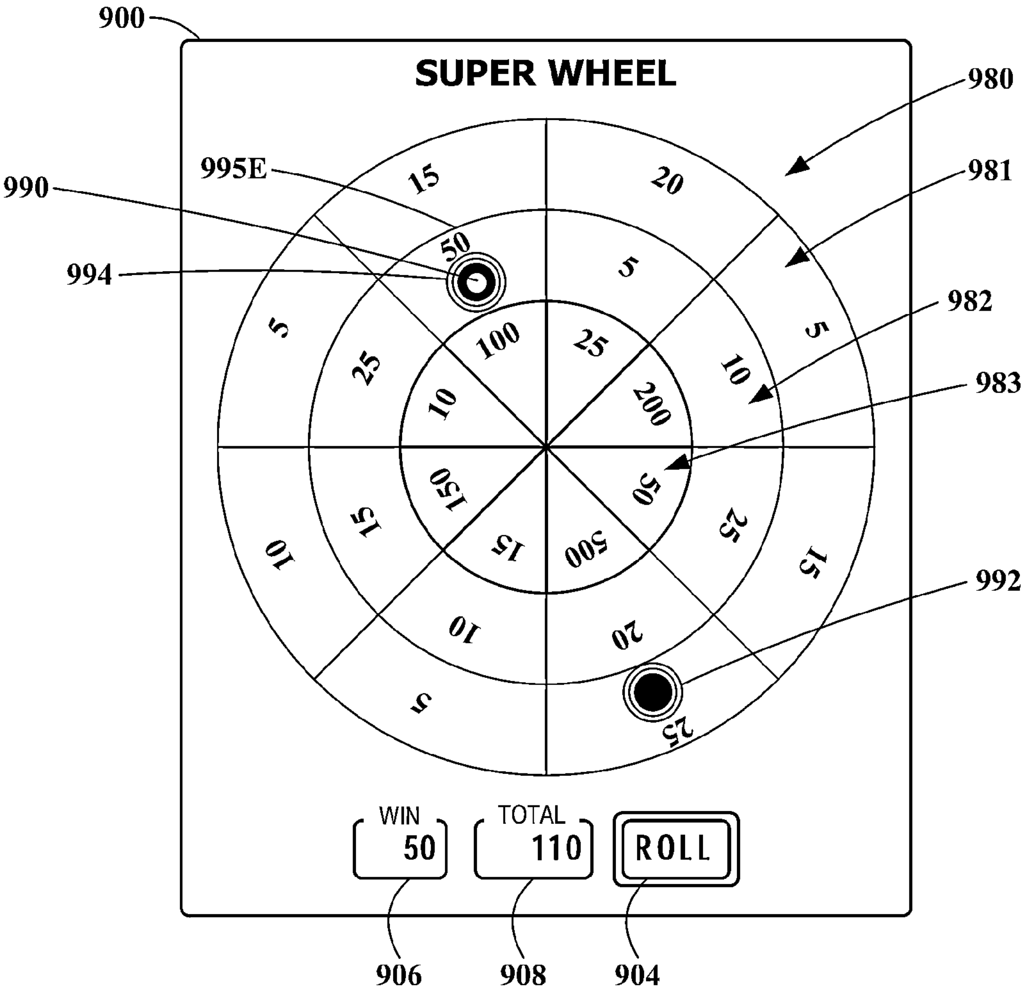
Figure 9F:
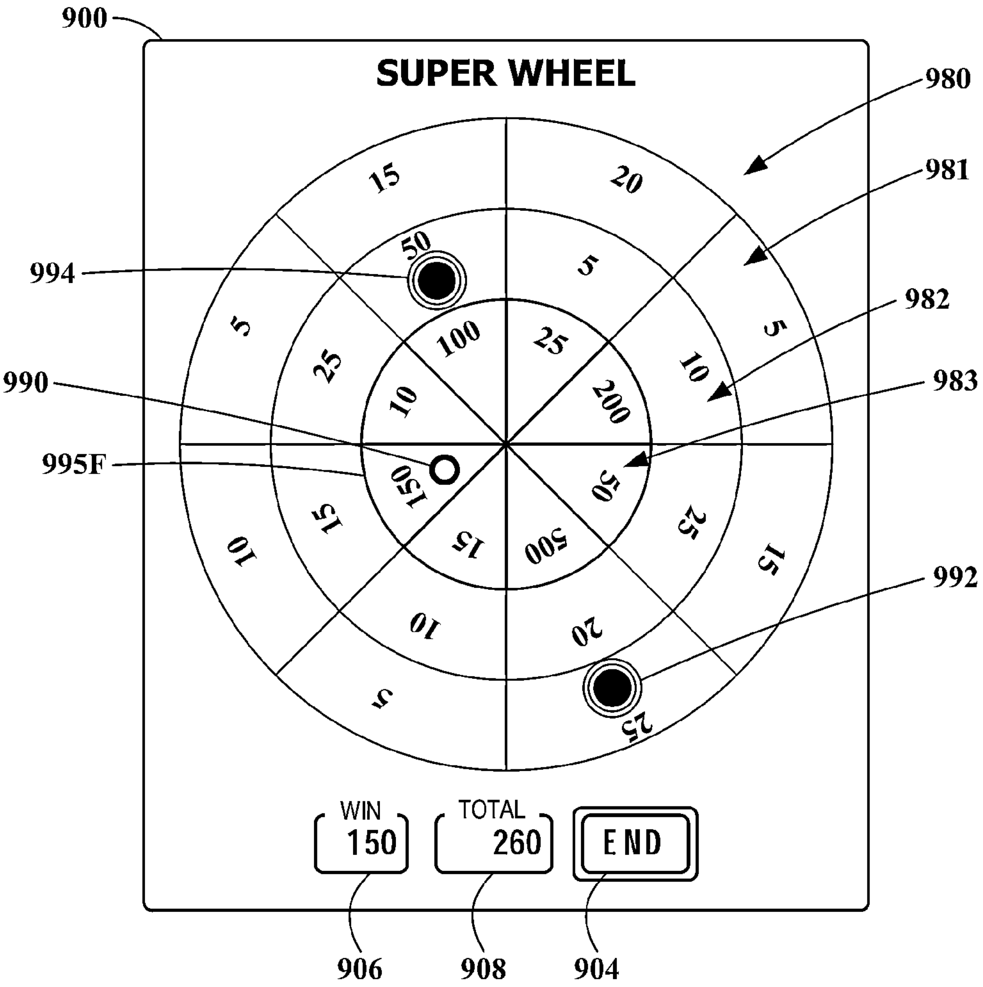

Returning to the current game progression embodiment, in FIG. 9D a third game round ends with the ball indicator 990 landing on a level section 995D of the second level 982. In the fourth game round, the ball indicator lands in a level section 995E having a level progression symbol 994, as shown in FIG. 9E. In FIG. 9F, the game progresses to a fifth and final round where the ball indicator lands on one of the third level 983 sections to collect a final award and end the game. In this embodiment, all sections of the third (final) level 983 end the game, although in other embodiments, a section may have to have a repeat hit to end the game (such as shown in FIGS. 2A-2H). In this example progression, the ball indicator 990 has landed on level section 995F of the third level 983 associated with an award of 150 credits. This award amount is added to the total award value shown in the total indicator 908 and the game ends.

Figure 10:
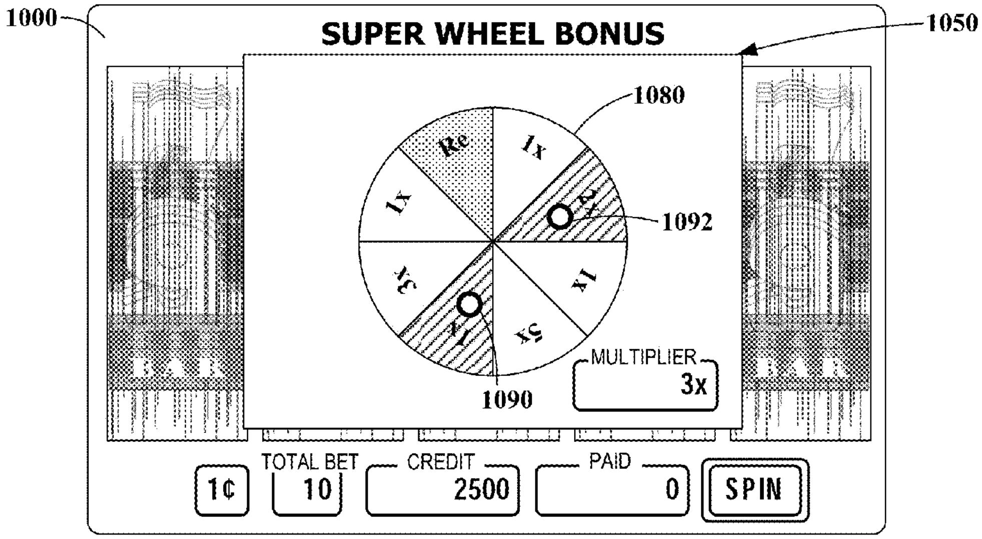
FIG. 10 is a diagram of a game display showing game features used to enhance gaming experiences according to embodiments of the invention.
Figure 11:
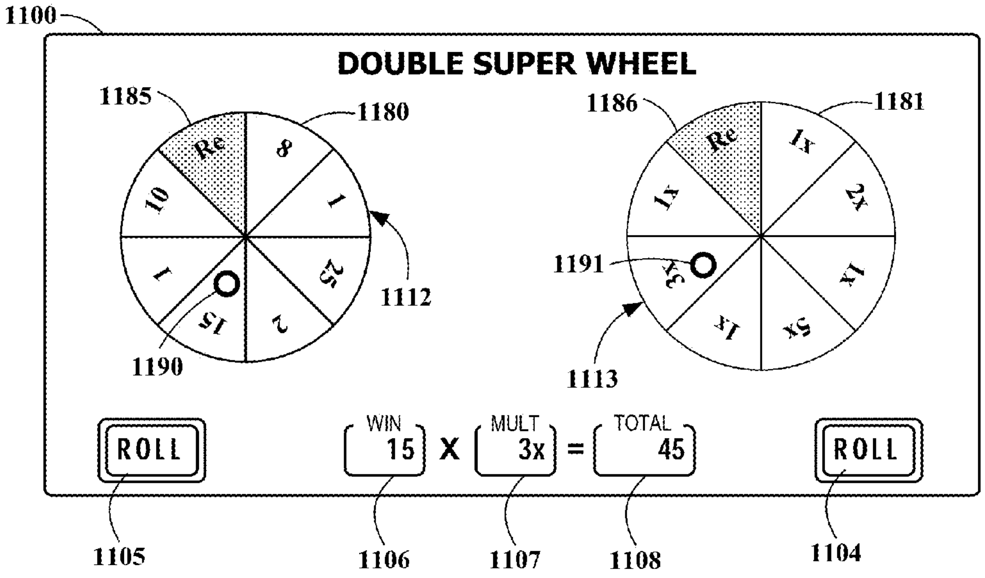
FIG. 11 is a diagram of a game display showing game features used to enhance gaming experiences according to embodiments of the invention.

FIGS. 10 and 11 show other variations using game wheels to enhance game play of games of chance. These variations can be used with any of the other illustrated embodiments shown in the drawings, or any other embodiments not shown in the figures. In FIG. 10, a game display 1000 includes a bonus window 1050 that appears after a game is initiated, but prior to the base game outcome being shown. Here, a game wheel 1080 is shown in the bonus window 1050 where two ball indicators 1090, 1092 are used to indicate two sections of the game wheel. In the present embodiment, the two indicted wheel sections have their corresponding values added together, as shown in the multiplier indicator. In other embodiments, the values of the indicated game wheel sections may be multiplied together, or otherwise combined. In still other embodiments, only the larger of the section values may be awarded. In some embodiments, the player only gets one chance to get a multiplier value. Hence, if this embodiment was employed in the embodiment shown in FIG. 10, the bonus play would end after the first round of play, with the player receiving a "3×" multiplier to modify any awards received in the current base game, which has its result revealed after the "3×" multiplier has been awarded. In other embodiments, the player may be allowed to play multiple rounds of the using the bonus wheel 1080 until a bonus-ending condition is met. For example, each section that the ball indicators 1090, 1092 land on in the first round may be converted to bonus-ending sections. In a second round (and subsequent rounds, if any), the bonus play may end if either ball indicator 1090, 1092 land on a bonus-ending section. In other embodiments, both ball indicators 1090, 1092 may have to land on bonus-ending sections to end the bonus.

In FIG. 11, a game display 1100 includes a first game wheel 1112 and a second game wheel 1191. In other embodiments, additional game wheels may be present and part of the game or bonus. In this embodiment, the first game wheel 1112 includes award values in most wheel sections 1180 and a reset wheel section 1185 in the remaining wheel section. A first ball indicator 1190 is used with the first game wheel 1112, which may be activated by a first roll button 1105. The second game wheel 1113 includes multiplier values in most wheel sections 1181 and a reset wheel section 1186 in the remaining wheel section. A second ball indicator 1191 is used with the second game wheel 1113, which may be activated by a second roll button 1104. In other embodiments, both game wheels 1112, 1113 may include award values or multiplier values, where the values are added, multiplied, or otherwise combined. Alternatively, a higher value indicated on the two wheels may be used as a reward, or a player may be able to select one of the game wheels to use as the basis for an award either prior to sections on the game wheels being indicated, or after the sections have been indicated. For example, if the embodiment in FIG. 11 was being used with the embodiment above, the player may be able to select the value wheel to win a guaranteed prize, or select the multiplier wheel to win a multiplier to multiply awards won in a base game. Alternatively, the player may be able to select whether he or she wants an award of 15 credits, as indicated on the first game wheel 1112 or a "3×" multiplier, as indicated on the second game wheel 1113.

Returning to the embodiment that is shown in FIG. 11, each round of games provides an award value (from the first game wheel 1112), which is reflected in a win meter 1106, and a multiplier value (from the second game wheel 1113), which is reflected in the multiplier meter 1107. The value in the win meter 1106 is then multiplied by the value in the multiplier meter 1107, and the product result is shown in the total meter 1108. In some embodiments, the player may only receive a single spin of each wheel for each game played. In other embodiments, the game may include rounds where wheel sections 1180 and 1181 are turned into bonus-ending sections after they have been selected during a game. Landing on the reset sections 1185, 1186 may clear any corresponding bonus-ending sections on the associated game wheel during game play. The game may be terminated when either of the ball indicators 1190, 1191 land on a bonus-ending section, or both ball indicators may have to land on bonus-ending sections to end the game.

In some embodiments, each round of the game is played sequentially until the game ends and an award is provided to the player. In other embodiments, each round of the game is played with a separate wager and/or base game. For example, if this game is a bonus game associated with a base game, a particular combination in the base game may trigger the bonus game, where in the next wagered-upon base game, the first and second game wheels 1112, 1113 are activated in a first round to provide an additional award for that wagered-upon base game. The sections associated with where the ball indicators 1190, 1191 landed are turned into bonus-ending sections, and then the gaming device waits for another wager to be placed. Once another wager has been placed for another base game, the first and second game wheels 1112, 1113 are activated in a second round to provide an additional award for that wagered-upon base game, unless the result of the activation terminates the bonus game. This process is repeated over multiple wagered-upon base games until the bonus game ends, at which point the bonus game wheels remain inactive until another bonus game is triggered. Many additional variations may be used in other embodiments utilizing multiple game wheels used substantially simultaneously.

FIGS. 12A-12F and 13A-13F show two different embodiments utilizing interactive game wheels to enhance video poker games. Similar techniques may be used with other types of wagering games such as video slots, mechanical slots, video blackjack, video keno, etc. In these embodiments (FIGS. 12A-12F and 13A-13F), games of poker where wagers are placed (i.e., new bets) are played between bonus wheel spins. The bonus wheel continues to spin to provide a modifier for the base game or additional prize one or more times with each played poker base game until a bonus ending event occurs. In other embodiments, however, multiple primary games may be played bonus wheel rounds without the need for additional wagers or bets. For example, part of a free-spin bonus game may include a spin of the bonus wheel and then a spin of game reels, followed by a second spin of the bonus wheel and spin of the game reels. This pattern may continue until a bonus-ending section on the wheel is selected, a bonus ending event occurs on the reels, a predefined number of bonus-free games is played, or another type of bonus event occurs.

Figure 12A:
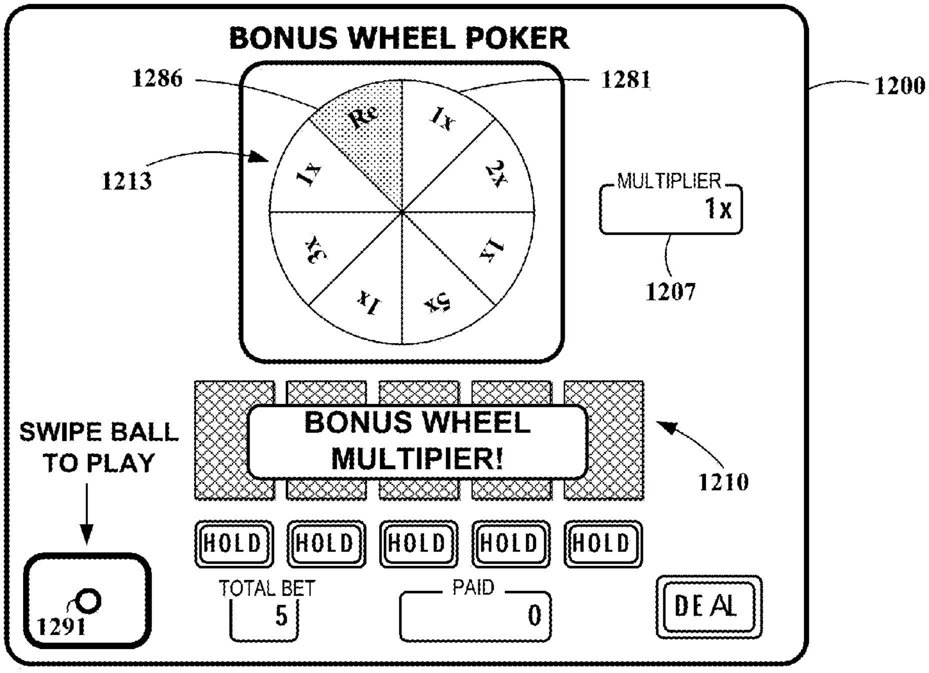

FIGS. 12A-12F are diagrams of a game display showing an example game progression according to embodiments of the invention. Referring to FIGS. 12A-12F, a game display 1200 includes a hand of cards 1210 used in a poker game, and a bonus wheel 1213. In this embodiment, a bonus is triggered prior to the cards 1210 being dealt for the base poker game. The bonus may be triggered at random, it may be a mystery trigger, or it may be triggered by a game event in one or more past games. FIG. 12A shows the game display after a wager has been placed to initiate a poker game, where a bonus game has been triggered. As shown in FIG. 12A, the cards in the poker hand are not yet revealed, although in other embodiments, a dealt hand may be shown, or cards may even have been held and draw requested. Here, the bonus wheel includes multiple wheel sections 1281 having multiplier values and a reset section 1286 that clears any bonus-ending sections as discussed above. Multipliers received from selected wheel sections are added to a total multiplier meter 1207 which is used to multiply any awards won in the poker hand, when played.

Figure 12B:
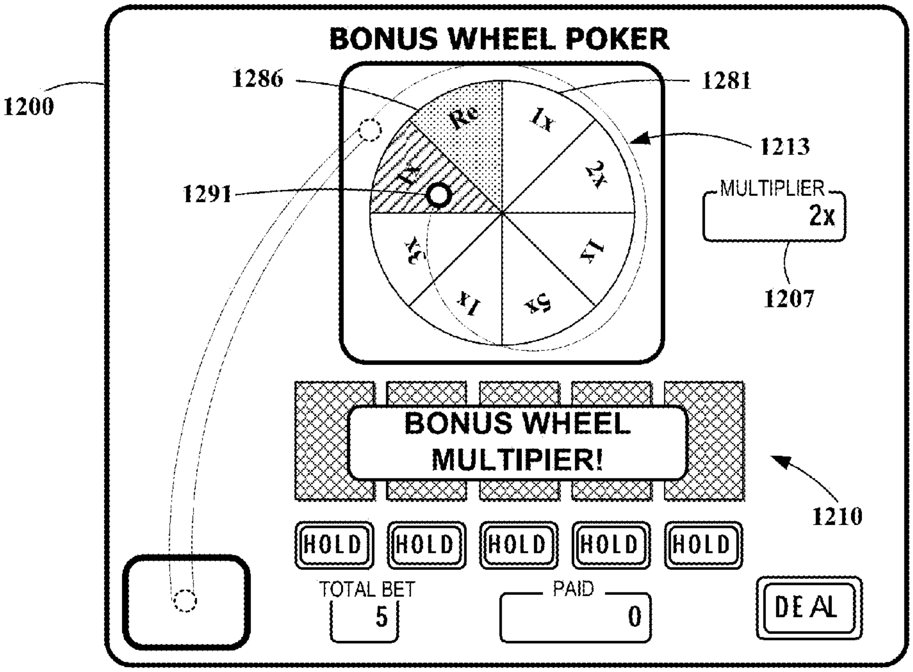

A ball indicator 1291 may be used to indicate one or more of the bonus wheel sections 1281. The bonus wheel 1213 may spin as well as having the ball indicator encircle the bonus wheel 1213. A player may activate the ball indicator 1291 by swiping the display screen 1200 to mimic throwing the ball toward the bonus wheel 1213, as shown in FIG. 12B. Here, the ball indicator 1291 has landed on a wheel section 1281 having a "1×" value. This multiplier value is added to the total multiplier have in the total multiplier meter 1207 resulting in a "2×" value, and the selected wheel section is shaded to show it is now a bonus-ending section. In some embodiments, play of the bonus game continues until the bonus ends and a final multiplier value is used to multiply any awards associated with the poker base game. However, in the present embodiment shown in FIGS. 12A-12F, a base game is played after each round of the bonus game. Thus, as shown in FIG. 12C a base poker game is played with the card hand 1210 and the resulting award for three-of-a-kind is doubled as a result of the "2×" multiplier.

Another wager is placed and the bonus wheel 1213 is activated again prior to play of the poker base game, as shown in FIG. 12D. In FIG. 12E, the second round of the bonus game has been completed with a selected section having a "3×" multiplier added to the total multiplier value, and a result of the base poker game is shown. Even though a "5×" multiplier is active, the base poker game has resulted in no awards. Hence, the "5×" does not help in this instance. In FIG. 12F, a third round of the bonus game has occurred where the ball indicator 1291 has landed on a bonus-ending section. Here, the multiplier value of the bonus ending section is added to the total multiplier to provide the player one more chance at multiplying a base game award. This time, the player has received a full house with the poker hand 1210, which has an award value of 45 credits. This award value is then multiplied by the "6×" in the total multiplier meter 1207 and the total of 270 credits is awarded to the player. Since a bonus-ending section was selected, the bonus ends and the player must wait until another bonus is triggered to receive bonus multipliers.

FIGS. 13A-13F illustrate another example game progression using a video poker base game according to embodiments of the invention. The game progression shown in FIGS. 13A-F include some similarities to the progression shown in FIGS. 12A-F, but instead of accumulating a multiplier over multiple rounds of a bonus game, each round in the embodiments shown in FIGS. 13A-13F results in an independent multiplier that used with an associated base game. Additionally, the bonus is triggered by an event happening in a previous game.

Referring to FIG. 13A, a game display 1300 includes a poker hand 1310 that is played using five card draw poker rules. A bonus with multiple rounds is triggered when in this embodiment when a Joker having wheel symbols 1311 appears in the poker hand. The deck of cards used for the poker hand may include two jokers where only one joker has wheel symbols. Other embodiments may use other triggering methods, such as by randomly placing wheel symbols on one of the 52 standard playing cards prior to a deal, where the bonus is triggered when the card with the wheels appears in the poker hand. After the bonus has been triggered, a bonus wheel 1313 becomes active for the next poker base game. As shown in FIG. 13B, the player has placed another wager, and now has the opportunity to receive a multiplier by which any award from the base poker hand 1310 will be multiplied. The bonus wheel 1313 again includes multiple sections 1381 having multiplier values and a reset section 1386. The player may activate a ball indicator 1391 by swiping their finger across the display screen 1300 to mimic throwing the ball toward the bonus wheel 1313. A multiplier meter 1307 may show a multiplier that will be used to modify any awards associated with a final poker hand.

In FIG. 13C the ball indicator 1391 has been activated and has landed on the wheel section having a "10×" multiplier. This award value is shown in the multiplier meter 1307 and will be used to modify the subsequent poker game. As shown in FIG. 13D the final poker hand 1310 has resulted in a pair of kings which has an associated award of 5 credits. This award is multiplied by the "10×" multiplier for a total award of 50 credits. Each subsequent game that is wagered on, will receive a spin of the bonus wheel 1313 and a new modifier until a bonus-ending condition is met. Referring to FIG. 13E, a next poker game is played with another round of the bonus. Here, the ball indicator 1391 has landed on a wheel section showing an "8×" multiplier, which replaces any previously multiplier in the multiplier meter 1307 and is used to modify any awards won in the base poker game. In this case, the base poker hand 1310 has not resulted in a final poker hand with an associated award, so the multiplier does not help add or modify any award. In FIG. 13F, the next poker game has been played with the ball indicator 1391 landing on a bonus-ending wheel section (the wheel section that had previously been landed on in the first round of the bonus, shown in FIGS. 13C and 13D). In this embodiment, once a bonus-ending condition has been received the bonus immediately ends and the player does not receive a multiplier for the current poker hand.

Although the embodiments of FIGS. 12A-12F and 13A-13F show wheel sections with multipliers, other modifiers or awards are possible in other embodiments. For example, some or all of the wheel sections may include credit values, free games/spins/hands, bonus symbols to be used in the base game, or other types of awards. Additionally, bonus or game wheels 1213, 1313 may not include a reset section 1286, 1386, or may include multiple reset sections. The game wheels 1213, 1313 may have predefined bonus ending conditions other than repeating a hit on a particular wheel section that has not been reset. For example, predefined sections of the wheel may be bonus-ending sections throughout a game or bonus, or the player may have a predetermined number of rounds of playing the bonus before it ends.

To illustrate some other possible variations of associated with game or bonus wheel play, FIGS. 14A-14D show gaming displays with features that can be incorporated in any of the embodiments discussed above, or in similar embodiments not specifically shown.

Figure 14A:
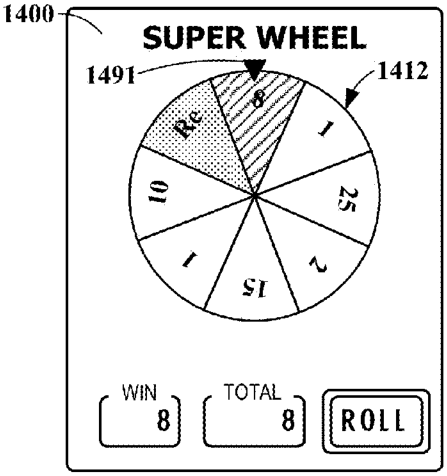
FIGS. 14A, 14B, 14C, and 14D are diagrams of a gaming display showing example variations of game features used to enhance gaming experiences according to embodiments of the invention.
Figure 14B:
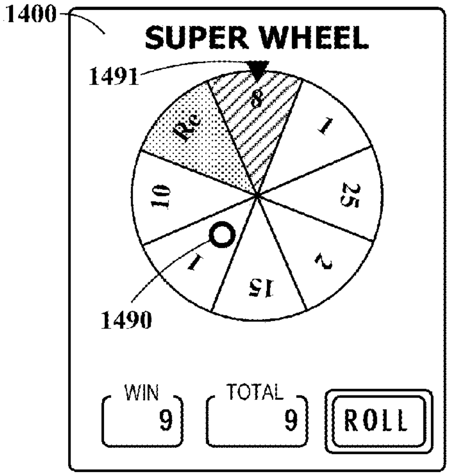

Referring to FIG. 14A, a game display 1400 includes a game or bonus wheel 1412 having a fixed section indicator 1491 rather than a ball indicator. Here, the game wheel 1412 spins upon a center axis and comes to rest with the fixed section indicator 1491 pointing to a selected wheel section. In FIG. 14B, another example is shown where a game display 1400 includes both a ball indicator 1490 and a fixed section indicator 1491. In this embodiment, the values indicated by the ball indicator 1490 and the fixed section indicator are summed together and awarded. However, only the section indicated by the fixed section indicator 1491 is transformed into a game-ending section. Alternatively, both indicated sections may be transformed into game-ending sections, or only the section indicated by the ball indicator 1490 may turn into a game-ending section.

Figure 14C:
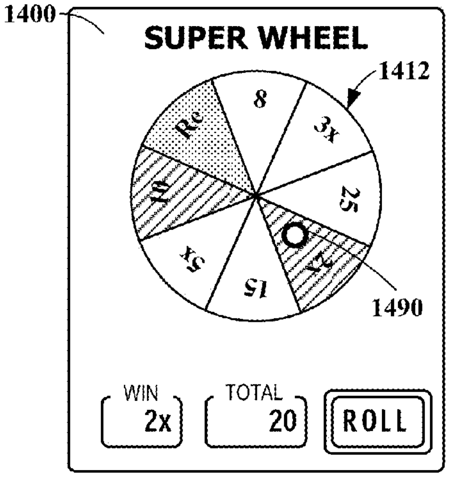

Referring to FIG. 14C, a game display may include a game wheel 1412 having both credit award values and multipliers. Here, when a ball indicator 1490 lands on a section, the award corresponding to that section is used to determine an award. That is, when a credit value is landed on, that value is added to a win meter. On the other hand, when a multiplier value is received, the total award in the win meter is multiplied by the multiplier. In FIG. 14C, the first round of the game resulted in a 10 credit award, while the second round has resulted in a "2×" multiplier. Thus, a total award of 20 credits is shown in the win meter. If one or more multiplier values are received before any credit values the multipliers may be summed or multiplied together until a credit award is provided, at which time the credit value is multiplied by the multiplier in the win meter. In some embodiments, only one type of award may be transformed into game-ending sections. For example, in some embodiments, only the credit award sections may be transformed into game-ending sections. This prevents the game or bonus from ending with only multiplier values. In other embodiments, each wheel section is associated with two values: a credit value and a multiplier value. Each section is shown with only one of the values (some credit and some multiplier, or all starting with one type or the other) at the beginning of the game. Thereafter, when a section is landed on and transformed into a game-ending section, the initial award value is won and the secondary award value is now displayed. This secondary award value is then awarded if that section is selected again, and although the game or bonus would end, a player would at least get one multiplier and one credit award. In this embodiment, a reset section (if any on the game wheel) may reset the initial award of any transformed sections, or the secondary award may remain on those sections, where if they are transformed again, the secondary award is removed, and they just become a game-ending section with no other associated award.

Figure 14D:
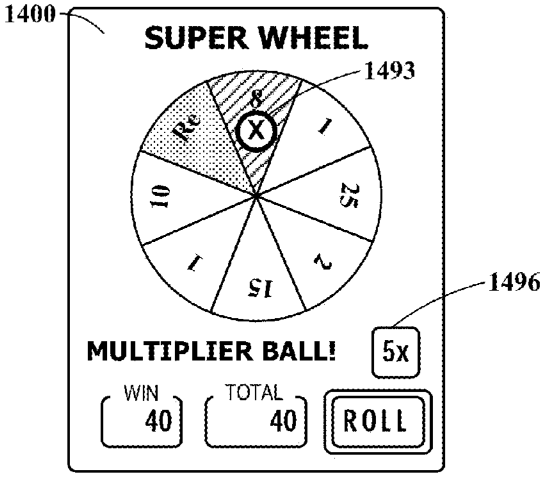

In FIG. 14D, a game display 1400 includes a multiplier ball indicator 1493. The multiplier ball indicator 1493 may be triggered by a special condition, or may be part of each game. Here, the multiplier value associated with the multiplier ball indicator 1493 may be shown in a multiplier display 1496. This multiplier value may be chosen at random, as part of a weighted table, or may be predetermined based on another criterion. In this instance, a game wheel includes award values that are multiplied by the multiplier value shown in the multiplier display 1496 when the multiplier ball indicator 1493 lands on a selected section.

FIGS. 15A, 15B, 15C, 15D, 15E, 15F, 15G, 15H, 15I, and 15J are diagrams of multiple game displays showing a community game progression using game features to enhance gaming experiences according to embodiments of the invention. Although two gaming devices are shown as part of a multi-game system in these FIGS. 3, 4, or more gaming devices may be part of the multi-game system.

Figure 15A:
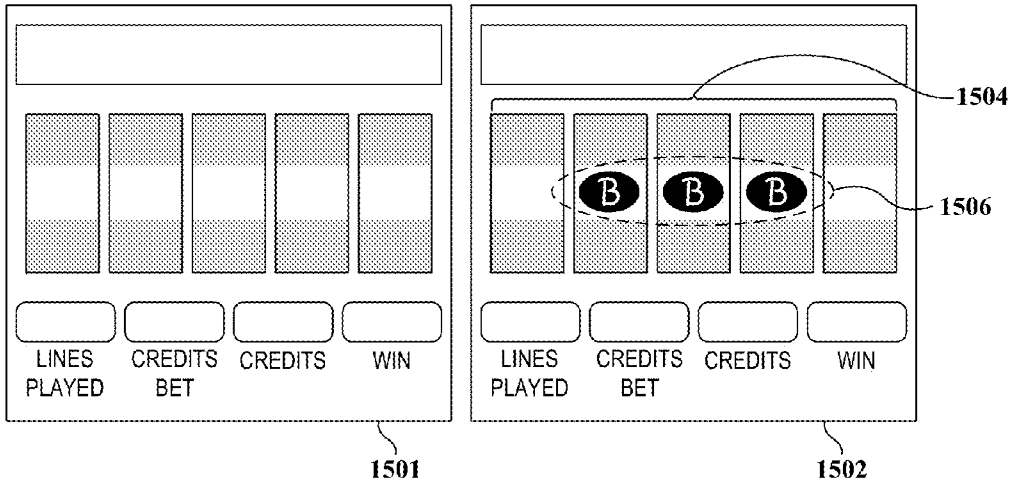
FIGS. 15A, 15B, 15C, 15D, 15E, 15F, 15G, 15H, 15I, and 15J are diagrams of multiple game displays showing a community game progression using game features to enhance gaming experiences according to embodiments of the invention.
Figure 15B:
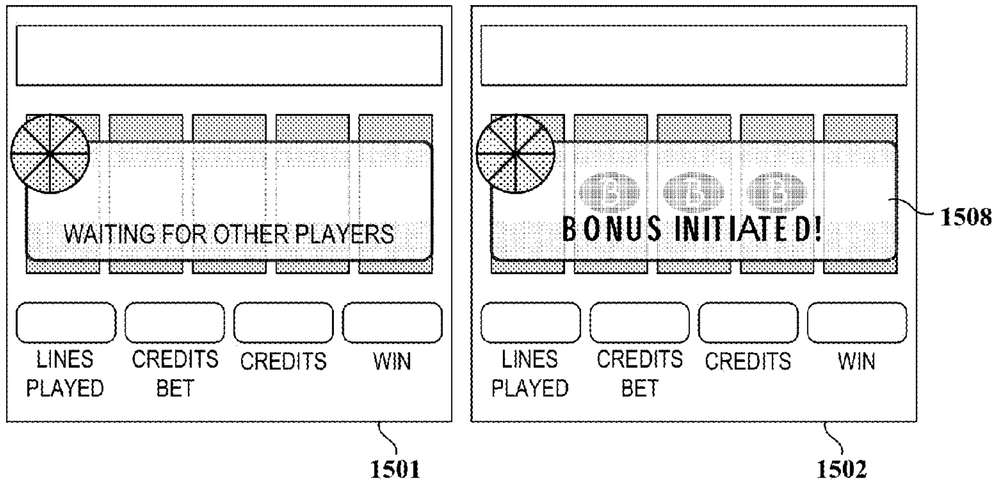
Figure 15C:
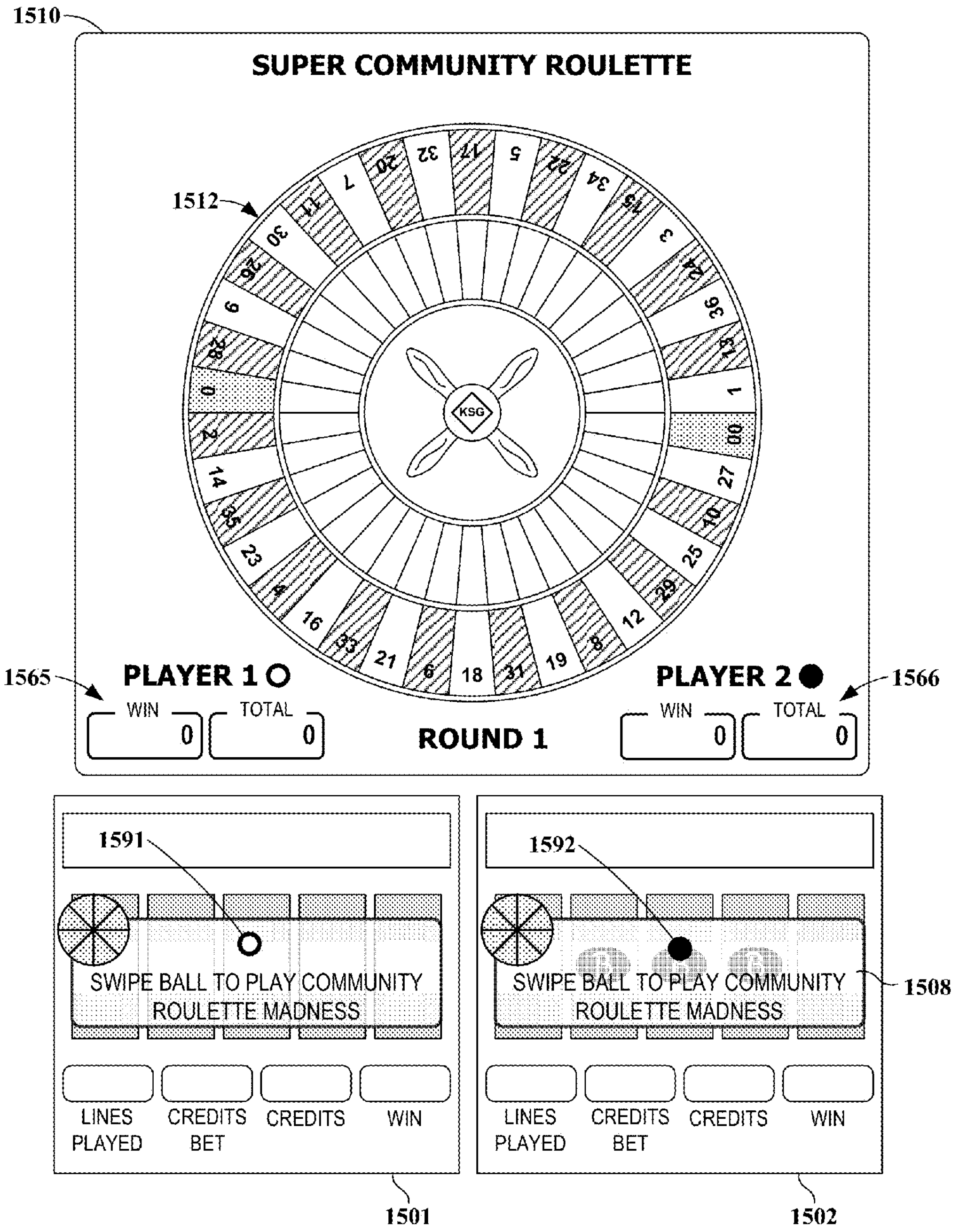

Referring to FIGS. 15A-15J, a first game device 1501 and a second game device 1502 are configured to play independent base games 1504, such as a slot game, video poker game, etc., but are connected to one another via a multi-game system in order to provide a community bonus event or other game feature. As shown in FIG. 15A, a community bonus may be triggered in one of the base games 1504 on the multi-game system by, for example, a particular symbol combination 1506 appearing during a base game. Once the bonus is initiated on one of the gaming device 1502 of the multi-game system, as shown by the initiation screen 1508, the multi-game system may poll the other gaming device(s) 1501 to see if it is eligible to join the community bonus, as shown in FIG. 15B.

In this embodiment, the non-triggering gaming device 1501 is eligible for the bonus, and both base games are put on hold for play of the community bonus. The community bonus may be displayed on a common display 1510 (such as a large video display above or in front of all gaming devices in the multi-game system) visible to all players of the multi-game system, or may be individually shown on each game display of each gaming device 1501, 1502 of the multi-game system. Here, a community roulette bonus wheel 1512 is shown on the common display 1510 along with a first player bonus display 1565 and a second player bonus display 1566. Each player may be given a different ball indicator 1591, 1592 to play the bonus so that each player can track where their ball indicator might land, and where it does actually land. In some embodiments, players may be able to choose a ball indicator style from a selection screen of multiplier possible ball indicators.

Once each player activates their corresponding ball indicators 1591, 1592, the community wheel 1512 spins and ball indicators encircle the community wheel until finally coming to reset on one or more wheel sections. Table 2 below shows example awards associated with each numbered section of the bonus wheel 1512:

TABLE 2

| | Section Value | | | | | | |
|---|---|---|---|---|---|---|---|
| | 0, 00 | 1-6 | 7-12 | 13-18 | 19-24 | 25-30 | 31-36 |
| Award | Reset Wheel | 10 | 20 | 25 | 50 | 100 | 200 |

Figure 15D:
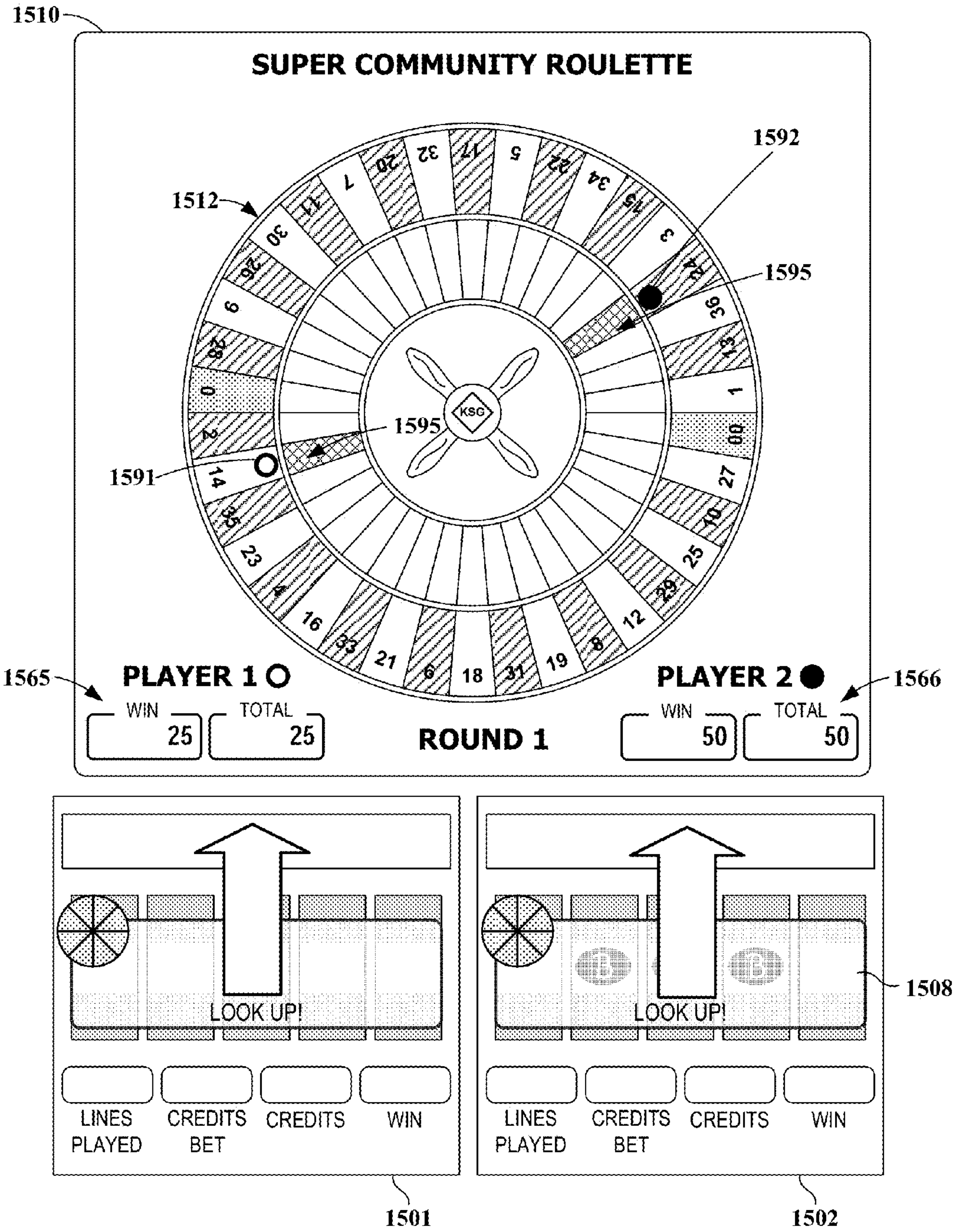

As shown in FIG. 15D, player 1 has landed on section associated with a 25 credit award, and player 2 has landed on a section associated with a 50 credit award. In some embodiments, if the players land on the same section, each player gets double that section value. In other embodiments, the players may be awarded a progressive or other award if they land on the same section. Each of the sections landed on turn into bonus-ending sections 1595, as shown in FIG. 15D. To end the bonus, in some embodiments, only one player has to land on a bonus-ending section, while in other embodiments, all players must land on a bonus-ending section for the community bonus to end. With more players this creates an interesting dynamic as more sections are turned into bonus-ending sections with each bonus round, but there are more chances for one of the players to land on a clear section or a reset section. In other embodiments, each player is independently playing the bonus. Thus, if one player lands on a bonus-ending section, that player is done with the bonus. In some variations of these embodiments, the player(s) that is/are removed from the bonus can still win a consolation prize for each additional round of the bonus that is played by other players. The consolation prize may be related to the prize the other player wins in a round, or may be fixed value, such as 5 credits for each additional bonus round that is played.

Figure 15E:
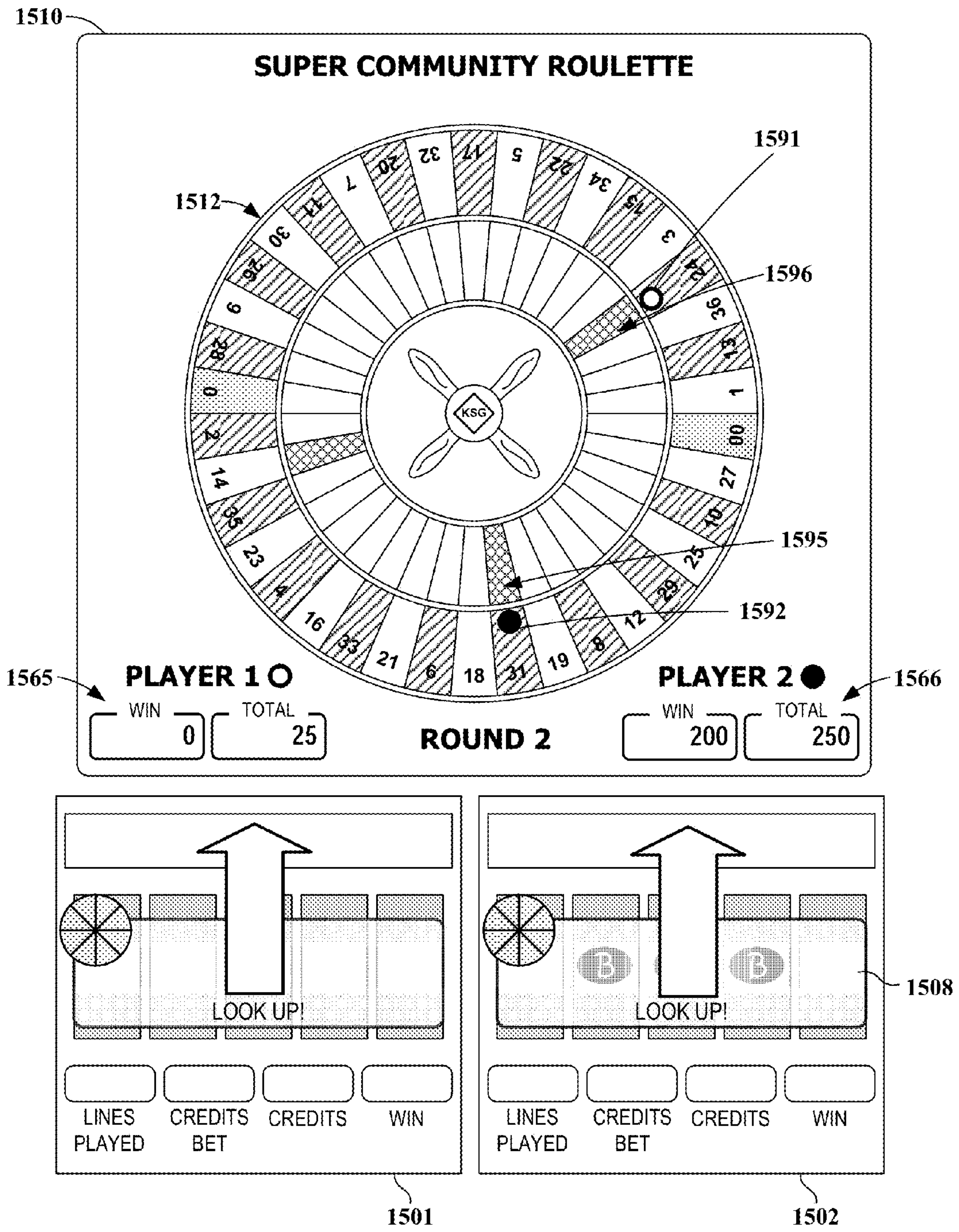

In the embodiment shown in FIGS. 15A-15J, both players must land on a bonus-ending section to end the bonus. However, if one player lands on a bonus-ending section and the other does not (as shown in the section bonus round in FIG. 15E), the player landing on the bonus-ending section does not win any award for that round. Referring to FIG. 15E, player 1 has landed on an existing bonus-ending section 1596 and does not win any award for the bonus round. However, player 2 has landed on a clear section, which keeps the bonus alive for both players. In addition, player 2 is awarded the credit value of the section that he or she landed on.

Figure 15F:
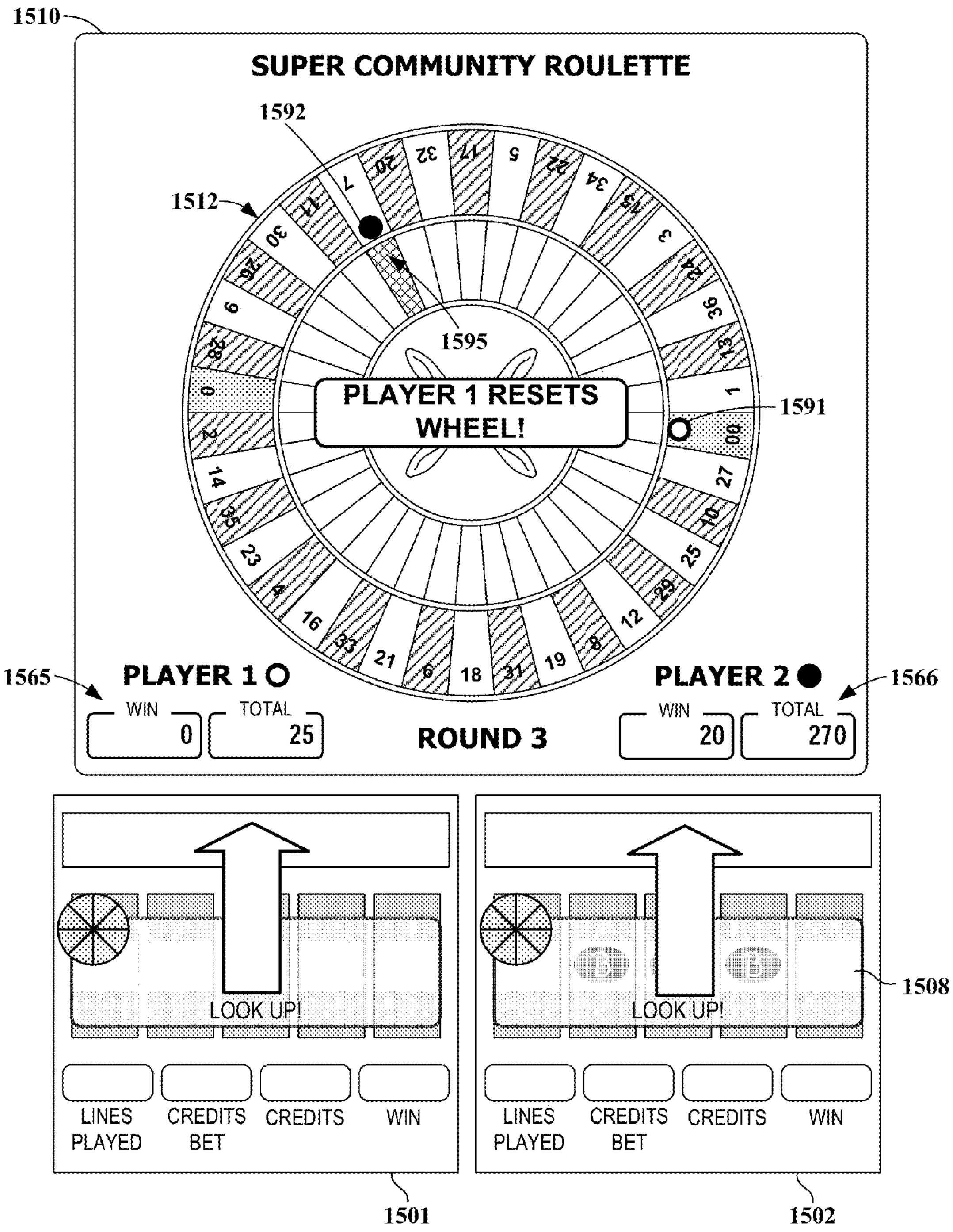
Figure 15G:
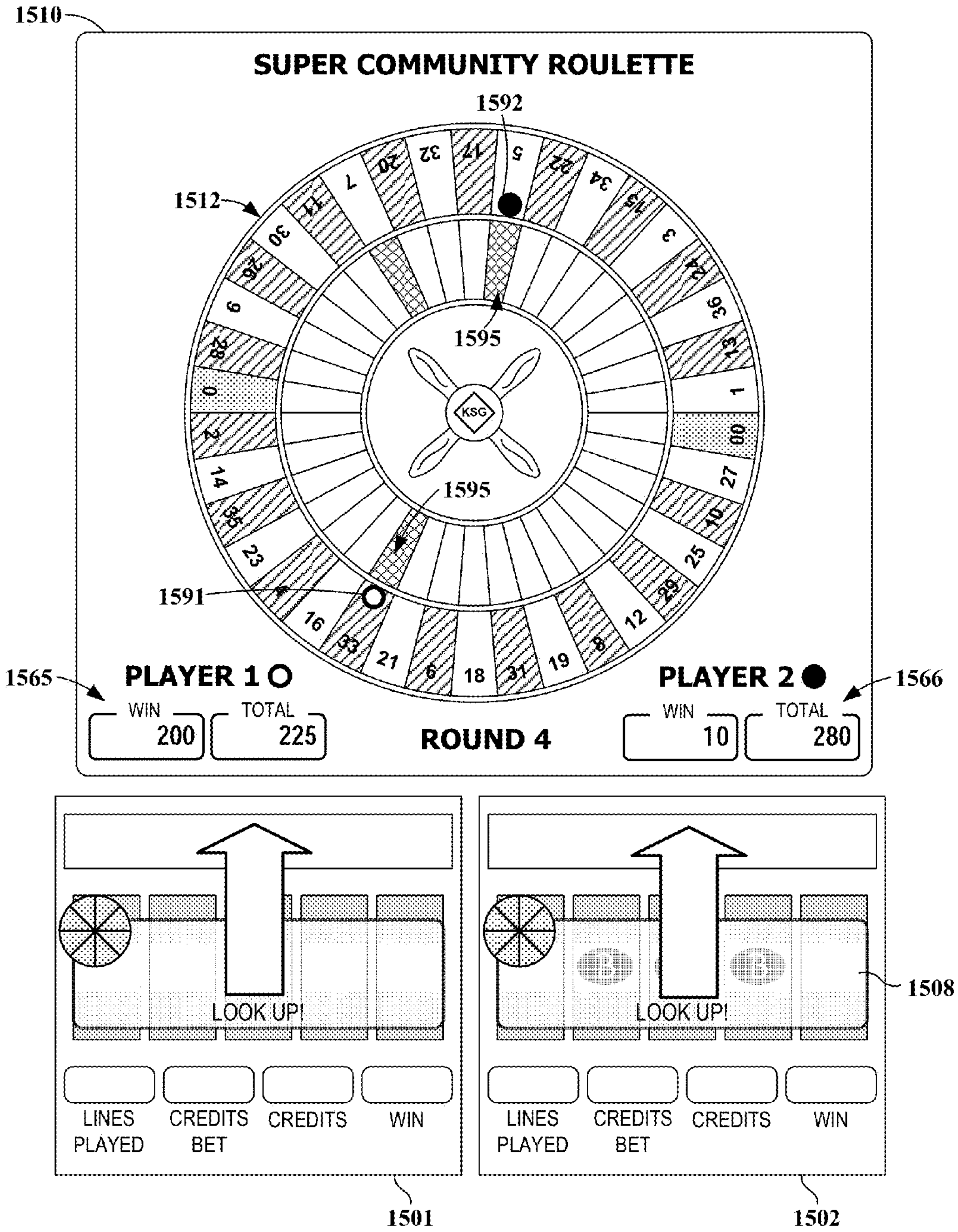
Figure 15H:
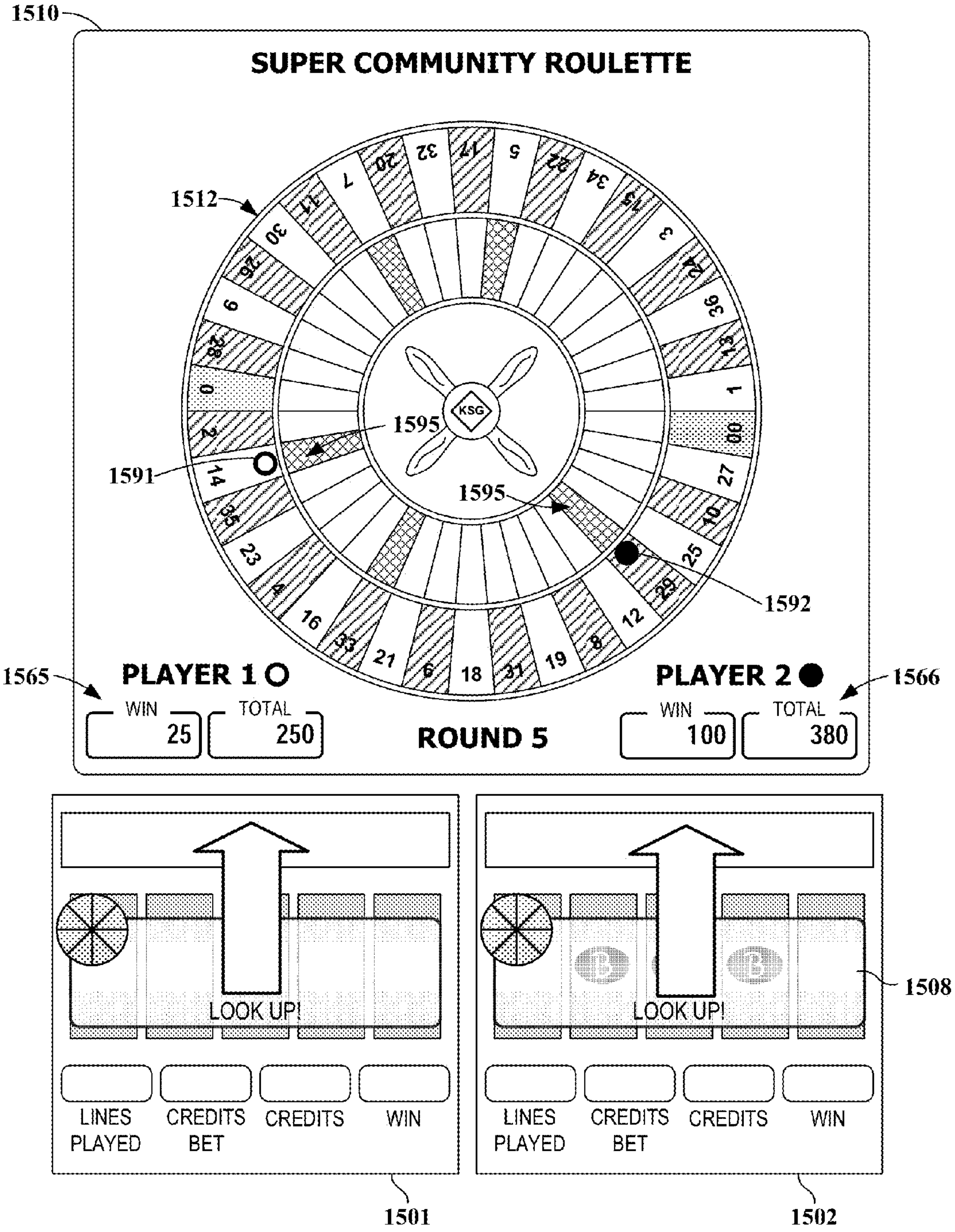
Figure 15I:
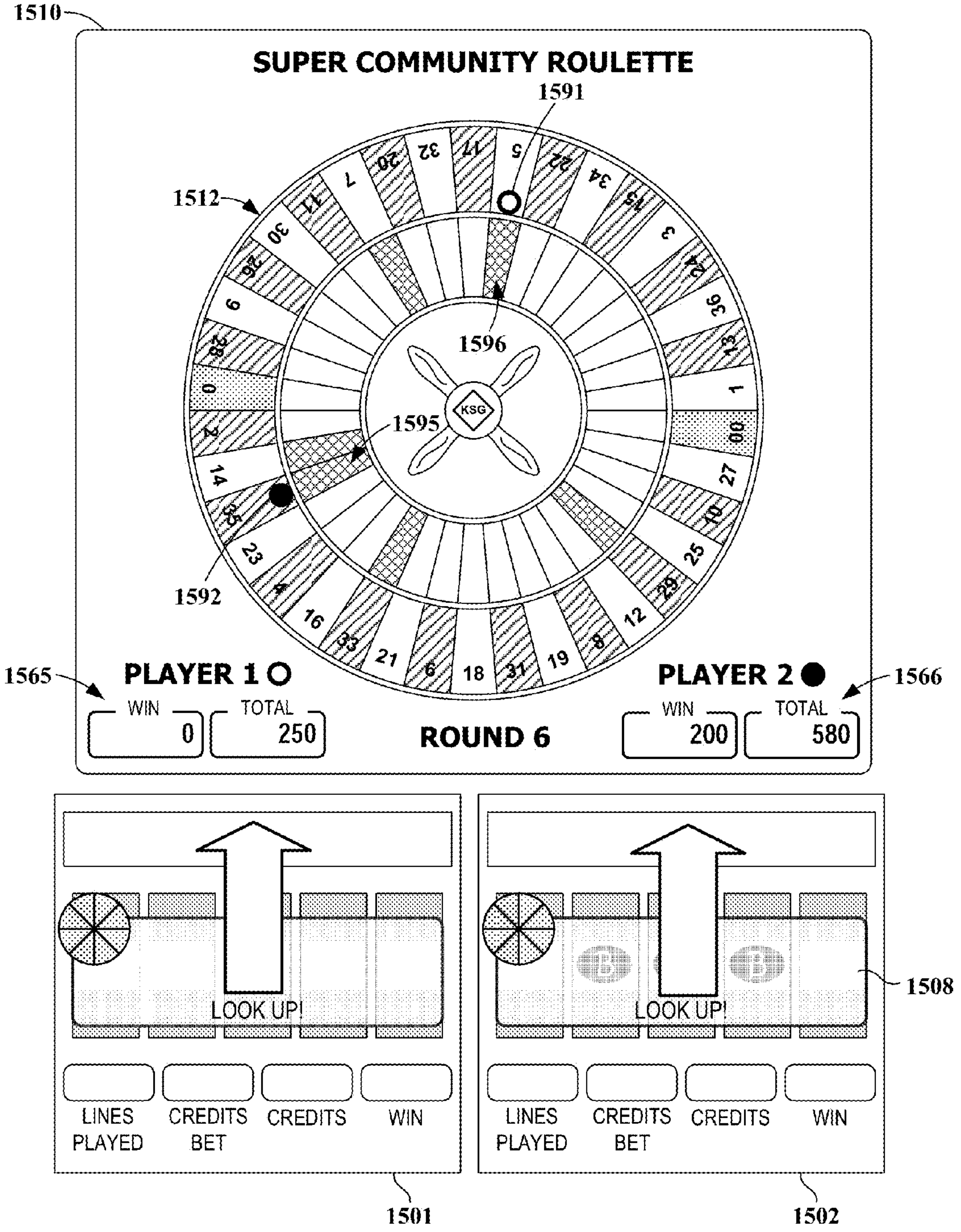
Figure 15J:
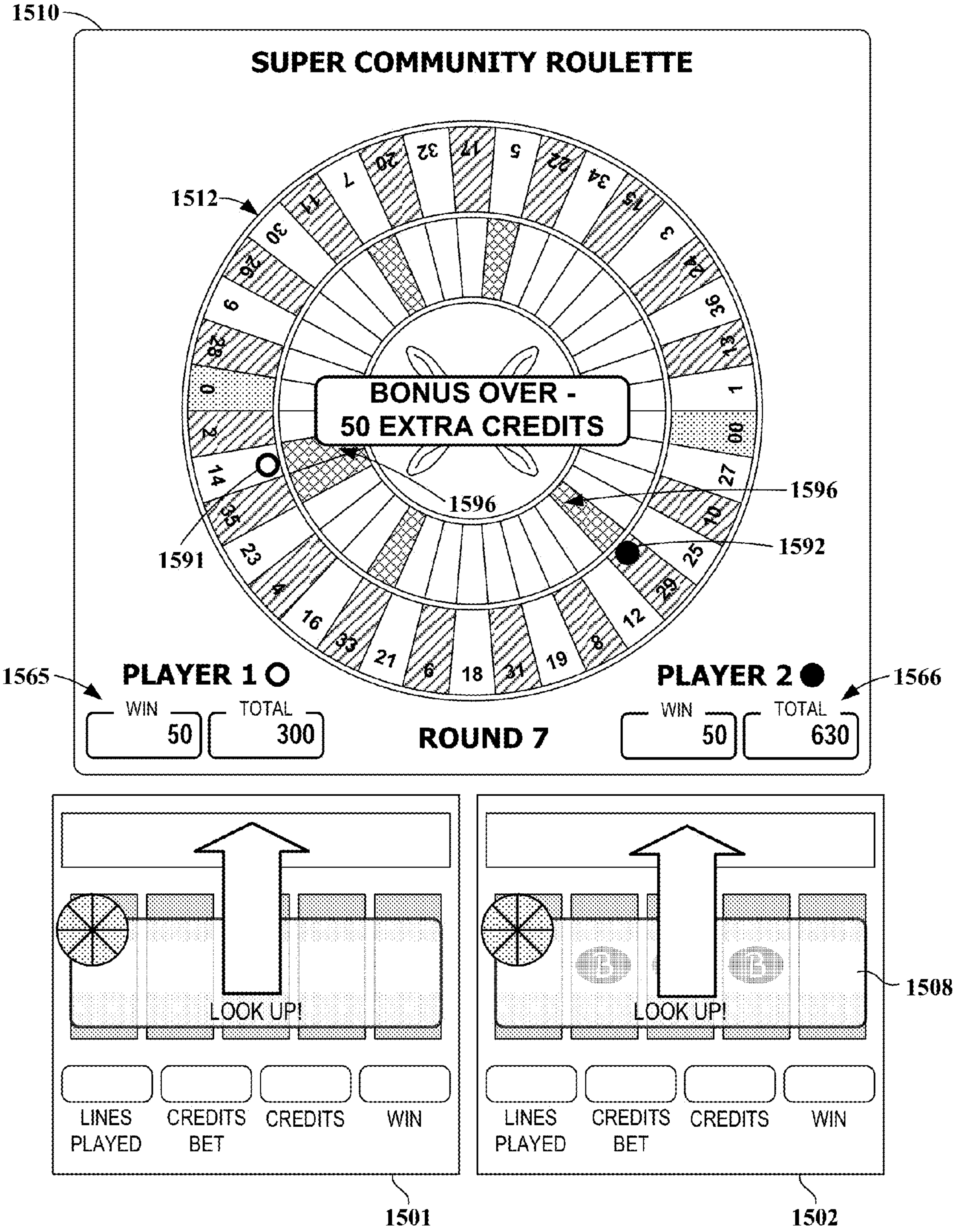

In FIG. 15F, round 3 of the bonus has been completed and player 2 has landed on another clear section with an associated award, while player 1 has landed on a reset section. Here, all of the previous bonus-ending section indicators are removed, although the current section landed on by player 2 is transformed into a bonus-ending section 1595. In round 4 of the bonus, as shown in FIG. 15G, each player lands in new bonus wheel section and is awarded associated prizes. In FIG. 15H, round 5 of the bonus has been completed and again each player has landed in a clear section and is awarded associated prizes. In FIG. 15I, player 1 lands in bonus-ending section 1596, but player 2 again lands in a clear section, thereby receiving an associated award and allowing the bonus to continue for both players. In FIG. 15J, both players land on bonus-ending sections and the bonus ends. Here, the players are each awarded a bonus-ending prize of 50 additional credits. This bonus-ending prize may be associated with the round the players reach or the number of times that a reset section is landed on during the bonus. In some embodiments, the bonus-ending prize goes down as the bonus goes through multiple rounds. For example, Table 3 below may be used to determine a bonus-ending prize:

TABLE 3

| | Round Where Bonus Ended | | | | | | |
|---|---|---|---|---|---|---|---|
| | 2 | 3 | 4-5 | 6-8 | 9-12 | 12-15 | 16+ |
| Bonus Ending Award | 200 | 150 | 100 | 50 | 25 | 10 | 0 |

A similar scheme may also be used for the number of times the bonus wheel was reset. This takes some of the volatility of the bonus away and provides decent awards even if a bonus ends quickly. In other embodiments, however, the opposite scheme may be used where the further in the bonus the players get, the larger the bonus-ending award is. Consider, for example, Table 4 below:

TABLE 4

| | Number of Resets in Bonus | | | | | | |
|---|---|---|---|---|---|---|---|
| | 0 | 1 | 2 | 3 | 4 | 5 | 6+ |
| Bonus Ending Award | 0 | 50 | 100 | 150 | 250 | 500 | 1000 |

Additionally, as mentioned above, a special award may be awarded if all players in a bonus land on the same wheel section. For example, in a five game multigame system, a simultaneous section bonus may be awarded according to Table 5:

TABLE 5

| | Number of Players Hitting Single Wheel Section in Same Round | | | |
|---|---|---|---|---|
| | 2 | 3 | 4 | 5 |
| Bonus Award | 2x Indicated Award | 5000 credits | System Level Progressive Award | Wide Area Mega-Jackpot Progressive |

These awards may be given to all qualifying players or the progressive awards may be split among the players. Many other community play variations exist using concepts similar to those described above.

Figure 16:
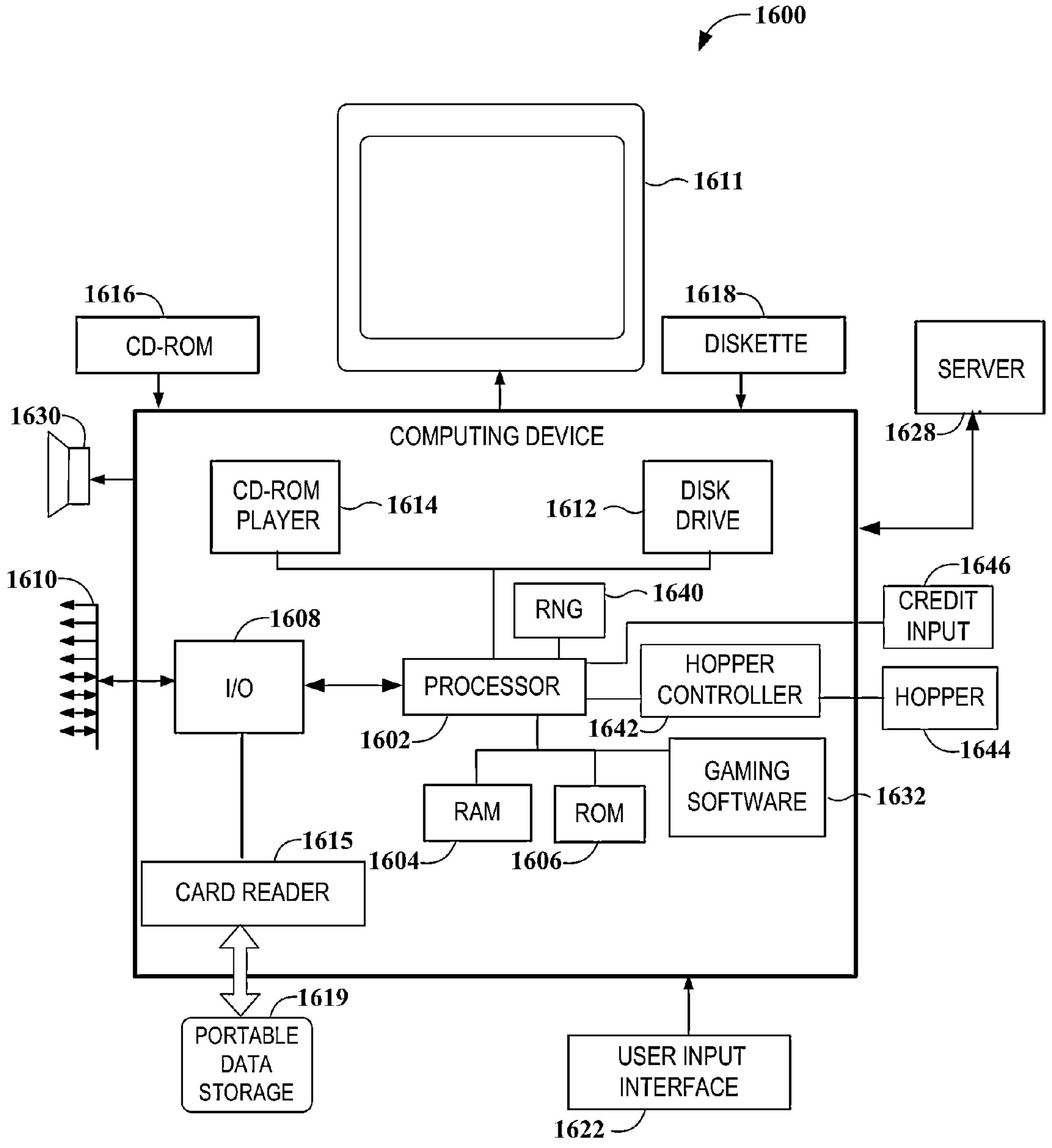
FIG. 16 is a block diagram illustrating a computing arrangement according to embodiments of the invention.

The embodiments discussed above are primarily related to reel-based slot games. However, this concept can be applied to a variety of games of chance played on gaming devices. As may now be readily understood, one or more devices may be programmed to play various embodiments of the invention. The present invention may be implemented as a casino gaming machine or other special purpose gaming kiosk as described hereinabove, or may be implemented via computing systems operating under the direction of local gaming software, and/or remotely-provided software such as provided by an application service provider (ASP). The casino gaming machines utilize computing systems to control and manage the gaming activity. An example of a representative computing system capable of carrying out operations in accordance with the invention is illustrated in FIG. 16.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 1600 of FIG. 16 is an example computing structure that can be used in connection with such electronic gaming machines, computers, or other computer-implemented devices to carry out operations of the present invention.

The example computing arrangement 1600 suitable for performing the gaming functions in accordance with the present invention typically includes a central processor (CPU) 1602 coupled to random access memory (RAM) 1604 and some variation of read-only memory (ROM) 1606. The ROM 1606 may also represent other types of storage media to store programs, such as programmable ROM (PROM), erasable PROM (EPROM), etc. The processor 1602 may communicate with other internal and external components through input/output (I/O) circuitry 1608 and bussing 1610, to provide control signals, communication signals, and the like.

The computing arrangement 1600 may also include one or more data storage devices, including hard and floppy disk drives 1612, CD-ROM drives 1614, card reader 1615, and other hardware capable of reading and/or storing information such as DVD, etc. In one embodiment, software for carrying out the operations in accordance with the present invention may be stored and distributed on a CD-ROM 1616, diskette 1618, access card 1619, or other form of computer readable media capable of portably storing information. These storage media may be inserted into, and read by, devices such as the CD-ROM drive 1614, the disk drive 1612, card reader 1615, etc. The software may also be transmitted to the computing arrangement 1600 via data signals, such as being downloaded electronically via a network, such as the Internet. Further, as previously described, the software for carrying out the functions associated with the present invention may alternatively be stored in internal memory/storage of the computing device 1600, such as in the ROM 1606.

The computing arrangement 1600 is coupled to the display 1611, which represents a display on which the gaming activities in accordance with the invention are presented. The display 1611 represents the "presentation" of the video information in accordance with the invention, and may be any type of known display or presentation screen, such as liquid crystal displays, plasma displays, cathode ray tubes (CRT), digital light processing (DLP) displays, liquid crystal on silicon (LCOS) displays, etc.

Where the computing device 1600 represents a stand-alone or networked computer, the display 1611 may represent a standard computer terminal or display capable of displaying multiple windows, frames, etc. Where the computing device is embedded within an electronic gaming machine, the display 1611 corresponds to the display screen of the gaming machine/kiosk. A user input interface 1622 such as a mouse, keyboard/keypad, microphone, touch pad, trackball, joystick, touch screen, voice-recognition system, etc. may be provided. The display 1611 may also act as a user input device, e.g., where the display 1611 is a touch-screen device.

Chance-based gaming systems such as slot machines, in which the present invention is applicable, are governed by random numbers and processors, as facilitated by a random number generator (RNG). The fixed and dynamic symbols generated as part of a gaming activity may be produced using one or more RNGs. RNGs as known in the art may be implemented using hardware, software operable in connection with the processor 1602, or some combination of hardware and software. The present invention is operable using any known RNG, and may be integrally programmed as part of the processor 1602 operation, or alternatively may be a separate RNG controller 1640.

The computing arrangement 1600 may be connected to other computing devices or gaming machines, such as via a network. The computing arrangement 1600 may be connected to a network server 1628 in an intranet or local network configuration. The computer may further be part of a larger network configuration as in a global area network (GAN) such as the Internet. In such a case, the computer may have access to one or more web servers via the Internet. In other arrangements, the computing arrangement 1600 may be configured as an Internet server and software for carrying out the operations in accordance with the present invention may interact with the player via one or more networks.

Other components directed to gaming machine implementations include manners of gaming participant payment, and gaming machine payout. For example, a gaming machine including the computing arrangement 1600 may also include a hopper controller 1642 to determine the amount of payout to be provided to the participant. The hopper controller may be integrally implemented with the processor 1602, or alternatively as a separate hopper controller 1642. A hopper 1644 may also be provided in gaming machine embodiments, where the hopper serves as the mechanism holding the coins/tokens of the machine. The wager input module 1646 represents any mechanism for accepting coins, tokens, coupons, bills, electronic fund transfer (EFT), tickets, credit cards, smart cards, membership cards, etc., for which a participant inputs a wager amount. It will be appreciated that the primary gaming software 1632 may be able to control payouts via the hopper 1644 and controller 1642 for independently determined payout events.

Among other functions, the computing arrangement 1600 provides an interactive experience to players via input interface 1622 and output devices, such as the display 1611, speaker 1630, etc. These experiences are generally controlled by gaming software 1632 that controls a primary gaming activity of the computing arrangement 1600. The gaming software 1632 may be temporarily loaded into RAM 1604, and may be stored locally using any combination of ROM 1606, drives 1612, media player 1614, or other computer-readable storage media known in the art. The primary gaming software 1632 may also be accessed remotely, such as via the server 1628 or the Internet.

The primary gaming software 1632 in the computing arrangement 1600 is shown here as an application software module. According to embodiments of the present invention, this software 1632 provides a slot game or similar game of chance as described hereinabove. For example, the software 1632 may present, by way of the display 1611, representations of symbols to map or otherwise display as part of a slot based game having reels. However, in other embodiments, the principles of this concept may be applied to poker games or other types of games of chance. One or more aligned positions of these game elements may be evaluated to determine awards based on a paytable. The software 1632 may include instructions to provide other functionality as known in the art and described herein, such as shown and described above regarding FIGS. 1-15J.

The foregoing description of the exemplary embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A gaming device comprising:

a player input apparatus;

a display;

a memory configured to store a credit amount;

a wager input device structured to receive physical items associated with a currency value;

a processor configured to:

receive a signal from the wager input device that a physical item associated with a currency value has been received;

increase the credit amount stored in the memory based on the currency value of the received physical item;

receive signals transmitted from the player input device to place a wager on a game, the wager deducted from the credit amount stored in the memory;

initiate a base game portion of the game by manipulating game elements having game symbols on the display;

determine whether a triggering condition for a secondary game has been satisfied;

execute a secondary game when the triggering condition has been satisfied, the execution of the secondary game including:

displaying a substantially circular bonus wheel having a plurality of sections, each section including a numerical mark and including a coloration of one of red, black, or green, activating a ball marker to encircle the plurality of sections on the bonus wheel, randomly selecting one of the sections of the bonus wheel for the ball marker to land, presenting an award associated with the numerical mark corresponding to the selected section of the bonus wheel, marking the selected section of the bonus wheel with a termination indicator, reactivating the ball marker to encircle the plurality of sections on the bonus wheel, randomly selecting one of the sections of the bonus wheel for the ball marker to land, determining characteristics of the randomly selected section of the bonus wheel, where the determined characteristics cause the configured processor to end the secondary game when the randomly selected section is determined to include a termination indicator, remove all termination indicators from the plurality of sections when the randomly selected section is determined to include green coloration, or present an award associated with the numerical mark corresponding to the selected section of the bonus wheel and mark the selected section of the bonus wheel with a termination indicator, and continuing to reactivate the ball marker, randomly select one of the sections, and determine characteristics of the selected section until a selected section includes a termination indicator;

aggregate awards associated with the base game portion and secondary game; and increase the credit amount stored in the memory based on the aggregated awards.

2. The gaming device of claim 1, wherein presenting an award associated with the numerical mark corresponding to the selected section of the bonus wheel includes presenting the value of the numerical mark as the award.

3. The gaming device of claim 1, wherein presenting an award associated with the numerical mark corresponding to the selected section of the bonus wheel includes:

determining an award value associated with the numerical mark in a paytable; and presenting the award value from the paytable as the award.

4. The gaming device of claim 1, wherein executing a secondary game further comprises:

receiving a signal from the player input apparatus to designate one of the plurality of sections of the bonus wheel prior to activating the ball marker;

marking the designated section; and providing an additional award modifier when the ball marker is randomly selected to land in the designated section of the bonus wheel.

5. The gaming device of claim 1, wherein executing a secondary game further comprises:

receiving a signal from the player input apparatus to designate one coloration value of either red or black as a bonus color; and providing an additional award modifier when the ball marker is randomly selected to land in a section of the bonus wheel associated with the bonus color.

6. The gaming device of claim 1, wherein executing a secondary game further comprises:

receiving a signal from the player input apparatus to designate one of a plurality of predefined groups of bonus wheel sections prior to activating the ball marker;

marking the designated sections; and providing an additional award modifier when the ball marker is randomly selected to land in one of the designated sections of the bonus wheel.

7. The gaming device of claim 1, wherein aggregating awards associated with the base game portion and secondary game includes modifying an award associated with the base game portion with a modifier associated with awards received in the secondary game.

8. The gaming device of claim 1, wherein the bonus wheel is a roulette wheel.

9. The gaming device of claim 8, wherein the roulette wheel includes exactly one section with green coloration.

10. A method of operating a gaming device having a game display, a memory configured to store a credit amount, a wager input device structured to receive physical items associated with a currency value, a processor, and a player input apparatus, the method comprising:

receiving a signal from the wager input device that a physical item associated with a currency value has been received;

increasing the credit amount stored in the memory based on the currency value of the received physical item;

initiating a base game of chance on the game display in response to a signal received from the player input apparatus indicating a wager amount placed on the base game of chance, the wager amount deducted from the credit amount stored in the memory;

executing a secondary game when a triggering condition has been satisfied, the execution of the secondary game including:

displaying a substantially circular bonus wheel having a plurality of sections each section including a symbol mark and including one of a first coloration, a second coloration, or a third coloration, activating a ball marker to encircle the plurality of sections on the bonus wheel, randomly selecting one of the sections of the bonus wheel for the ball marker to land, presenting an award associated with the symbol mark corresponding to the selected section of the bonus wheel, marking the selected section of the bonus wheel with a termination indicator, reactivating the ball marker to encircle the plurality of sections on the bonus wheel, randomly selecting one of the sections of the bonus wheel for the ball marker to land, determining characteristics of the randomly selected section of the bonus wheel, where the determined characteristics cause the configured processor to end the secondary game when the randomly selected section is determined to include a termination indicator, remove all termination indicators from the plurality of sections when the randomly selected section is determined to include a third coloration, or present an award associated with the symbol mark corresponding to the selected section of the bonus wheel and mark the selected section of the bonus wheel with a termination indicator, and continuing to reactivate the ball marker, randomly select one of the sections, and determine characteristics of the selected section until a selected section includes a termination indicator;

aggregating awards associated with the base game portion and secondary game; and increasing the credit amount stored in the memory based on the aggregated awards.

11. The method of claim 10, wherein executing a secondary game further comprises:

receiving a signal from the player input apparatus to designate one of the plurality of sections of the bonus wheel prior to activating the ball marker;

marking the designated section; and providing an additional award modifier when the ball marker is randomly selected to land in the designated section of the bonus wheel.

12. The method of claim 10, wherein executing a secondary game further comprises:

receiving a signal from the player input apparatus to designate either the first coloration or the second coloration as a bonus color; and providing an additional award modifier when the ball marker is randomly selected to land in a section of the bonus wheel associated with the bonus color.

13. The method of claim 10, wherein executing a secondary game further comprises:

receiving a signal from the player input apparatus to designate one of a plurality of predefined groups of bonus wheel sections prior to activating the ball marker;

marking the designated sections; and providing an additional award modifier when the ball marker is randomly selected to land in one of the designated sections of the bonus wheel.

14. A method of operating a gaming device having a game display, a memory configured to store a credit amount, a wager input device structured to receive physical items associated with a currency value, a processor, and a player input apparatus, the method comprising:

receiving a signal from the wager input device that a physical item associated with a currency value has been received;

increasing the credit amount stored in the memory based on the currency value of the received physical item;

receiving signals transmitted from the player input apparatus to place a wager on a game, the wager deducted from the credit amount stored in the memory;

displaying a substantially circular game wheel having a plurality of sections each including a symbol mark on the game display, where each of the plurality of sections is associated with a first section class or a second section class;

randomly selecting one of the sections of the game wheel in a first selection process executed by the processor;

presenting an award associated with the symbol mark corresponding to the selected section of the game wheel as a result of the first selection process;

marking the selected section of the game wheel with a termination indicator;

randomly selecting one of the sections of the game wheel in a second selection process executed by the processor;

aggregating presented awards when the selected section of the game wheel includes a termination indicator in the second selection process;

removing at least one terminator indicator from a section of the game wheel when the selected section of the game wheel is associated with a second section class in the second selection process;

presenting an award associated with the symbol mark corresponding to the selected section of the game wheel as a result of the second selection process and marking the selected section of the game wheel with a termination indicator when the selected section of the game wheel is associated with a first section class in the second selection process; and increasing the credit amount stored in the memory based on the presented award.

15. The method of claim 14, further comprising:

receiving a signal from the player input apparatus to designate one of the plurality of sections of the game wheel prior to randomly selecting one of the sections of the game wheel in a first selection process;

marking the designated section; and providing an additional award modifier when the designed section is selected in the first or second selection process.

16. The method of claim 14, further comprising:

receiving a signal from the player input apparatus to designate one of a plurality of predefined groups of game wheel sections prior randomly selecting one of the sections of the game wheel in a first selection process;

marking the designated sections; and providing an additional award modifier when one of the designed section is selected in the first or second selection process.

17. The method of claim 14, wherein the game wheel is a roulette wheel with one or more green-colored sections, a plurality of red-colored sections, and a plurality of black-colored sections.

18. The method of claim 17, wherein the second class associated with one or more sections of the game wheel are the one or more green-colored sections of the roulette wheel.

19. The method of claim 14, further comprising repeating the second selection process until a selected section includes a termination indicator.

20. The method of claim 14, wherein removing at least one terminator indicator from a section of the game wheel includes randomly selecting one existing terminator indicator to remove.

* * * * *